(12) United States Patent
Gehl et al.

(10) Patent No.: US 10,470,597 B2
(45) Date of Patent: Nov. 12, 2019

(54) FOOD PRODUCT DISPENSER AND VALVE

(71) Applicant: Gehl Foods, LLC, Germantown, WI (US)

(72) Inventors: Michael Gehl, Germantown, WI (US); Michael Sowieja, Richfield, WI (US); Christoph Albiez, Esslingen (DE); Paul Hatch, Chicago, IL (US); Thomas Mitchell, Chicago, IL (US); David Mucci, Chicago, IL (US); Anders Olof Rostlund, Chicago, IL (US)

(73) Assignee: Gehl Foods, LLC, Germantown, WI (US)

( * ) Notice: Subject to any disclaimer, the term of this patent is extended or adjusted under 35 U.S.C. 154(b) by 0 days.

(21) Appl. No.: 15/600,346

(22) Filed: May 19, 2017

(65) Prior Publication Data

US 2017/0251847 A1    Sep. 7, 2017

Related U.S. Application Data

(62) Division of application No. 14/506,169, filed on Oct. 3, 2014, now Pat. No. 9,717,354.

(Continued)

(51) Int. Cl.
*A47G 19/18* (2006.01)
*G01F 15/00* (2006.01)
(Continued)

(52) U.S. Cl.
CPC .......... *A47G 19/183* (2013.01); *A47G 19/18* (2013.01); *B65D 75/5877* (2013.01); *B67D 7/30* (2013.01);
(Continued)

(58) Field of Classification Search
CPC ...... A47G 19/183; A47G 19/18; B67D 7/302; B67D 7/30; G01F 15/003
(Continued)

(56) References Cited

U.S. PATENT DOCUMENTS 1,006,623 A    10/1911    Barrett
D50,625 S       4/1917    Lund
(Continued)

FOREIGN PATENT DOCUMENTS

EM    000574843-0003    8/2006
EP    0 150 144         7/1985
(Continued)

OTHER PUBLICATIONS

DS Smith Plastics, http://www.dssmith.com/plastics/offering/flexible-packaging--dispensing-solutions/rapak/rapak-bags/, date accessed: Sep. 30, 2014, 3 pages.
(Continued)

*Primary Examiner* — Nicholas J. Weiss
(74) *Attorney, Agent, or Firm* — Foley & Lardner LLP

(57) ABSTRACT

A system for dispensing a flowable food product from a reservoir is provided. A wall of the reservoir defines an aperture therethrough allowing the flowable food product to exit the reservoir. The system includes a valve having a base member having a first passageway extending therethrough and a moving member having a second passageway extending therethrough, the moving member configured to slide relative to the base member between a closed position in which the first passageway and the second passageway do not overlap and an open position in which the first passageway and the second passageway overlap. When the moving member is in the open position, an axis extending through the first passageway and the second passageway extends through the aperture in the reservoir.

7 Claims, 40 Drawing Sheets

Related U.S. Application Data

(60) Provisional application No. 61/889,813, filed on Oct. 11, 2013, provisional application No. 62/043,973, filed on Aug. 29, 2014.

(51) Int. Cl.
  *B67D 7/30* (2010.01)
  *B65D 75/58* (2006.01)
  *B65D 75/56* (2006.01)

(52) U.S. Cl.
  CPC ............ *B67D 7/302* (2013.01); *G01F 15/003* (2013.01); *B65D 75/563* (2013.01)

(58) Field of Classification Search
  USPC .......................................................... 222/14
  See application file for complete search history.

(56) References Cited

U.S. PATENT DOCUMENTS

| | | |
|---|---|---|
| 1,556,206 A | 4/1923 | Dickey |
| 1,528,283 A | 3/1925 | Whitesides |
| 1,576,388 A | 3/1926 | Whitesides |
| 1,859,126 A | 3/1930 | Boeuf |
| 1,912,304 A | 4/1930 | Phillips |
| D83,729 S | 3/1931 | Hills |
| 2,244,071 A | 6/1941 | Landrus |
| 2,442,126 A | 5/1948 | Halstead |
| 2,609,122 A | 9/1952 | Stenerson |
| 2,713,988 A | 4/1953 | Kitterman |
| D173,909 S | 1/1955 | Muller-Munk |
| 2,737,880 A | 3/1956 | Johnson |
| 2,775,368 A | 12/1956 | De Vries |
| 2,845,201 A | 4/1958 | Henry |
| D183,532 S | 9/1958 | McCauley |
| D184,606 S | 3/1959 | Cramer et al. |
| D185,626 S | 7/1959 | Craig et al. |
| D185,833 S | 8/1959 | Bruntjen |
| D194,658 S | 2/1963 | Gilson |
| 3,089,619 A | 5/1963 | Kass et al. |
| 3,114,480 A | 12/1963 | Sauter |
| D199,046 S | 9/1964 | Felske |
| 3,173,579 A | 3/1965 | Curie et al. |
| 3,186,596 A * | 6/1965 | Badgett ................. B28C 7/0409 222/14 |
| 3,239,104 A | 3/1966 | Scholle |
| 3,248,011 A | 4/1966 | Brodsky et al. |
| D204,822 S | 5/1966 | Barker |
| D205,702 S | 9/1966 | Christine et al. |
| 3,312,468 A | 4/1967 | Lynch |
| 3,343,724 A | 9/1967 | Malpas |
| D209,127 S | 10/1967 | Martin |
| 3,366,278 A | 1/1968 | Fobes |
| 3,369,720 A | 2/1968 | Libit et al. |
| 3,387,903 A | 6/1968 | Karlen |
| 3,445,039 A | 5/1969 | Brodsky et al. |
| D215,045 S | 8/1969 | Benjamin |
| 3,549,049 A | 12/1970 | Weber |
| 3,881,641 A | 5/1975 | Pliml et al. |
| 3,924,777 A | 12/1975 | Peyser |
| D240,108 S | 6/1976 | McGrew |
| 4,018,357 A | 4/1977 | Ostrem |
| 4,049,157 A | 9/1977 | Carson |
| 4,176,767 A | 12/1979 | Franche, IV |
| 4,214,675 A | 7/1980 | Schmit |
| 4,314,654 A | 2/1982 | Gaubert |
| 4,322,019 A | 3/1982 | Smith |
| 4,406,247 A * | 9/1983 | Baughman ................. B42C 9/00 118/678 |
| 4,416,395 A | 11/1983 | Gaubert |
| 4,417,672 A | 11/1983 | Eppenbach |
| 4,440,316 A | 4/1984 | Christine |
| D277,633 S | 2/1985 | McClellan |
| 4,497,351 A | 2/1985 | Garcia |
| 4,513,885 A | 4/1985 | Hogan |
| 4,515,294 A | 5/1985 | Udall |
| D282,617 S | 2/1986 | Hogan |
| 4,602,725 A | 7/1986 | Malpas et al. |
| 4,621,750 A | 11/1986 | Roethel |
| D290,074 S | 6/1987 | Braun |
| 4,690,307 A | 9/1987 | Hogan |
| 4,712,714 A | 12/1987 | Mucciarone |
| 4,724,981 A | 2/1988 | Realmuto |
| D296,405 S | 6/1988 | Weaver |
| D297,105 S | 8/1988 | Hollinshead |
| 4,776,488 A | 10/1988 | Gurzan |
| 4,795,062 A | 1/1989 | Bedwell et al. |
| 4,846,236 A | 7/1989 | Deruntz |
| 4,856,681 A | 8/1989 | Murray |
| 4,913,713 A | 4/1990 | Bender et al. |
| 4,925,034 A | 5/1990 | Robichaud et al. |
| 4,946,040 A | 8/1990 | Ipenburg |
| 4,961,508 A | 10/1990 | Weimer et al. |
| 4,997,108 A | 3/1991 | Hata |
| D321,453 S | 11/1991 | Ophardt |
| 5,102,015 A | 4/1992 | Barnard et al. |
| D327,432 S | 6/1992 | Farricielli |
| 5,121,658 A * | 6/1992 | Lew ............................. G01F 1/10 73/195 |
| 5,125,542 A | 6/1992 | Blanc |
| D328,007 S | 7/1992 | Mondry et al. |
| D328,008 S | 7/1992 | Avery |
| D328,220 S | 7/1992 | Barnard et al. |
| 5,142,610 A | 8/1992 | Augustine et al. |
| 5,150,802 A | 9/1992 | Jeffers |
| 5,158,210 A | 10/1992 | Du |
| 5,230,443 A | 7/1993 | Du |
| D345,085 S | 3/1994 | Sewell |
| 5,325,995 A | 7/1994 | Harrison et al. |
| 5,337,775 A | 8/1994 | Lane et al. |
| 5,350,083 A | 9/1994 | Du |
| 5,361,943 A | 11/1994 | Du |
| 5,428,066 A | 6/1995 | Larner et al. |
| 5,429,681 A | 7/1995 | Mesenbring |
| 5,435,463 A | 7/1995 | Hodgson |
| 5,435,466 A | 7/1995 | Du |
| D365,962 S | 1/1996 | Amundsen et al. |
| 5,490,613 A | 2/1996 | Taylor et al. |
| D372,650 S | 8/1996 | Bundy |
| 5,573,047 A | 11/1996 | Akin |
| 5,579,945 A | 12/1996 | Ichikawa et al. |
| 5,579,959 A | 12/1996 | Bennett et al. |
| 5,622,484 A | 4/1997 | Taylor-McCune et al. |
| 5,624,056 A | 4/1997 | Martindale |
| D384,863 S | 10/1997 | Danemayer |
| D385,715 S | 11/1997 | Curry |
| D390,753 S | 2/1998 | Danemayer |
| D392,843 S | 3/1998 | Mulvihill |
| 5,752,319 A | 5/1998 | Su et al. |
| D398,964 S | 9/1998 | Doughty et al. |
| 5,803,317 A * | 9/1998 | Wheeler .............. B67D 1/0004 222/105 |
| 5,833,120 A | 11/1998 | Evans et al. |
| 5,836,482 A | 11/1998 | Ophardt et al. |
| 5,845,812 A | 12/1998 | Morrison |
| D408,667 S | 4/1999 | Curry |
| 6,003,733 A | 12/1999 | Wheeler |
| 6,016,935 A | 1/2000 | Huegerich et al. |
| 6,036,166 A | 3/2000 | Olson |
| D425,792 S | 5/2000 | Haller |
| 6,056,157 A * | 5/2000 | Gehl ...................... B65D 77/06 222/105 |
| 6,082,587 A | 7/2000 | Martindale et al. |
| 6,089,406 A | 7/2000 | Feldner |
| 6,138,878 A | 10/2000 | Savage et al. |
| 6,142,340 A | 11/2000 | Watanabe et al. |
| 6,158,623 A | 12/2000 | Benavides et al. |
| 6,189,736 B1 | 2/2001 | Phallen et al. |
| 6,193,111 B1 | 2/2001 | Adams |
| 6,196,420 B1 | 3/2001 | Gutierrez et al. |
| 6,223,944 B1 | 5/2001 | Gehl et al. |
| 6,227,420 B1 | 5/2001 | Jepson |
| 6,273,297 B1 | 8/2001 | Schalow et al. |
| D448,633 S | 10/2001 | Langlois |

(56) References Cited

U.S. PATENT DOCUMENTS

| | | | |
|---|---|---|---|
| D453,663 S | 2/2002 | Mori | |
| 6,345,734 B2 | 2/2002 | Schalow et al. | |
| 6,378,730 B1 | 4/2002 | Reddy et al. | |
| 6,405,897 B1 | 6/2002 | Jepson et al. | |
| 6,419,121 B1 | 7/2002 | Gutierrez et al. | |
| 6,460,735 B1* | 10/2002 | Greenwald | A47J 31/467 222/145.5 |
| D467,477 S | 12/2002 | Berens et al. | |
| 6,488,179 B1 | 12/2002 | Vujicic et al. | |
| 6,668,643 B1* | 12/2003 | Pettinaroli | G01F 1/28 73/239 |
| D486,698 S | 2/2004 | Hutchison | |
| 6,691,894 B2 | 2/2004 | Chrisman et al. | |
| 6,698,624 B2 | 3/2004 | Ufheil et al. | |
| 6,708,741 B1 | 3/2004 | Berry et al. | |
| 6,722,530 B1 | 4/2004 | King et al. | |
| 6,726,061 B2 | 4/2004 | Good | |
| 6,814,262 B1 | 11/2004 | Adams et al. | |
| 6,860,407 B2 | 3/2005 | Gosselin | |
| 6,871,015 B2 | 3/2005 | Gutierrez et al. | |
| D506,369 S | 6/2005 | Norton | |
| D509,137 S | 9/2005 | Hierzer et al. | |
| 6,938,801 B1 | 9/2005 | Reddy et al. | |
| D515,919 S | 2/2006 | Hierzer et al. | |
| 7,007,824 B2 | 3/2006 | Danby et al. | |
| 7,025,230 B1 | 4/2006 | Salmela | |
| 7,147,134 B2 | 12/2006 | Gutierrez et al. | |
| 7,262,838 B2* | 8/2007 | Fritz | G01N 15/1456 356/335 |
| 7,278,553 B2 | 10/2007 | Py et al. | |
| 7,322,491 B2 | 1/2008 | Py et al. | |
| 7,357,277 B2 | 4/2008 | Verespej et al. | |
| 7,455,200 B2 | 11/2008 | Gehl et al. | |
| D583,022 S | 12/2008 | Soulier | |
| D585,965 S | 2/2009 | Kohler et al. | |
| D589,123 S | 3/2009 | Soulier | |
| 7,651,015 B2 | 1/2010 | Girard et al. | |
| D613,558 S | 4/2010 | Gold et al. | |
| 7,731,060 B2 | 6/2010 | Jones | |
| 7,770,408 B2* | 8/2010 | Kim | F25C 5/22 62/344 |
| 7,789,269 B2 | 9/2010 | Pritchard | |
| D627,223 S | 11/2010 | Storti et al. | |
| D628,035 S | 11/2010 | Paige | |
| 7,828,020 B2 | 11/2010 | Girard et al. | |
| 7,850,051 B2 | 12/2010 | Py et al. | |
| D632,144 S | 2/2011 | Weisenbach | |
| 7,971,604 B2* | 7/2011 | McDonald | G05D 7/0635 137/486 |
| 7,980,424 B2 | 7/2011 | Johnson | |
| 8,091,735 B2 | 1/2012 | Girard et al. | |
| 8,146,780 B2 | 4/2012 | Compton et al. | |
| D659,008 S | 5/2012 | Gately et al. | |
| 8,205,771 B2 | 6/2012 | Compton | |
| 8,206,034 B2 | 6/2012 | Keen et al. | |
| D671,620 S | 11/2012 | March et al. | |
| 8,336,740 B1 | 12/2012 | Daansen | |
| 8,353,428 B2 | 1/2013 | Pritchard | |
| 8,371,476 B2 | 2/2013 | Weissbrod | |
| 8,474,495 B2 | 7/2013 | Singleton et al. | |
| 8,528,807 B2 | 9/2013 | Kaneko | |
| D696,943 S | 1/2014 | Kim | |
| 8,887,960 B2 | 11/2014 | Hardman | |
| D718,621 S | 12/2014 | Mitchell et al. | |
| D719,403 S | 12/2014 | Halioua | |
| D720,188 S | 12/2014 | Burke et al. | |
| D731,273 S | 6/2015 | McPeak Ford et al. | |
| D731,310 S | 6/2015 | Demey et al. | |
| 9,045,260 B2 | 6/2015 | Norris et al. | |
| D754,536 S | 4/2016 | Arriaga | |
| D755,045 S | 5/2016 | Kuo | |
| D758,810 S | 6/2016 | Peterson et al. | |
| 9,370,273 B2 | 6/2016 | Li et al. | |
| D763,077 S | 8/2016 | Mitchell et al. | |
| D764,912 S | 8/2016 | Houyoux | |
| 9,585,513 B2 | 3/2017 | Hanes et al. | |
| D782,907 S | 4/2017 | Sowieja et al. | |
| D792,164 S | 7/2017 | Mitchell et al. | |
| 9,717,354 B2 | 8/2017 | Gehl et al. | |
| D798,106 S | 9/2017 | Sowieja et al. | |
| 2002/0092879 A1 | 7/2002 | Chrisman et al. | |
| 2002/0179605 A1 | 12/2002 | Miani et al. | |
| 2003/0015556 A1 | 1/2003 | Wild et al. | |
| 2003/0066978 A1 | 4/2003 | Enerson | |
| 2003/0116584 A1 | 6/2003 | Gutierrez et al. | |
| 2004/0222233 A1 | 11/2004 | Gosselin | |
| 2004/0238563 A1 | 12/2004 | Lin | |
| 2005/0121464 A1 | 6/2005 | Miller et al. | |
| 2005/0167443 A1 | 8/2005 | Sanfilippo et al. | |
| 2005/0167444 A1 | 8/2005 | Sanfilippo et al. | |
| 2005/0252937 A1 | 11/2005 | Gehl et al. | |
| 2006/0011640 A1 | 1/2006 | Shaygan | |
| 2006/0071020 A1 | 4/2006 | Wiesner et al. | |
| 2006/0138167 A1 | 6/2006 | McMahon et al. | |
| 2007/0029343 A1 | 2/2007 | Sanfilippo et al. | |
| 2008/0029540 A1 | 2/2008 | Johnson | |
| 2008/0078781 A1 | 4/2008 | Py et al. | |
| 2008/0083788 A1 | 4/2008 | Py et al. | |
| 2008/0105701 A1 | 5/2008 | Niss et al. | |
| 2008/0116225 A1 | 5/2008 | Py et al. | |
| 2008/0116226 A1 | 5/2008 | Py et al. | |
| 2008/0169309 A1 | 7/2008 | Kroeger | |
| 2008/0314923 A1 | 12/2008 | Faller et al. | |
| 2009/0020559 A1 | 1/2009 | Sanfilippo et al. | |
| 2009/0283541 A1 | 11/2009 | Compton et al. | |
| 2010/0038380 A1 | 2/2010 | Compton | |
| 2010/0147884 A1 | 6/2010 | Compton et al. | |
| 2010/0176155 A1 | 7/2010 | Baron et al. | |
| 2010/0264146 A1 | 10/2010 | Casale et al. | |
| 2010/0288767 A1 | 11/2010 | Seelhofer | |
| 2011/0017774 A1 | 1/2011 | Pritchard | |
| 2011/0024463 A1 | 2/2011 | Py et al. | |
| 2011/0042410 A1 | 2/2011 | Paulen | |
| 2012/0046785 A1 | 2/2012 | Deo et al. | |
| 2012/0152976 A1 | 7/2012 | Yoshida et al. | |
| 2012/0211519 A1 | 8/2012 | Hauner et al. | |
| 2015/0102057 A1 | 4/2015 | Gehl et al. | |
| 2016/0129464 A1* | 5/2016 | Frommer | B05B 12/008 700/282 |
| 2017/0121167 A1 | 5/2017 | Johnson et al. | |
| 2017/0251846 A1 | 9/2017 | Sowieja et al. | |
| 2017/0251847 A1 | 9/2017 | Gehl et al. | |

FOREIGN PATENT DOCUMENTS

| | | |
|---|---|---|
| EP | 0 538 91 | 2/1986 |
| EP | 0 962 421 | 12/1999 |
| GB | 2 154 991 | 9/1985 |
| JP | 52-001760 | 1/1955 |
| JP | H09-104474 | 4/1997 |
| KR | 1020120099678 | 9/2012 |
| TW | D122024 | 3/2008 |
| TW | D122218 | 4/2008 |
| TW | D165705 | 2/2015 |
| WO | WO-2013/029163 | 3/2013 |

OTHER PUBLICATIONS

International Preliminary Report on Patentability for Application No. PCT/US2014/059119, dated Apr. 21, 2016, 10 pages.
International Search Report and Written Opinion for International Application No. PCT/US2014/059119, dated Feb. 25, 2015, 12 pages.
International Search Report and Written Opinion for International Application No. PCT/US2015/047491, dated Oct. 29, 2015, 14 pages.
Liqui-Box, "Fitments", http://www.liquibox.com/fitments, date accessed: Sep. 26, 2014, 2 pages.
Scholle Packaging, http://www.scholle.com/products, date accessed: Sep. 30, 2014, 3 pages.

(56) References Cited

OTHER PUBLICATIONS

Communication pursuant to Rule 164 (1) from the European Patent Office regarding European Application No. 15835591.7 dated Apr. 11, 2018, 16 pps.
Dispenser Value with Chili Sauce Bag in Box by Gehls, dated Jan. 6, 2014, found online Apr. 28, 2018, https://www.roundeyesupply.com/Gehls-Dispenser-Value-With-Chili-Sauce-Bag-in-Box-p/de439156.htm; 4 pps.

* cited by examiner

FOOD PRODUCT DISPENSER AND VALVE

CROSS-REFERENCE TO RELATED PATENT APPLICATIONS

The present application is a Divisional of U.S. patent application Ser. No. 14/506,169, filed Oct. 3, 2014, which claims the benefit and priority of U.S. Provisional Patent Application No. 62/043,973, filed Aug. 29, 2014, and the benefit and priority of U.S. Provisional Patent Application No. 61/889,813, filed Oct. 11, 2013, all of which are incorporated herein by reference in their entireties.

BACKGROUND

The present application relates generally to the field of devices and valves for dispensing heated flowable materials from containers. The present application relates more particularly to the field of devices and valves for dispensing heated flowable materials such as food products from flexible packages.

Flowable food products, such as condiments and sauces, are typically viscous fluids that are dispensable onto a receiving food product. For example, ketchup, mustard, cheese sauce, or chili sauce may be dispensed from a dispenser onto a hot dog, burger, or nachos at a convenience store or sporting venue. Cheese sauce and chili sauce are typically heated in the dispenser to maintain sterility and provide a customer expected temperature. The dispenser typically includes a housing or hopper configured to support a refillable, reloadable, or replaceable reservoir (e.g., container, sealed package, bag, box, carton, etc.), a heating element, and a valve configured to regulate the flow from the reservoir. The valve may be manually operated or may be or include a motorized pump. Motorized pumps increase the cost and complexity of the dispenser, while manually operated systems may leave un-evacuated food product in the reservoir, unused. Accordingly, there is a need for a manual system that more completely evacuates the reservoir.

SUMMARY

One embodiment relates to a system for dispensing a flowable food product from a reservoir. A wall of the reservoir defines an aperture therethrough allowing the flowable food product to exit the reservoir. The system includes a valve having a base member having a first passageway extending therethrough and a moving member having a second passageway extending therethrough, the moving member configured to slide relative to the base member between a closed position in which the first passageway and the second passageway do not overlap and an open position in which the first passageway and the second passageway overlap. When the moving member is in the open position, an axis extending through the first passageway and the second passageway extends through the aperture in the reservoir. The axis may extend substantially vertically. The system may include a fitment coupled to the wall of the reservoir. The base may be part of a probe at least a portion of which is configured to be received in the fitment. The probe may include a plurality of teeth configured to form the aperture in the wall of the reservoir when the probe is moved from a shipping position to an installed position. At least one of the plurality of teeth may be sharp and another at least one of the plurality of teeth may be blunted. The fitment may include one of a rib and a groove, the probe may include the other of the rib and the groove, and the other of the rib and the groove may engage the one of the rib and the groove of the fitment to retain the probe to the fitment when the probe is in and installed position. The fitment may include a tang, the moving member may include a detent, and the engagement of the detent and the tang may inhibit movement of the moving member from the closed position towards the open position. The probe may include an axially extending sidewall, a portion of the sidewall may be located within the reservoir when the probe is in the installed position, and the portion of the sidewall within the reservoir may define an opening extending radially through the sidewall such that flowable food product may flow through the opening to the aperture in the reservoir. The movable member may include a finger extending outward from a body of the moveable member and configured to engage a slot formed in the base, and the finger and the slot may cooperate to partially retain the movable member relative to the base, thereby preventing inadvertent removal of the movable member from the base. The base may define at least one guiderail configured to support the movable member in the lateral direction while the movable member translates between the open and closed positions. The reservoir may include a flexible bag. During operation, the flexible bag may be suspended such that at least a portion of the flexible bag is substantially aligned with the axis. The system may include a dispenser having at least one projection from which the flexible bag is suspended. The system may include a dispenser having at least two substantially upright sidewalls that are spaced sufficiently close together so as to laterally support the flexible bag such that the flexible bag remains in a substantially upright position. The system may include a dispenser having at least two substantially upright sidewalls that are spaced sufficiently close together so as to laterally support the flexible bag so that flowable food product contained therein can be dispensed from the system.

Another embodiment relates to a dispenser for dispensing a flowable food product from a flexible reservoir supported by a dispenser. The flexible reservoir has a valve configured to selectively dispense the flowable food product. The dispenser includes a heating plate configured to contact the flexible reservoir when the flexible reservoir is supported in the dispenser and a heating element configured to heat the heating plate. Heat is conducted from the heating plate through the flexible reservoir to the flowable food product. The heating element may inductively heat the heating plate. The dispenser may include a temperature sensor supported by the heating plate and positioned to contact the flexible reservoir. The temperature sensor may extend through a hole in the heating plate. The dispenser may include a light configured to illuminate to a user a position indicating where the flowable food product will be dispensed when the dispenser is actuated. The dispenser may include a portion control system having a processor configured to receive an input from a user and to actuate the valve to permit a predetermined amount of the flowable food product to flow from the flexible reservoir. The portion control system may include a trap configured to determine the velocity of a stream of dispensed flowable food product. The dispenser may include a metal frame supporting at least one housing, the housing defining a cavity configured to receive the flexible reservoir.

Another embodiment relates to a system for dispensing a flowable food product from a reservoir. The system includes a valve having a lever that rotates about an axis of rotation. The axis of rotation is positioned outside the reservoir and does not pass through the reservoir. An initial actuation of the valve both may create an aperture in the reservoir and open the valve to dispense the flowable food product using the same motion. The lever may include a plurality of teeth. The reservoir may include a flexible bag. The valve may be integrated with a fitment, the fitment permanently coupled to the reservoir. The valve may be coupled to a fitment, the fitment permanently coupled to the reservoir. The system may include a dispenser configured to support the reservoir and the valve.

Another embodiment relates to a dispenser for dispensing a flowable food product from a reservoir supported by a dispenser, the reservoir having a valve configured to selectively dispense the flowable food product, the dispenser comprising a light configured to illuminate to a user a position indicating where the flowable food product will be dispensed when the dispenser is actuated. The position may be located beneath the valve. The valve may be axially aligned with a fitment coupled to the reservoir. The position, the valve, and the fitment may be axially aligned.

Another embodiment relates to a system for dispensing a flowable food product from a reservoir supported by a dispenser, the reservoir having a valve configured to selectively dispense the flowable food product, the system comprising a portion control system having a processor configured to receive an input from a user and to actuate the valve to permit a predetermined amount of the flowable food product to flow from the flexible reservoir. The portion control system may include a trap configured to determine the velocity of a stream of dispensed flowable food product.

The foregoing is a summary and thus, by necessity, contains simplifications, generalizations, and omissions of detail. Consequently, those skilled in the art will appreciate that the summary is illustrative only and is not intended to be in any way limiting. Other aspects, inventive features, and advantages of the devices and/or processes described herein, as described in the claims, will become apparent in the detailed description set forth herein and taken in conjunction with the accompanying drawings. Any or all of the features, limitations, configurations, components, subcomponents, systems, and/or subsystems described above or herein may be used in combination.

DETAILED DESCRIPTION

Figure 1:
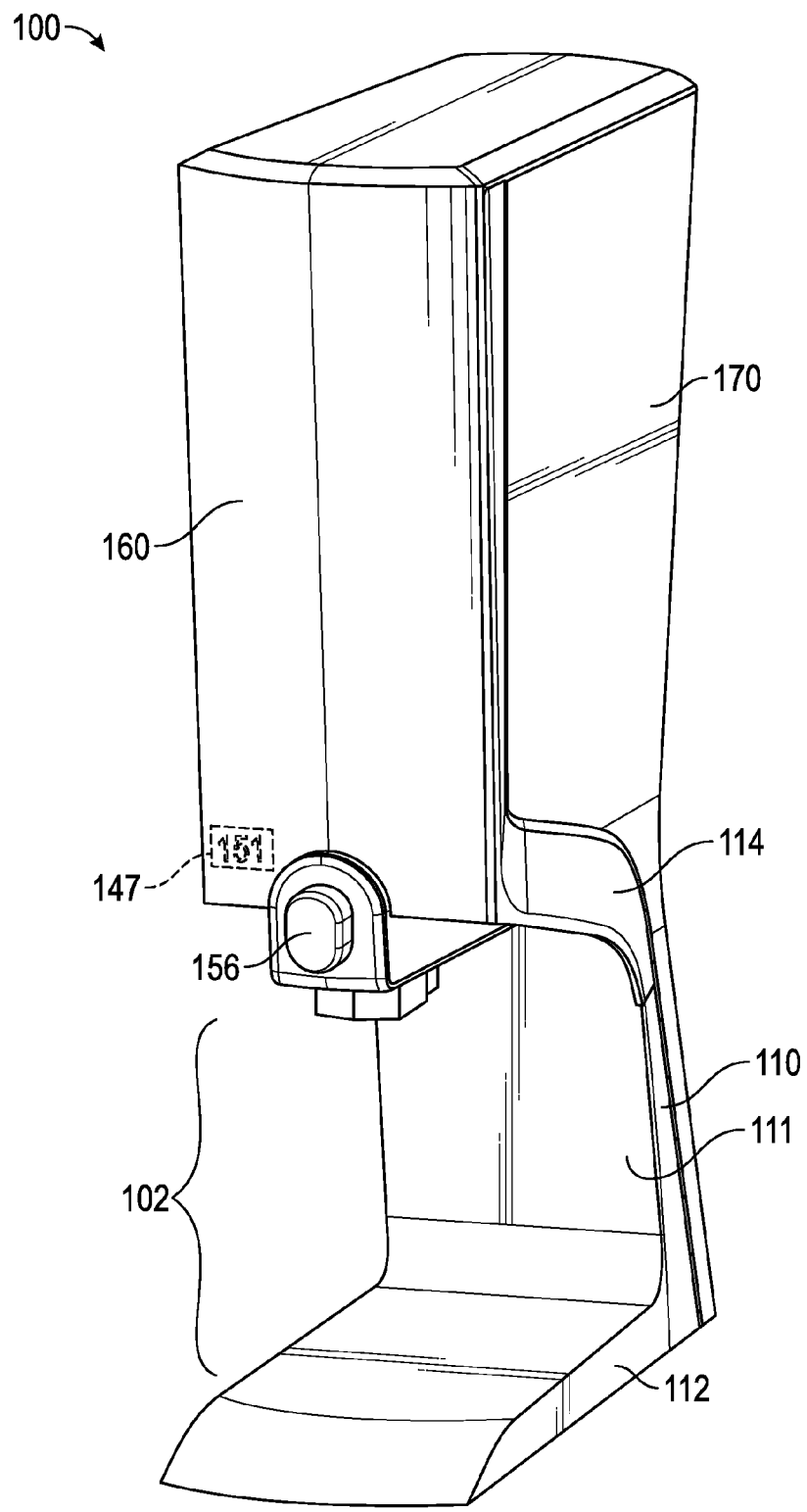
FIG. 1 is a top, front, right perspective view of a dispenser, shown according to an exemplary embodiment.

Referring generally to FIGS. 1-6, a dispenser 100, 700 configured to dispense flowable food products from a reservoir (e.g., bag 200), and components thereof, are shown according to an exemplary embodiment. The dispenser 100, 700 includes a frame 110, 710, a front housing 160, 760, and a rear housing 170, 770 supported by the frame 110, 710. One or both of the housings 160, 170, 760, 770 at least partially define a cavity 172, 772 in which a pan assembly 130, 730 and the bag 200 reside when the bag 200 is in an installed position. An exemplary embodiment of the bag 200 is shown in FIG. 7. When installed, a fitment 210 on the bag 200 is place through the opening 136, 736 in the dispenser 100, 700. An aperture or hole may be formed in a wall of the bag to allow flowable food product to flow out of the bag through the fitment. A valve 300, 400, 500, 800, 1000, 1600 coupled to the bag 200 via a fitment 210, 310, 410, 510, 810, 1010 may be actuated (e.g., opened and closed) by pressing a button 156, 756 located on the front of the dispenser. When the valve 300, 400, 500, 800, 1000, 1600 is opened, flowable food product falls onto food receiving products located in a zone 102, 702 underneath the valve. One or more heating elements 144, 744 are coupled to the pan assembly 130, 730 and heat the flowable food product to maintain its temperature at a safe storage level.

Before discussing further details of the dispenser, the valve, and/or the components thereof, it should be noted that references to "front," "back," "rear," "upward," "downward," "inner," "outer," "right," and "left" in this description are merely used to identify the various elements as they are oriented in the FIGURES. These terms are not meant to limit the element which they describe, as the various elements may be oriented differently in various applications.

It should further be noted that for purposes of this disclosure, the term "coupled" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Figure 2:
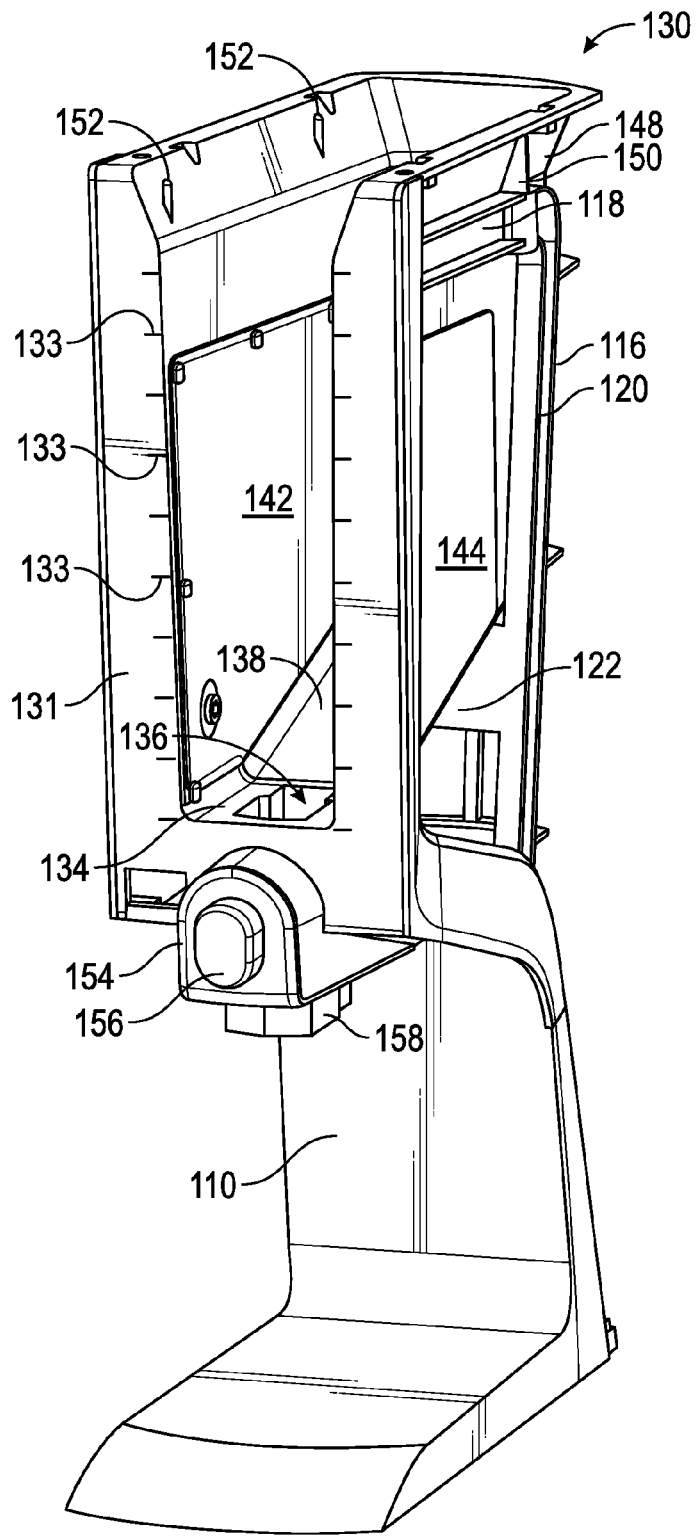
FIG. 2 is a top, front, right perspective view of the dispenser of FIG. 1 with the housings removed, shown according to an exemplary embodiment.
Figure 3:
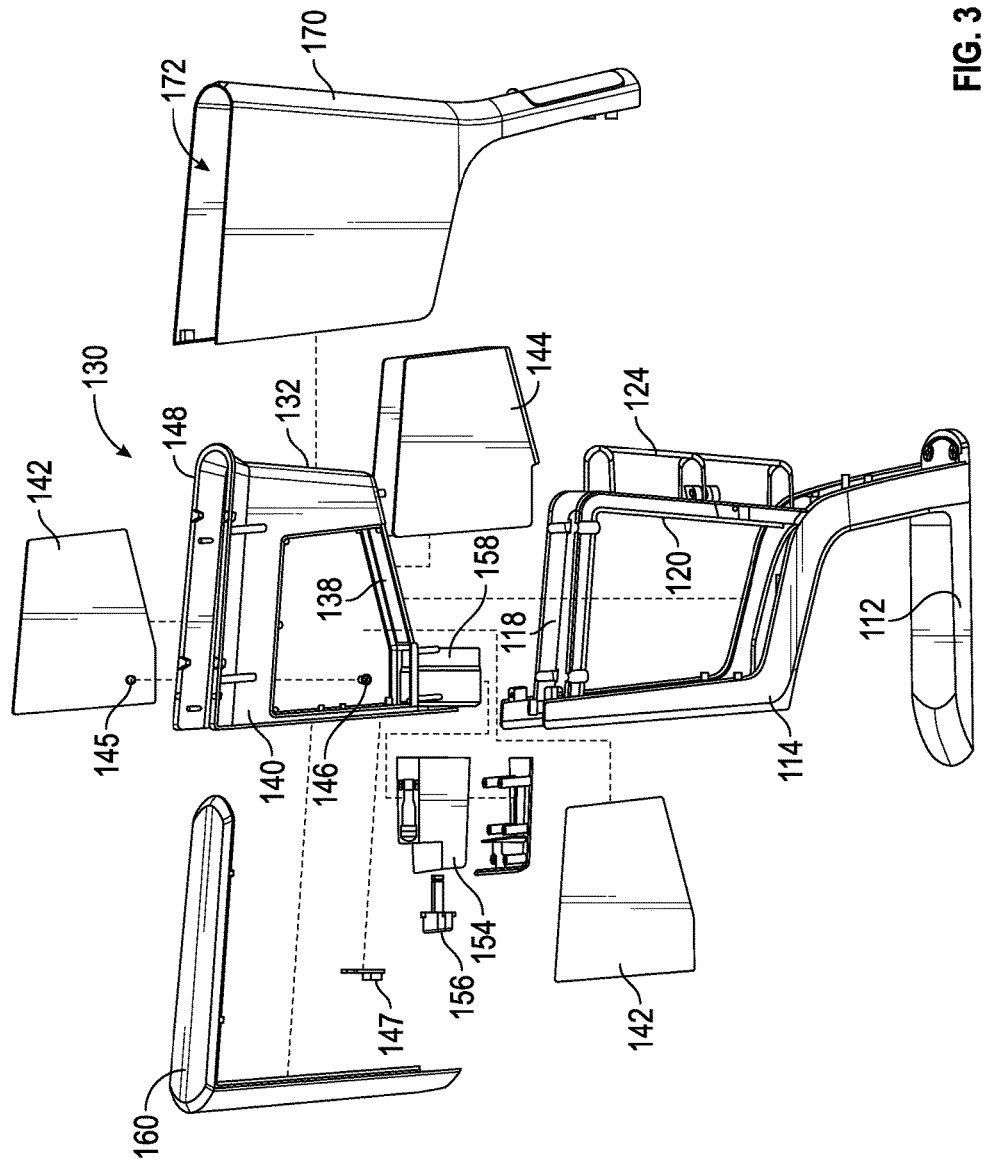
FIG. 3 is an exploded view of the dispenser of FIG. 1, shown according to an exemplary embodiment.

Referring to FIGS. 1-3, a dispenser 100 and components thereof are shown according to an exemplary embodiment. The dispenser 100 is configured to support and dispense flowable food product from a reservoir, shown as bag 200, and includes a frame 110, a front housing 160, and a rear housing 170. The frame 110 may include a base 112 configured to rest upon a surface (e.g., countertop, bar, table, etc.) and an upper portion 114 that is supported by the base 112 and configured to at least partially support the front housing 160, the rear housing 170, and other components of the dispenser 100. A zone 102, generally defined as being above the base 112 of the frame 110 and below the front housing 160 and/or the upper portion 114 of the frame 110, allows for receiving products (e.g., sausage, chips, bowls, etc.) to be placed in appropriate proximity to the dispenser 100 to receive the flowable food product.

The frame 110 includes a support bracket 116 that is supported by the upper portion 114 and configured to at least partially support a pan assembly 130. The support bracket 116 is shown to include a pair of spaced apart top rails 118, a pair of spaced apart rear rails 120 extending downward from the top rails 118, and a cross-member 122 extending between the rear rails 120. A rear portion 124 (e.g., cage, brace, buttress, support, etc.) of the frame 110 supports the rear housing 170. According to the embodiment shown, the rear portion 124 contacts the rear housing 170 to provide stiffness thereto, thus facilitating movement of the dispenser 100 and imparting a feeling of quality to the dispenser 100.

According to the exemplary embodiment shown, the frame 110 is assembled from the plurality of separate components and is configured to be freestanding, i.e., it does not rely upon the front housing 160 or the rear housing 170 to provide support to the frame 110. According to other embodiments, the frame 110 may be formed as a single piece (e.g., cast metal, cast aluminum, injection molded plastic, etc.). Using a metal frame provides greater strength and reduces cracking relative to plastic, thereby reducing downtime of the dispenser 100. Further, the increased strength of the metal frame 110 enables a reduced cross-section of the neck 111 of the frame 110, thereby increasing the fore-aft depth of the zone 102. An increased fore-aft depth of the zone 102 increases the ability to dispense flowable food product onto receiving products having a greater diameter (e.g., the valve may be centered over a larger diameter plate of chips).

The pan assembly 130 may include a body 132 configured to be located between the pair of top rails 118 and the pair of rear rails 120. The pan assembly 130 may include one or more thermally conductive walls or plates and one or more heating elements 144 coupled to the one or more of the walls. As shown, the body 132 includes a bottom wall 134 defining an opening 136. The opening 136 is configured to receive the fitment 210 of the bag 200 (see FIG. 7 for an exemplary embodiment of the bag 200). A sloped wall 138 extends upwardly and rearwardly from the bottom wall 134. The incline of the sloped wall 138 promotes the flow of the flowable food product in the bag 200 down toward the bottom wall 134, opening 136, and the valve, thereby causing a more complete, hands-free evacuation of the bag 200. As shown, the sloped wall 138 is at least partially supported by the cross-member 122.

The pan assembly 130 further includes sidewalls 140 extending upward from the bottom wall 134 and the sloped wall 138 to an upper region 148. The sidewalls 140 include openings or recesses configured to receive the thermally conductive plates 142. The thermally conductive (e.g., metallic, etc.) plates 142 distribute heat from the heating element 144. The heating element 144 is shown to wrap underneath the body 132 and to hold the plates 142 between the heating element 144 and a plurality of clips. One or more of the thermally conductive plates 142 may define a hole 145 configured to receive a temperature sensor 146. Using thermally conductive plates 142 facilitates conducting heat from the heating element 144 to the flowable food product while limiting the temperature rise of other portions of the pan assembly 130, thereby increasing energy efficiency. According to some embodiments, other portions of the pan assembly 130 may be formed of less thermally conducting materials or thermally insulative materials, thereby retaining heat, increasing energy efficiency, and reducing undesirable temperature rise in other portions of the dispenser 100. According to other embodiments, the plates 142 may be the heating elements, and the sleeve (shown as heating element 144) may be a heat conducting or spreading element. According to various embodiments, the heating elements 144 may be of any suitable type (e.g., resistive, inductive, radiant, etc.). According to one embodiment, the heating elements 144 may include electromagnetic coils configured to induce a current, and thereby heat, the plates 142, which in turn conductively heat the flowable food product. Use of induction heating may provide lower energy costs and reduce undesirable temperature rise in other portions of the dispenser 100, for example, plastic and aluminum components (e.g., the housing 160, 170, the frame 110, etc.) will not heat in response to the magnetic field.

The upper region 148 has a structure 150 (e.g., lip, boss, flange, buttress, etc.) configured to be supported by the top rails 118. The upper region 148 includes one or more projections (e.g., bosses, hooks, etc.) shown as studs 152, configured to be received by corresponding support holes 208 provided in the bag 200, thereby allowing the bag 200 to be hung substantially vertically. According to another embodiment, the projections may extend from or be directly coupled to one or more of the top rails 118 of the frame 110. According to another embodiment, the bag 200 may be lowered into the dispenser 100, and the body 130 may be configured to hold the bag 200 in a substantially upright position. For example, the sidewalls of the body 132 (or body 732 of FIG. 4) and/or the heating plates 142,144 may be sufficiently close together so as to laterally support the bag 200 so as to, in cooperation with the bottom wall 134 and the sloped wall 138, hold the bag 200 in a substantially upright or vertical position. According to the exemplary embodiment shown, orienting the bag 200 substantially vertically in combination with resting the bag 200 on the sloped wall 138 promotes a more complete evacuation of the bag 200.

Hanging the bag 200 substantially vertically in a relatively tall narrow cavity and in contact with the thermally conductive plates 142 may increase the surface area relative to volume of the bag 200, and maximizes the direct physical contact between the portions of the bag 200 containing flowable food product and the thermally conductive plates 142. This causes a more efficient heat transfer from the heating elements 144, through the plates 142, through the bag 200, and into the flowable food product, resulting in reduced energy costs and more quickly raising the temperature of the flowable food product to operating temperature. Using a conductive heat transfer method provides a more efficient and consistent temperature in the flowable food product as compared to convection heating used in typical flowable food product dispensers. Further, the vertical orientation of the bag 200 inhibits folding or wadding of the bag 200, which improves evacuation efficiency and reduces air gaps between the bag 200 and the plates 142, thereby improving heat transfer.

Further, by locating the temperature sensor 146 on one of the walls of the pan assembly 130, the temperature sensor 146 is in direct contact with the bag 200, thereby obtaining a more direct and accurate temperature measurement of the flowable food product inside the bag 200 as compared to approximating the temperature of the flowable food product inside the bag 200 based upon a measurement of the temperature of the air in the dispenser 100, as is done in typical flowable food product dispensers. Obtaining a more accurate temperature measurement of the flowable food product facilitates more energy efficient control of the heating elements 144 (e.g., less overheating), maintenance of a more consistent temperature (which may improve flavor consistency), and increased confidence that the flowable food product stays above a minimum safe temperature. The lifespan of the flowable food product once the bag 200 has been opened decreases as the temperature of the flowable food product increases. Accordingly, more accurate and consistent control of the flowable food product to maintain the temperature of the flowable food product just above the minimum safe temperature prolongs the potential dispensing life of the flowable food product. Further, placing the temperature sensor 146 near the opening 136 (e.g. in the bottom wall 134) provides a measurement of the next portion of flowable food product to be served from the dispenser. According to another embodiment, the pan assembly 130 may include multiple heating elements that may be independently controlled, thereby allowing different portions of the flowable food product to be heated differently, and thereby facilitating a more even distribution of temperature throughout the flowable food product. According to one embodiment, a signal from the temperature sensor 146 may cause a display (e.g., LED, LED display 147, LCD display, video screen, etc.) to indicate that the temperature of the flowable food product is within acceptable operating parameters. The display may also be configured to alert a user if power to the dispenser has been disrupted, which could indicate the temperature of the flowable food product fell outside of acceptable temperature ranges. According to various embodiments, components of the dispenser 100 (e.g., heating elements 144, etc.) may be controlled by a control system (e.g., control system 1400, described in more detail below) having processing electronics (e.g., processing electronics 1406, described in more detail below), which may be configured to receive a signal from the temperature sensor 146.

The pan assembly 130 may include a front surface 131. The front surface 131 may include graduated marks 133. The graduated marks 133 indicate to a user the amount (e.g., level, proportion, etc.) of flowable food product remaining in the bag 200. The vertical orientation of the bag 200 and the relatively narrow cavity 172 hold the flowable food product in an orientation that facilitates the use of graduated markings. The graduated marks 133 may be particularly advantageous for determining a usage rate (e.g., ounces per hour, volume per time, etc.) of flowable food product, and, in turn, facilitates determining when to begin heating the next bag of flowable food product. For example, (time to heat a bag of flowable food product to operating temperature) times (usage rate in volume per time of the flowable food product) equals (volume remaining in the dispenser at which point the next bag should begin heating).

An actuator housing 154 may be coupled to the frame 110 and/or the pan assembly 130. The actuator housing 154 passes over a sleeve 158 that extends downward from the opening 136 and is configured to receive the fitment 210. The actuator housing 154 supports an actuator, shown as a button 156, that passes through the sleeve 158 and is interconnected with a valve. The button 156 is configured to receive an actuating force and/or motion from a user and transfer that force or motion to a valve, thereby allowing flowable food product to be dispensed. According to the embodiment shown, the sleeve 158 may extend below the actuator housing 154 to provide a visual indicator to a user of the location of the stream 252 of the dispensed flowable food product. According to other embodiments, the sleeve 158 may not extend below the actuator housing 154 and/or the valve, thereby reducing the likelihood that flowable food product may contact the sleeve 158 during opening or closing of the valve.

The rear housing 170 is supported by the frame 110 and at least partially defines a cavity 172 in which a pan assembly 130 and the bag 200 reside when the bag 200 is in an installed position. The rear housing 170 prevents inadvertent contact with hot components of the dispenser 100. The rear housing 170 may be formed of any suitably durable material, for example, a low-cost, lightweight plastic.

The front housing 160 is also supported by the frame 110. For loading and unloading of the bag 200 into the dispenser 100, the front housing 160 may simply be removed (e.g., lifted off of, etc.) from the frame 110 in order to provide access to the pan assembly 130. According to another embodiment, the front housing 160 may be hingedly coupled to the frame 110.

Figure 4:
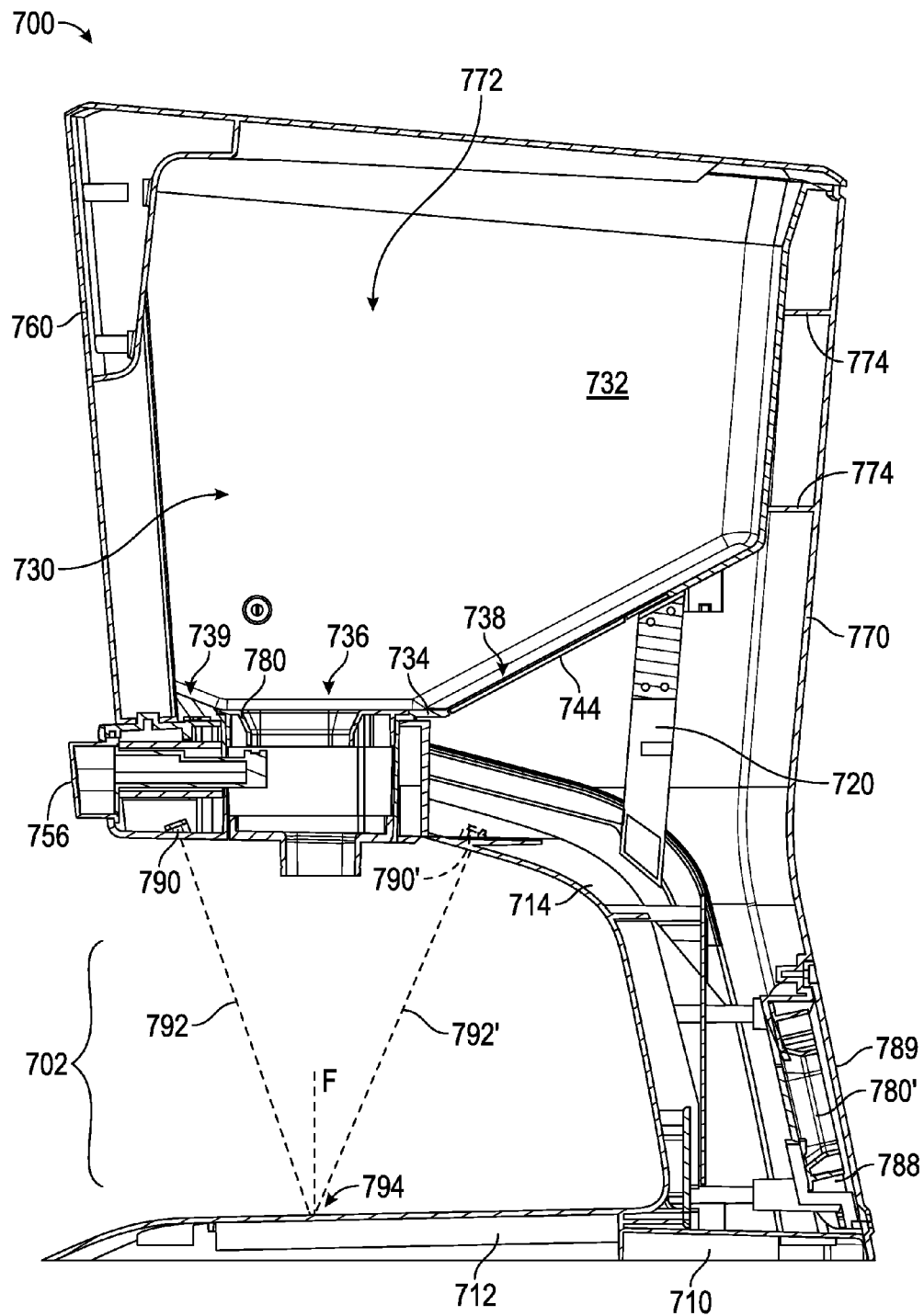
FIG. 4 is a right elevation cross-sectional view of a dispenser, shown according to another exemplary embodiment.
Figure 5:
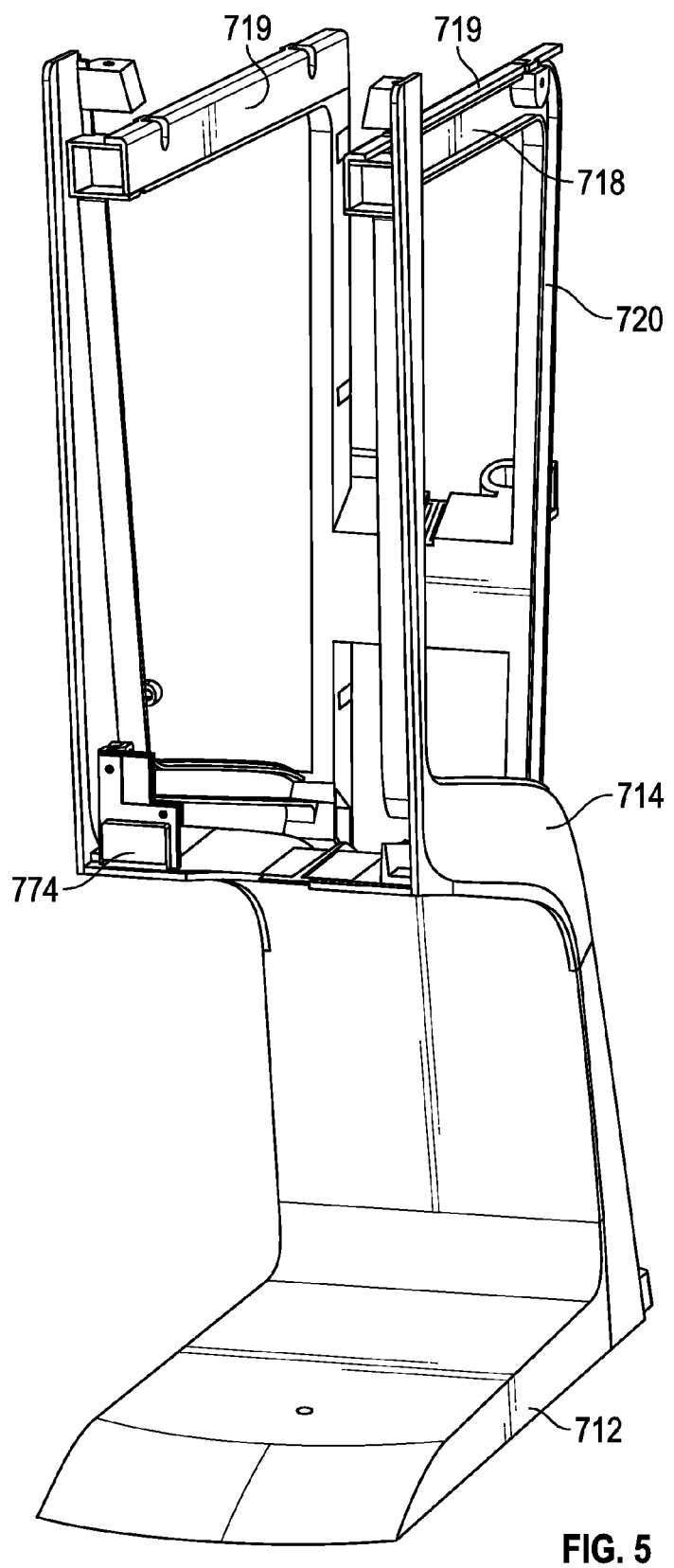
FIG. 5 is a top, front, right perspective view of the frame and some components of the dispenser of FIG. 4, shown according to an exemplary embodiment.
Figure 6:
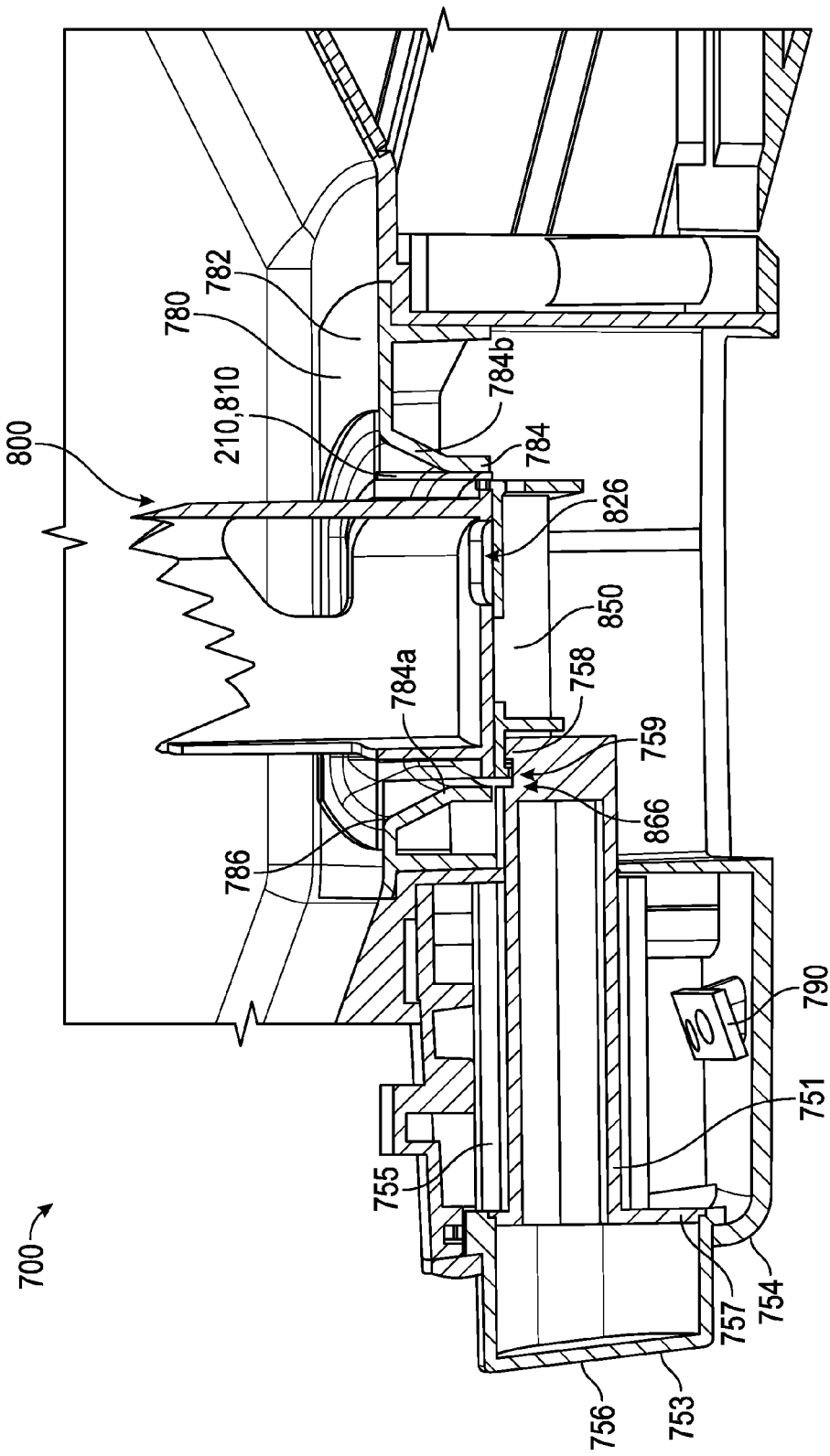
FIG. 6 is an enlarged, right side, cross-sectional perspective view of a portion of the dispenser of FIG. 4, shown according to an exemplary embodiment.
Figure 7:
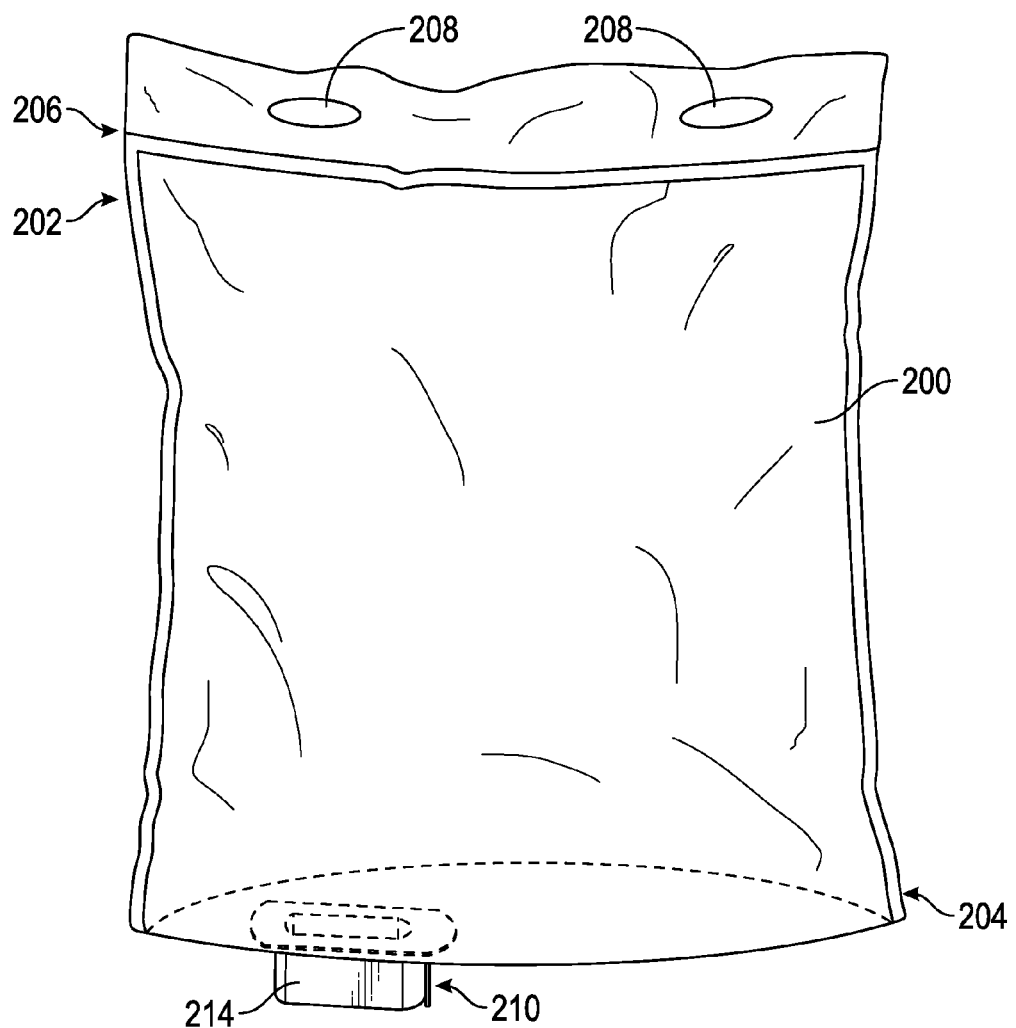
FIG. 7 is schematic perspective view of a reservoir for flowable food products, shown according to an exemplary embodiment.

Referring to FIGS. 4-6, a dispenser 700 and components thereof are shown according to an exemplary embodiment. The dispenser 700 is substantially similar to the dispenser 100 described with respect to FIGS. 1-3, with like numbered reference numerals referring to generally similar components. For example, the dispenser 700 is configured to support and dispense flowable food product from a reservoir, shown as bag 200, and includes a frame 710, a front housing 760, and a rear housing 770. The frame 710 may include a base 712 configured to rest upon a surface (e.g., countertop, bar, table, etc.) and an upper portion 714 that is supported by the base 712 and configured to at least partially support the front housing 760, the rear housing 770, and other components of the dispenser 700. A zone 702, generally defined as being above the base 712 of the frame 710 and below the front housing 760 and/or the upper portion 714 of the frame 710, allows for receiving products (e.g., sausage, chips, bowls, etc.) to be placed in appropriate proximity to the dispenser 700 to receive the flowable food product. Some of the features of the dispenser 700 will be described below, and it is contemplated that various combinations of the features of the dispensers 100, 700 may also be constructed.

The dispenser 700 is shown not to include a rear portion (compare rear portion 124 in FIG. 3) of the frame 710. Instead, the rear housing 770 includes a plurality of ribs 774. According to the exemplary embodiment, the ribs 774 extend horizontally inward from the outer wall of the rear housing 770. The ribs 774 of the exemplary embodiment have a substantially "C" or "horseshoe" shape such that they may extend around the body 732 of the pan assembly 730. According to one embodiment, the ribs 774 and the body 732 contact so as to provide mutual support and rigidity to the dispenser 700. According to one embodiment, the ends of the ribs 774 (i.e., the heels of the horseshoe) may contact the rear rails 720 of the frame 710, thereby providing support and rigidity to the rear housing 770.

The dispenser 700 includes a pan assembly 730, a body 732 of which may be supported by and located between the pair of top rails 718 and the pair of rear rails 720. The pan assembly 730 is shown to be formed of as a single piece. The continuous, smooth opening of a single body 732 facilitates cleaning and heat distribution, and reduces the possibility of the bag 200 snagging during insertion; however, it is contemplated that the pan assembly 730 may be formed of multiple pieces (see, e.g., plates 142 in FIGS. 2-3). According to the exemplary embodiment, the body 732 may be formed of a thermally conductive material (e.g., metal, aluminum, thermally conductive plastic, etc.). One or more thermally insulative inserts 719 may be used to space apart and/or insulate the body 732 from the frame 710 and the housings 760, 770, which may reduce the external surface temperature of the dispenser 700 and increase the efficiency of the heat transfer from the pan assembly 730 to the bag 200. One or more heating elements 744 may be thermally coupled to the body 732. As shown, the heating element 744 may be a heating pad wrapped at least partially around the body 732 such that heat from the heating element 744 conducts through the body 732 and the bag 200 into the flowable food product.

The body 732 is shown to include a bottom wall 734 defining an opening 736. The opening 736 is configured to receive the fitment 210 of the bag 200 (see FIG. 7 for an exemplary embodiment of the bag 200). A rear sloped wall 738 extends upwardly and rearwardly from the bottom wall 734, and a front sloped wall 739 extends upwardly and forwardly from the bottom wall 734. The incline of the sloped walls 738, 739 promotes the flow of the flowable food product in the bag 200 down toward the bottom wall 734, opening 736, and the valve, thereby causing a more complete, hands-free evacuation of the bag 200.

As shown, a fitment acceptor 780 is received in the opening 736. The fitment acceptor 780 includes an upper flange 782 and one or more sidewalls 784 (shown to include forward sidewall 784a and rearward sidewall 784b) extending down from the upper flange 782. The interface 786 (e.g., corner, edge, etc.) between the upper flange 782 and the sidewalls 784 is chamfered (e.g., angled, softened, rounded, etc.) to guide the fitment 210 and/or valve 300, 400, 500, 800 into an installed position when the bag 200 is lowered into an installed position. According to the exemplary embodiment shown, the forward sidewall 784a and the rearward sidewall 784b have different radii of curvature, each of which corresponds to a radius of curvature at the respective front and rear ends of the fitment 210. Accordingly, the differing and corresponding radii prevent the fitment 210, and therefore the bag 200, from being improperly installed (e.g., backwards). Further, the particular shape of the fitment acceptor may inhibit an improper product (e.g., chili versus cheese, plain versus jalapeño, etc.) from being installed into the dispenser 700, if the various products include differently shaped fitments. According to the embodiment shown, the upper flange 782 of the fitment acceptor 780 sits flush with the bottom wall 734 to prevent snagging of the bag 200, and my be removed from the dispenser 700 to facilitate cleaning. According to the embodiment shown, a second acceptor 780' may be stored in a compartment 788 at the rear of the dispenser 700. The second acceptor 780' may be a spare acceptor 780, or may have a different shape for receiving different flowable food products. As shown, a cosmetic cover 789 may be coupled to the rear housing 770 to support and conceal the second acceptor 780' and to conceal fasteners holding the dispenser 700 together.

During installation of the bag 200, the front housing 760 may be removed from the frame 110 or rotated out of position to expose the cavity 772. A bag 200 in the dispenser 700 may be lifted out of the cavity 772, and another bag 200 may be lowered into the cavity 772. The chamfered interface 786 guides the fitment 210 into an installed position. Accordingly, the user may hold the bag 200 only from the top and need not touch or manipulate the fitment. This advantageously improves hygiene by reducing touching of the fitment and keeps the user's hands away from the pan body 732 to facilitate hot swapping of the bag 200.

Referring to FIG. 6, an enlarged perspective view of a portion of the dispenser 700 is shown, according to an exemplary embodiment. FIG. 6 is shown to include a valve 800 (to be described in more detail below) in an installed position, with a transparent fitment 210, 810 but without the bag 200. As shown, the slider 850 of the valve 800 is in a first or closed position, but may be moved to a second or open position.

The dispenser 700 includes an actuator housing 754, which supports an actuator, shown as a button 756. The button 756 is shown to include a plunger 751 and a cap 753. Forming the button 756 of two pieces enables different colored or textured caps to be used on the button 756, for example, to indicate different types or flavors of flowable food product. According to other embodiments, the button 756 may be a unitary piece.

The button 756 is configured to receive an actuating force and/or motion from a user and transfer that force or motion to the valve 800, thereby allowing flowable food product to be dispensed. According to the embodiment shown, the actuating force is a press (e.g., depress, push, etc.), but other embodiments are contemplated in which the actuation force is a pull or turn.

A spring 755 extends between a flange or ledge 757 on the button 756 and a rear wall of the actuator housing 754. The spring 755 causes the button 756 and the valve 800 to return to a closed position when the actuating force is reduced or removed from the button 756. Accordingly, because the spring 755 is part of the actuator assembly and acts on the button 756, no spring is needed on the valve 800. This can reduce the complexity of the valve, reduce the part cost of the valve, and reduce the possibility of the spring being contaminated with flowable food product, which may reduce the spring's ability to operate. As will be described below, the plunger 751 is configured to engage the valve 800 to both push the valve 800 open and pull the valve 800 closed. According to another embodiment, a second plunger may be located behind the valve, opposite the plunger 751 and spring loaded in the same direction. In such an embodiment, a spring attached to the second plunger is compressed by the slider of the valve when the valve is moved toward the open position, and the spring attached to the second plunger pushes the valve closed when opening force is removed from the plunger 751. Having two springs distributes the resisting load, allowing for smaller springs, and enables different spring rates to be chosen for the two springs to calibrate the feel of the actuation versus closing of the valve.

The forward sidewall 784a and the corresponding interface 786 of the fitment acceptor 780 extend over the plunger 751 and away from the rear wall of the actuator housing. Accordingly, the fitment acceptor acts as a guard (e.g., shade, umbrella, etc.) to divert any spilled flowable food product away from the plunger 751 and any joints in the housing, thus increasing hygiene and facilitating cleanup.

The actuator housing 754 is further shown to include a mount 790 configured to receive a light (LED, laser, bulb, etc.; not shown). Referring to FIG. 4, the mount 790 orients the light such that a beam 792 of light illuminates the base 712 to create an indicated spot 794. As shown, the indicator spot 794 is directly below the opening 736 or the opening 826 (e.g., passageway) of the valve 800. Accordingly, a user is directed where to place the receiving product to receive the flowable food product without having to look under the dispenser 700 to see the outlet. According to another embodiment, the mount 790 may orient the beam 792 such that the beam intersects an axis F extending down from the opening 736 at a predetermined height above the base 712. For example, the beam 792 may be oriented to illuminate an area on the top of a receiving product directly below the opening 736 resting on the base 712. According to one embodiment, the beam 792 is oriented to intersect the axis F at a height of between approximately 3 to approximately 4 inches (e.g., between approximately 7 and 10 cm) above the surface of the base 712. As shown, the mount 790 is located such that the beam 792 is oriented at a steep angle relative to the axis F. The steep angle reduces the horizontal distance differential between the area of the base 712 illuminated by the beam 792 and the area of the receiving product illuminated by the beam 792, thereby increasing the accuracy of the indication of where the flowable food product will land when dispensed.

According to another embodiment, the beam 792 may be diffuse such that an area on the top surface of the receiving product along axis F is illuminated. For example, the beam 792 may form a cone, and the cone may be oriented that the axis F extends within the cone up to a height of approximately 3 inches to approximately 4 inches (e.g., approximately 7 to 10 cm) above the surface of the base 712. According to another embodiment, the dispenser 700 may include a second mount 790' configured to orient a second light to project a second beam 792'. According to various embodiments, the first and second beams 792, 792' may be oriented to intersect at the indicated spot 794, or at a distance above or below the surface of the base 712 along the axis F. The first and second beams 792, 792' may be oriented to illuminate the base 712 at symmetrically opposite sides of the axis F. Accordingly, the axis F would remain between the two illuminated points or areas, regardless of the height of the receiving product, thereby providing a user an indication of where the flowable food product will land on the receiving product.

Referring to FIG. 7, a reservoir, shown as bag 200, for a flowable food product is shown according to an exemplary embodiment. As shown, the bag 200 includes a top portion 202 and a bottom portion 204. A fitment 210 is coupled to the bottom portion 204 of the bag 200, preferably towards one side so that when the bag 200 is in an installed position, the fitment 210 may be located proximate the opening 136, and the bottom portion 204 of the bag 200 may be supported in an inclined fashion on the sloped wall 138. The fitment 210 includes a flange 212, which is coupled to the bag 200, and an outwardly extending wall 214 extending outward from the bag 200. A central portion of the fitment 210 is open so as to define a portion of the bag 200 that is accessible through the fitment 210. According to one embodiment, the bag 200 is sterilized and then filled with the flowable food product through the fitment, and a cap is placed on the fitment 210 to seal the bag 200. According to the embodiment shown, the bottom portion 204 is a closed portion, and the flowable food product is placed in the bag 200 through the top portion 202, which is then sealed shut (e.g., via welding, adhesive, etc.) at line 206. An aperture may then be formed into (e.g., through the sidewall of) the bag 200 to allow flowable food product to exit the bag 200. According to an exemplary embodiment, the aperture is formed in the portion of the bag 200 that is accessible through the fitment 210. One or more holes 208 may be formed in the bag 200 in the top portion 202 above the line 206, i.e., in a portion of the bag that does not contain flowable food product. Utilizing gravity, the bag 200 may be hung in the dispenser 100 by placing the studs 152 of the pan assembly 130 through the holes 208. In an installed position, the bag 200 is located in the dispenser 100 such that the outwardly extending wall 214 of the fitment 210 passes at least partially through the opening 136.

Figure 8:
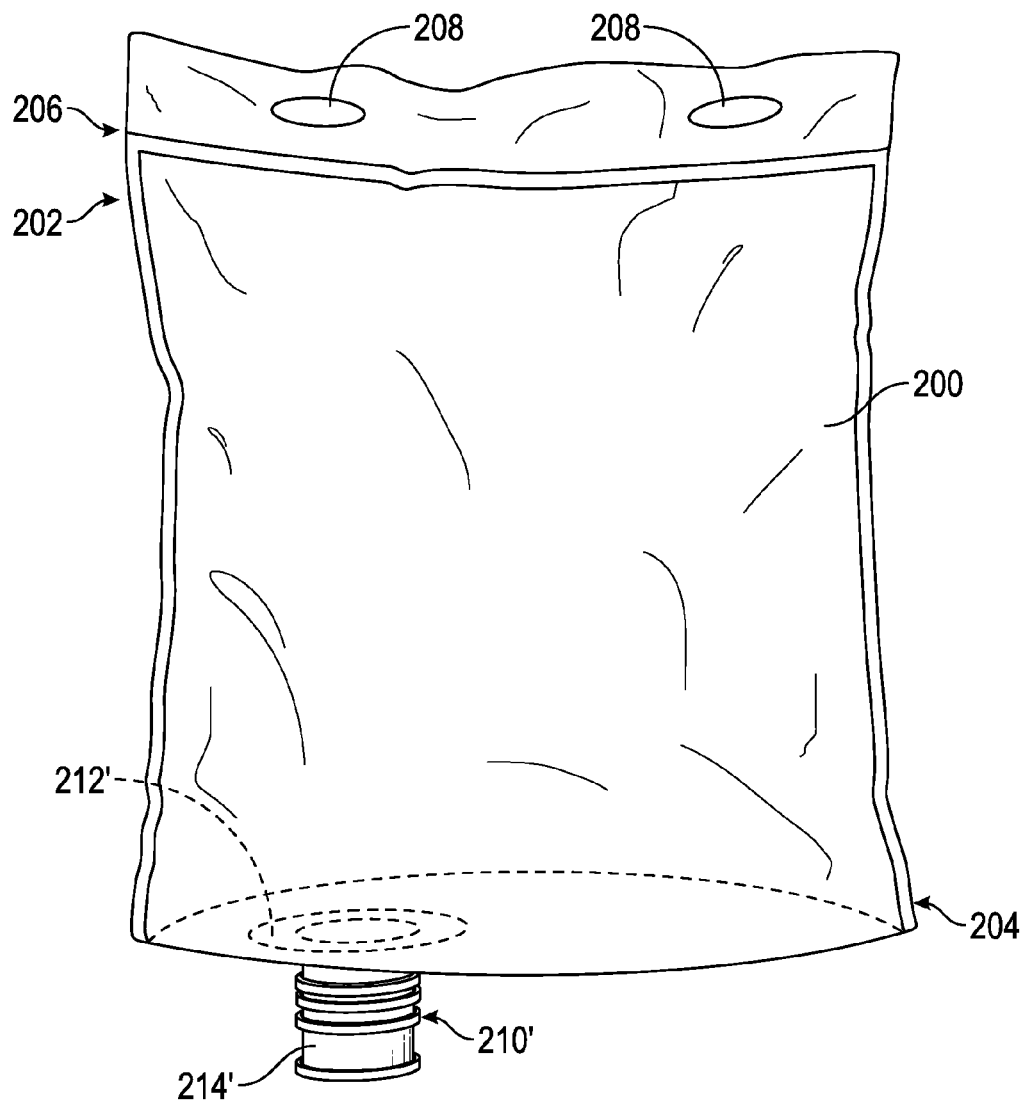
FIG. 8 is schematic perspective view of a reservoir for flowable food products, shown according to another exemplary embodiment.
Figure 9:
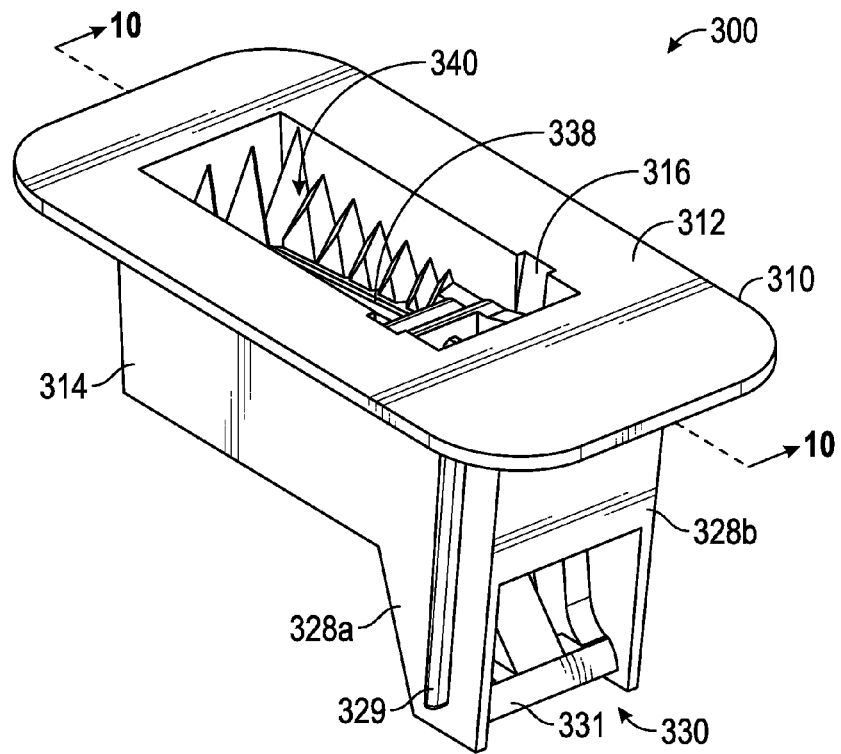
FIG. 9 is a top, front, left perspective view of a valve, shown according to an exemplary embodiment.
Figure 10:
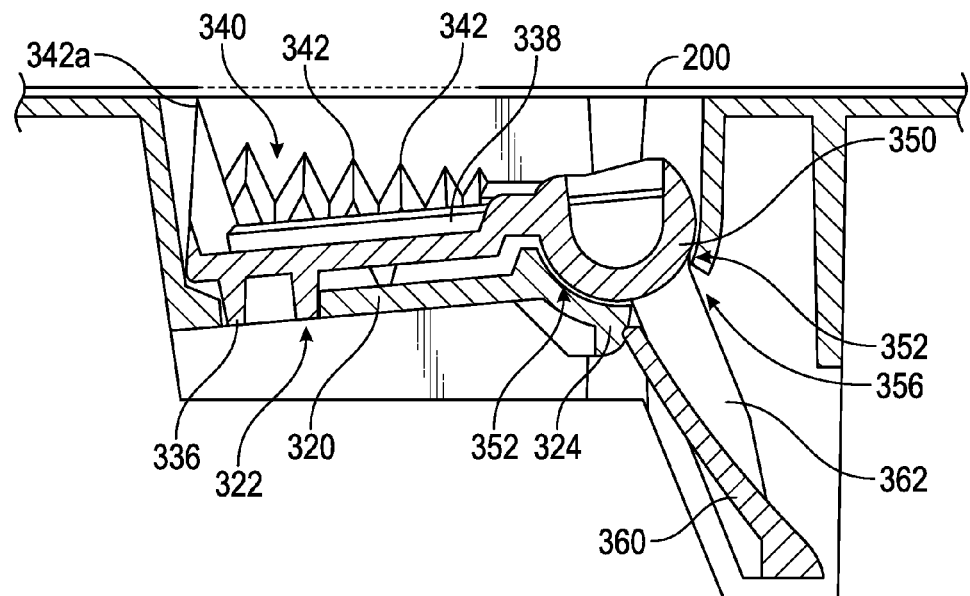
FIG. 10 is a left elevation view of the valve of FIG. 9, sectioned through line 10-10 and showing the valve in a closed position, according to an exemplary embodiment.
Figure 11:
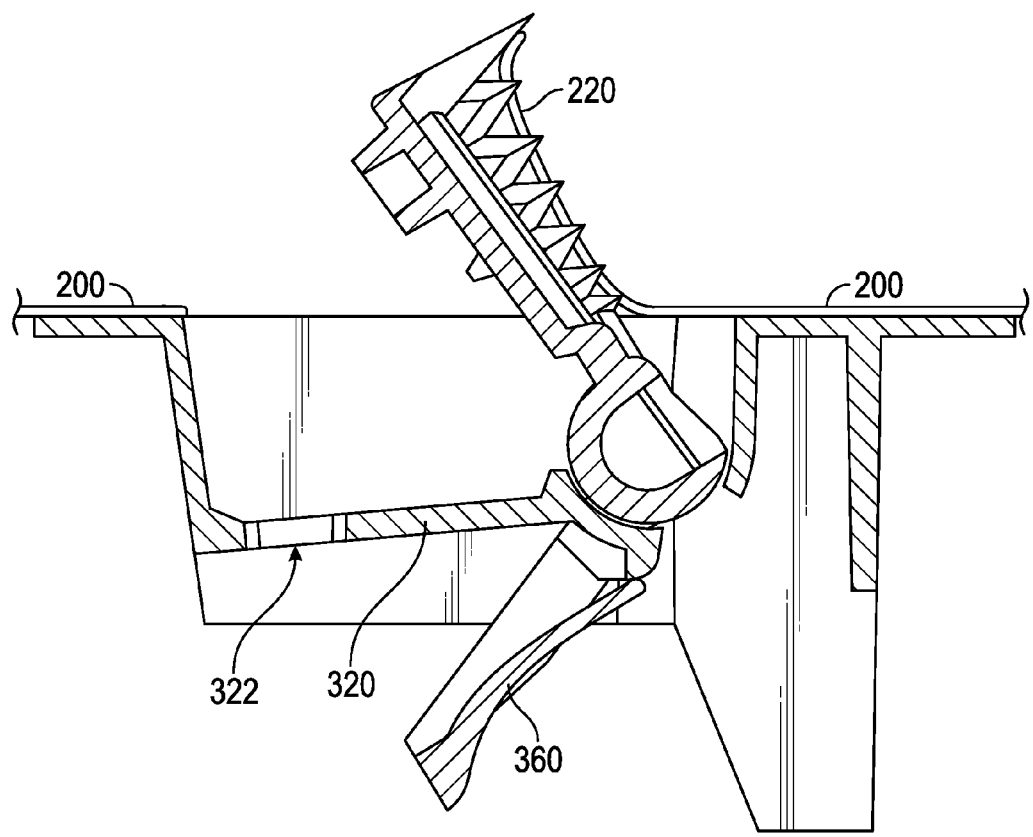
FIG. 11 is a left elevation view of the valve of FIG. 9, sectioned through line 10-10 and showing the valve an open position, according to an exemplary embodiment.

Referring briefly to FIG. 8, a conventional fitment 210' is shown, according to an exemplary embodiment. The fitment 210' includes a flange 212', which is coupled to the bag 200, and an outwardly extending wall 214' extending outward from the bag 200. While several fitments (e.g., fitments 210, 210', 310, 410, 510, 810, 1010, etc.) are shown and described in this specification, fitment 210 may be used generically for the purposes of simplification.

A valve 300, 400, 500, 800, 1000 may be coupled to the fitment 210 to selectively allow flowable food product to flow from the bag 200 through the valve 300, 400, 500, 800, 1000. As will be described in more detail below, the valves may be integrated into the fitment 210. That is, the valve 300, 400, 500, 800, 1000 may be part of the fitment 210 when the fitment is coupled to the bag 200 or the valve may be part of the cap used to seal the bag 200 closed, such that the customer receives a bag 200 with fitment 210 and valve 300, 400, 500, 800, 1000 attached. According to other embodiments, the valve 300, 400, 500, 800, 1000 may be coupled to the fitment 210. That is, the valve 300, 400, 500, 800, 1000 may be a separate component that may be snapped or screwed onto the fitment 210 by the customer.

While many valves, both novel and known in the art, may be used with the bag 200 and the dispenser 100, 600 described herein, five exemplary embodiments of valves will be described in detail below. Each of the valves 300, 400, 500, 800, 1000 is a gravity fed valve. That is, there is no pump required, thereby reducing the production and operating costs of the dispenser 100 while increasing reliability. Each of the valves 300, 400, 500, 800, 1000 is configured to permit the flowable food product to fall straight down from the bag 200 to the receiving product. Such a straight drop facilitates better evacuation of the bag 200 and reduced loss of flowable food product left outside of the bag in hoses or tubes. The straight drop also facilitates a more instant dispensing of the bag, without having to fill or prime the system (e.g., tubes, hoses, valves, pumps, etc.) before the flowable food product is dispensed, thereby resulting in quicker confirmation that the bag is installed properly and overall faster bag exchanges. The valves 300, 400, 500, 800 are configured to minimize the distance between the valve and the bag 200, which keeps the valves closer to the heating element and reduces the amount of flowable food product that is in the system (e.g., tubes, hoses, etc.) but thermally remote from the heating element, thereby facilitating maintenance of the flowable food product within acceptable operating temperatures and dispensing of more consistent flowable food product.

Referring to FIGS. 9-15, a valve 300 is shown to be integrated with the fitment 310, according to an exemplary embodiment. The fitment 310 has an outward extending sidewall 314 and a flange 312 that permanently couples the bag 200 using an adhesive or welding process. The fitment 310 further includes a bottom wall, shown as floor 320, having an opening 322 (e.g. passageway, conduit, etc.) extending therethrough. The valve 300 further includes a lever 330 (best seen in FIG. 13) including a first lever arm 331 and a second lever arm 332. The lever 330 includes a pair of pegs 334 (e.g., protrusions, bosses, etc.) that define an axis A about which the lever 330 can be rotated. According to the exemplary embodiment, the axis A is positioned outside of the bag 200 and does not pass through the bag 200 (e.g., the axis A is substantially perpendicular to the bag 200, is not a twist cap, etc.). During assembly, the pegs 334 are received in complementary slots 316 (e.g., groove, channel, etc.) that are defined on an inner portion of the sidewall 314 of the fitment 310. The slots 316 include a detent 318 (shown, for example, in FIG. 14) to inhibit removal of the lever 330 from the fitment 310.

The first lever arm 331 is configured to receive an actuating motion from the user (for example, via the button 156 on the dispenser 100) and transfer that motion to the second lever arm 332. Accordingly, the lever 330 rotates between a first position, shown for example in FIG. 10, in which the valve 300 is closed, and the second position, shown for example in FIG. 11, in which the valve 300 is open. According to the embodiment shown, an upper side of the second lever arm 332 includes a piercing portion 340 configured to pierce (e.g., tear, rip, open, cut, puncture, etc.) the bag 200 and a lower side of the second lever arm 332 includes plunger 336 (e.g., plug, stopper, etc.) configured to seal the opening 322. Accordingly, the second lever arm 332 is configured to both initially pierce the bag 200 during the first actuating motion by the user and to remove a plunger 336 (e.g., plug, stopper, etc.) from an opening 322, thereby allowing flowable food product to exit the bag 200 through the valve 300. According to various embodiments, the bag 200 may be shipped with the valve 300 closed and the fitment 310 permanently coupled to the bag 200 such that the piercing portion 340 remains sterile.

Piercing portion 340 is shown to include a plurality of teeth 342 to pierce the bag 200 and form a substantially U-shaped rip therein. The U-shaped rip in the bag 200 forms a flap 220 which remains attached the bag 200 and, therefore, does not create a free-floating piece of material in the flowable food product. Further, as shown, in FIG. 11, the flap 220 remains on top of the second lever arm 332 and is thereby moved out of the way of the valve opening 322 during every actuation of the valve 300.

Figure 12:
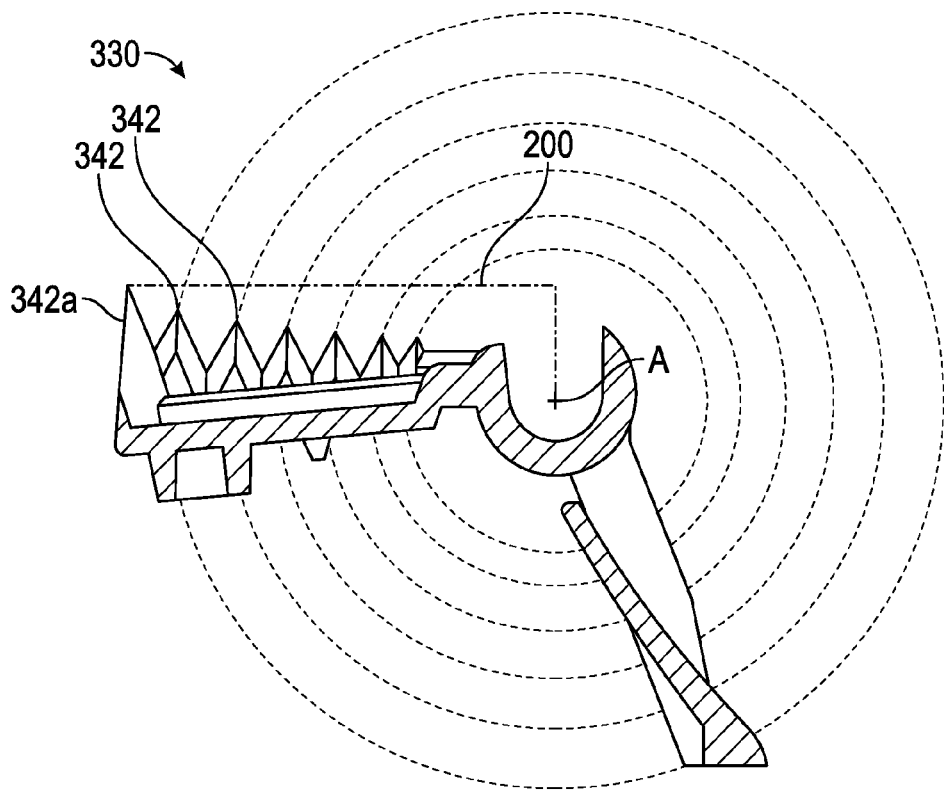
FIG. 12 is a left elevation view of a lever of the valve of FIG. 9, sectioned through line 10-10, shown according to an exemplary embodiment.
Figure 13:
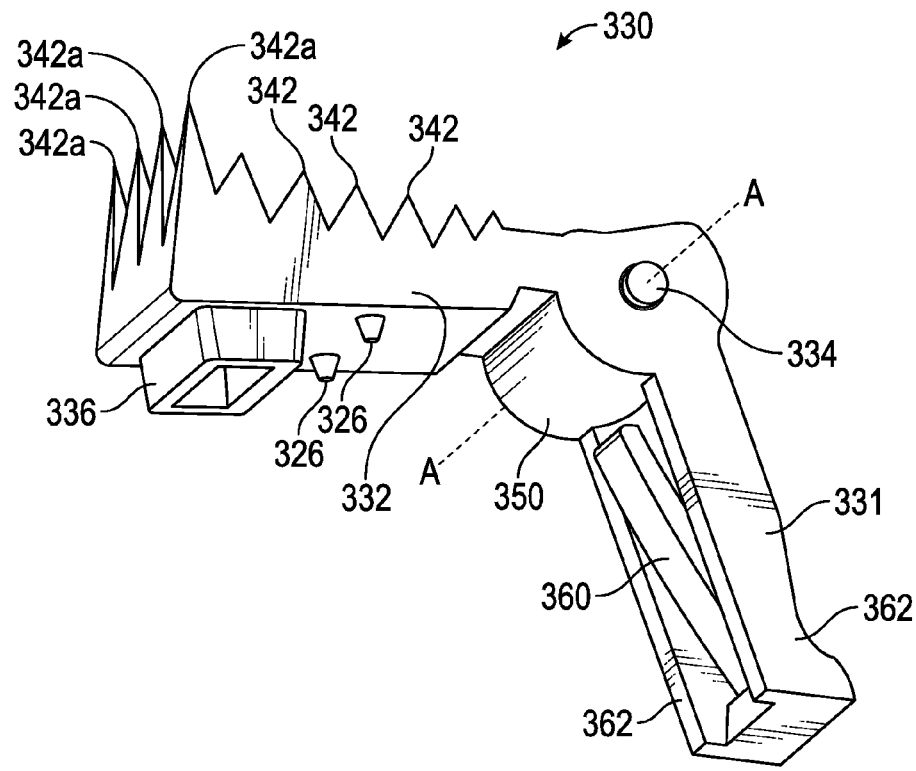
FIG. 13 is a bottom, rear, left perspective view of a lever of the valve of FIG. 9, shown according to an exemplary embodiment.
Figure 14:
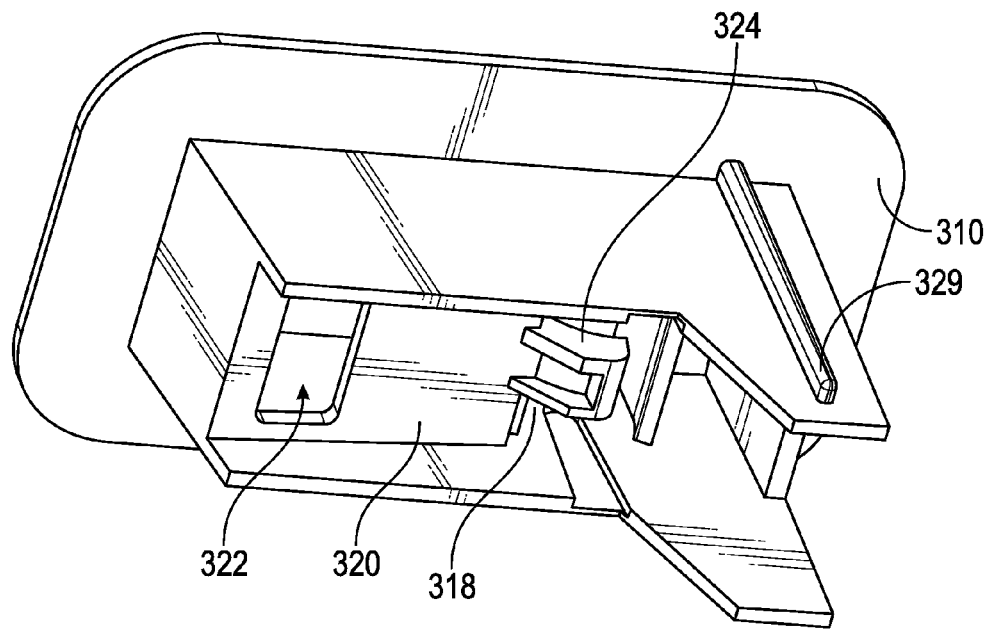
FIG. 14 is a bottom, rear, left perspective view of the fitment of the valve of FIG. 9, shown according to an exemplary embodiment.
Figure 15:
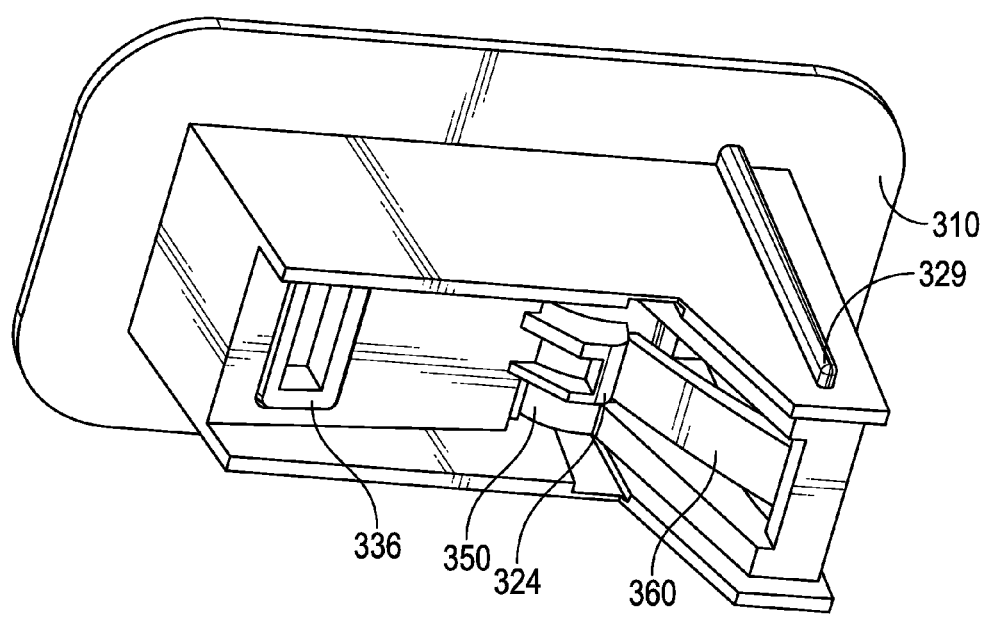
FIG. 15 is a bottom, rear, left perspective view of the valve of FIG. 9, shown according to an exemplary embodiment.
Figure 17:
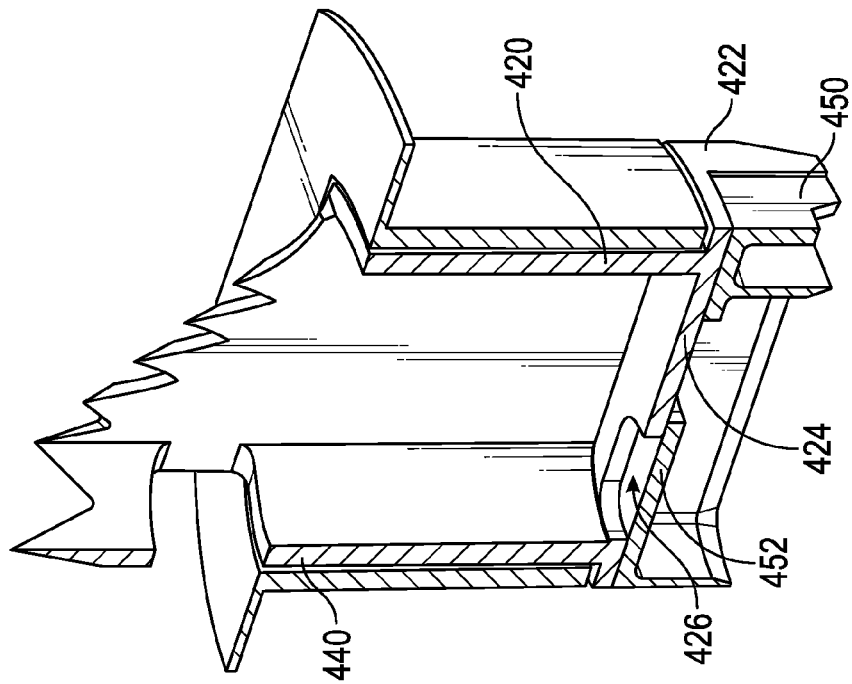
FIG. 17 is a top, front, left perspective view of the valve of FIG. 16, sectioned through line 17-17, shown according to an exemplary embodiment.

As shown, for example, in FIG. 12, the plurality of teeth 342 are shaped so that each individual tooth is substantially perpendicular to the surface of the bag 200 when the tooth 342 makes contact with the bag 200 as it strikes to cut. The teeth 342 are further configured to contact the bag 200 sequentially, thereby reducing the contact area and increasing the piercing/tearing pressure at each tooth 342. According to a preferred embodiment, the teeth 342 have a substantially triangular or pyramidal shape having an angle more acute than 55 degrees. A subset of the plurality of teeth 342 includes one or more first teeth 342a (e.g., front teeth, long teeth, etc.), which are located farthest from the axis A of rotation of the lever 330. The first teeth 342a are longer than the other teeth 342 which are closer to the axis A. The first teeth 342a pierce the bag 200 first, and once the bag 200 is pierced, it is easier for the remaining teeth 342 to continue to rip the bag 200. One or more ribs 338, shown in FIGS. 9 and 10 to extend longitudinally along the second lever arm 332, provide added strength during the piercing of the bag 200.

Accordingly, the valve 300 performs the dual function of first creating an opening in the sealed, sterilized bag 200 and then selectively opening the valve 300 to dispense the flowable food product from the bag 200, using the same motion. That is, the initial actuation of the valve 300 both opens the bag 200 and dispenses the flowable food product. Accordingly, installation of the bag 200 into the dispenser 100 is simplified, and the bag 200 remains sealed as long as possible to retain freshness of the flowable food product.

Referring to FIGS. 9 and 13-15, the lever 330 includes a substantially cylindrical (e.g., round, arcuate, curved, etc.) body portion 350 that is substantially coaxial with axis A. The cylindrical body portion 350 is received by a generally cylindrical (e.g., round, arcuate, curved, etc.) portion 352 of the fitment 310. The cylindrical portion 352 includes an inner surface of an inner wall 354 and an inner surface of a tab 324 that extends from the floor 320 of the fitment 310. A gap 356 between the tab 324 and the inner wall 354 permits the first lever arm 331 to pass therethrough. The interface of the cylindrical body portion 350 and the cylindrical portion 352 provides a seal throughout the rotational range of the lever 330.

One or more feet 326 extend downward from the second lever arm 332 to space the second lever arm 332 apart from the floor 320 of the fitment 310. Providing a gap between the floor 320 and the second lever arm 332 facilitates closure of the valve 300 (i.e., entry of the plunger 336 and to the opening 322) despite the presence of flowable food product, or particulates therein, between the second lever arm 332 and the floor 320, thereby reducing inadvertent drips of flowable food product from the dispenser 100. For example, the feet 326 help to prevent the valve 300 from being stuck open by particulates (i.e., beans, meat, chili sauce, chili cheese sauce, etc.) in the flowable food product between the second lever arm 332 and the floor 320.

The valve 300 includes a spring configured to prevent the valve 300 from opening accidentally and to ensure that the plunger 336 returns into the opening 322, thereby stopping the flow of the flowable food product when the button 156 is released. According to the exemplary embodiment, the spring includes a resilient member, shown as finger 360, extending from the first lever arm 331. The finger 360 contacts and pushes against a tab (e.g., flange, member, tab 324, etc.) near the axis A of rotation in order to provide a closing force (e.g. pushback) in response to a small deflection, thereby improving the lifespan of the finger 360. Attaching the finger 360 to the bottom of the first lever arm 331 facilitates assembly of the lever 330 into the fitment 310. That is, the finger 360 deflects and snaps into position after insertion into the fitment 310 through the gap 356.

A pair of beams 362 of first lever arm 331 are located on either side of the finger 360 to protect the finger 360 from interference. While the finger 360 contacts the tab 324, the beams 362 pass along either side of the tab 324 allowing rotation of the lever 330.

As shown, the first lever arm 331 extends at an angle forward of vertical, which allows a greater angle of rotation of the lever 330 before the first lever arm 331 extends below the opening 322 and into the stream of flowable food product. According to the exemplary embodiment shown, when lever 330 is in the first position, the first lever arm 331 extends forward at an angle of approximately 22 degrees from the vertical. Accordingly, based on the length of the first lever arm 331, the lever 330 may rotate approximately 60 degrees without the first lever arm 331 interfering with the stream of flowable food product from the dispenser 100. For the length of the second lever arm 332 shown, rotation of about 60 degrees provides sufficient clearance for flowable food product to pass under the second lever arm 332 and out through the opening 322.

Shrouds 328, shown as left shroud 328a and right shroud 328b, extend downward from the sidewalls 314 of the fitment 310 to protect the first lever arm 331 from lateral forces and from accidental operation. One or more ribs 329 extend substantially vertically along the shroud 328 to provide strength to the shroud 328 and to facilitate alignment of the fitment 310 into the opening 136 during installation of the bag 200 into the dispenser 100.

Referring to FIGS. 16-25, a second valve 400 is shown integrated into a fitment 410, according to an exemplary embodiment. The fitment 410 has a flange 412 which is permanently coupled to the bag 200 and one or more outwardly extending sidewalls 414 substantially defining a bore or shaft. The shape of the sidewall 414 (e.g., periphery, cross-section, plan view, etc.) may be configured to facilitate alignment or engagement of the fitment 410 to the opening 136 of the dispenser 100. A probe 420 is shown to have a base 422, including an upper wall 424 through which an opening 426 (e.g. passageway, conduit, etc.) extends, and a piercing portion 440 extending upward from the base 422 and configured to slide axially through the bore of the fitment 410 to pierce the bag 200.

Figure 21:
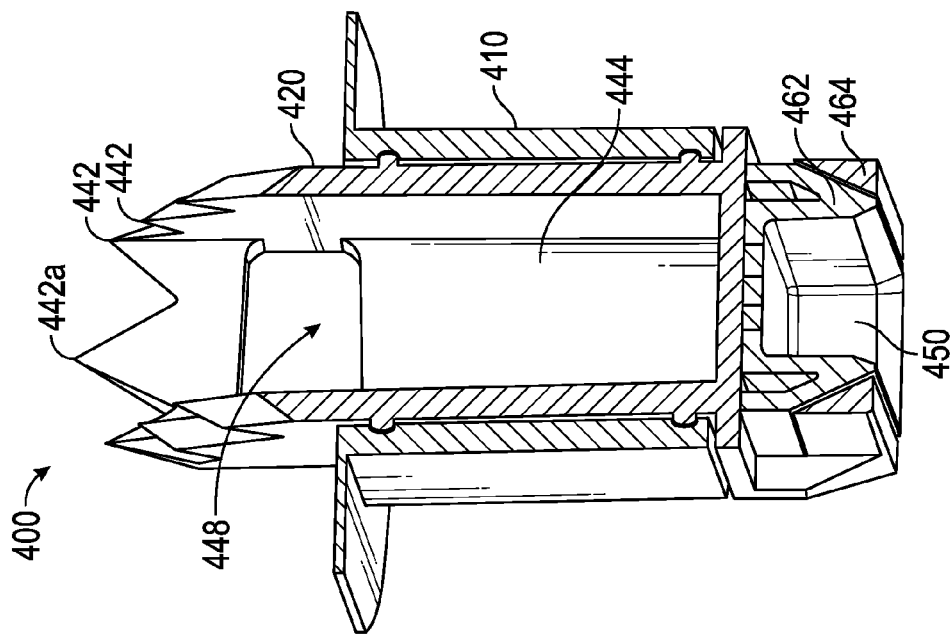
FIG. 21 is a bottom, front, left perspective view of the valve of FIG. 16, sectioned through line 21-21 and shown in an operating position, according to an exemplary embodiment.
Figure 20:
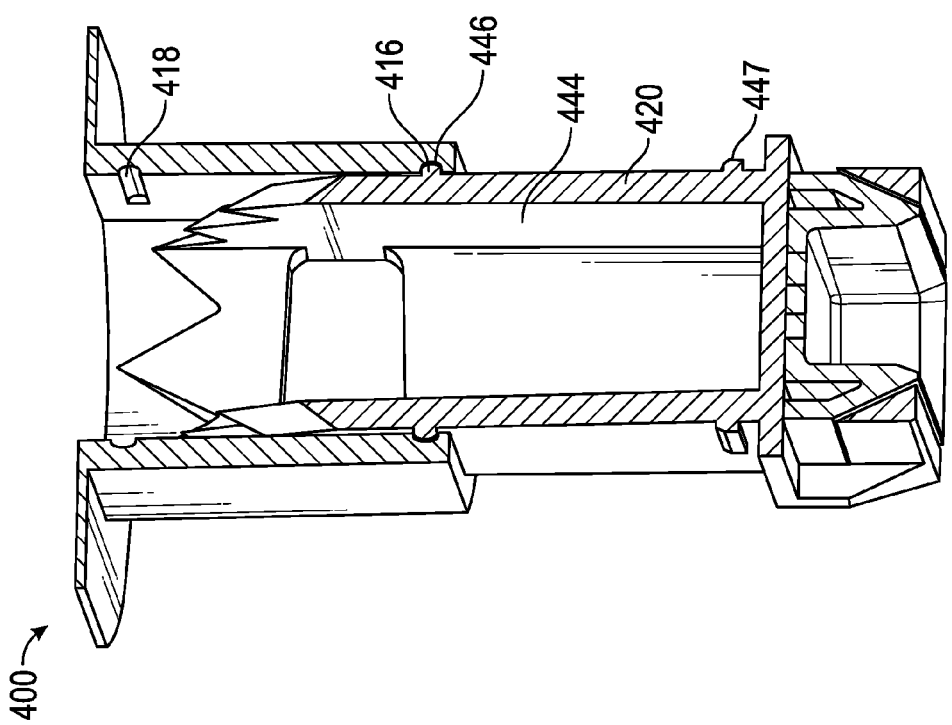
FIG. 20 is a bottom, front, left perspective view of the valve of FIG. 16, sectioned through line 21-21 and shown in a shipping position, according to an exemplary embodiment.

Referring to FIGS. 20 and 21, the probe 420 moves axially between a first or shipping position (shown for example in FIG. 20), in which the working end of the piercing portion 440 is contained within the fitment 410, and a second or operating position (shown for example in FIG. 21) in which the working end of the piercing portion 440 extends from the fitment 410 so as to pierce the bag 200. The piercing portion 440 includes a sidewall 444 configured to slide within the sidewall 414 of the fitment 410. Piercing portion 440 may include a first rib 446 configured to engage a first groove 416 in the sidewall 414 of the fitment 410. The engagement of the rib 446 in the groove 416 acts as a detent holding the probe 420 in the shipping position. Piercing portion 440 is further shown to include a second rib 447 that engages the groove 416 to secure the probe 420 in the operating position. According to the embodiment shown, the sidewall 414 may define a second groove 418 to receive the first rib 446 to further secure the probe 420 in the operating position.

When the probe 420 moves from the shipping position to the operating position, teeth 442 of the piercing portion 440 pierce and rip open the bag 200. The teeth 442 are shown to include a first tooth 442a that is taller than the remaining teeth 442. The first tooth 442a is closest to the bag 200 when the probe 420 is in the shipping position than are the remainder of the teeth 442. Accordingly, the first tooth 442a first contacts and pierces the bag 200, thereby facilitating the other teeth 442 to rip open the bag 200. The teeth 442 are configured to contact the surface of the bag 200 sequentially, thereby reducing the contact area and increasing the piercing/tearing pressure at each tooth 442. The teeth 442 form a substantially U-shaped rip aperture (e.g., hole, opening, etc.) in the bag 200. The U-shaped rip aperture in the bag 200 forms a flap 220 which remains attached to the bag 200 and, therefore, does not create a free-floating piece of bag material in the flowable food product.

Figure 22:
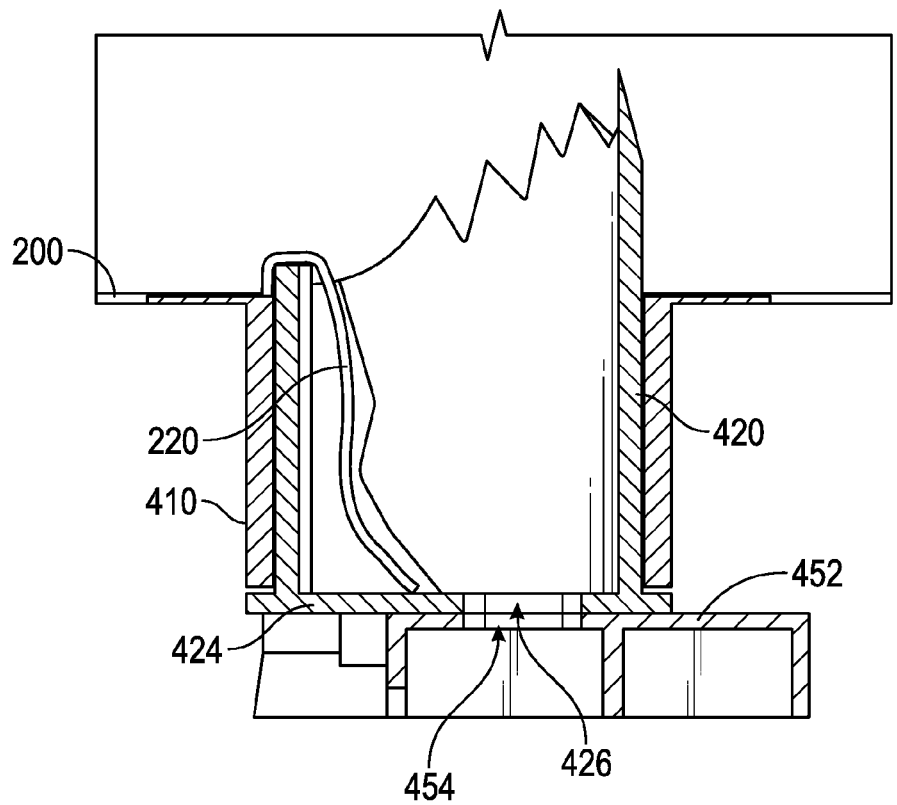
FIG. 22 is a left elevation view of the valve of FIG. 18, sectioned through line 22-22 and shown in an open position, according to an exemplary embodiment.

Referring to FIG. 22, the length of the flap 220 is less than the distance from the bag 200 to the opening 426 when the probe 420 is in the operating position. Accordingly, the flap 220 does not interfere with the flow of flowable food product through the opening 426. According to the exemplary embodiment shown, a width of the probe 420 is less than the distance from the lowest tooth 442 to the base 422 when the probe 420 is in the operating position.

As best seen in FIG. 21, an aperture 448 is defined by the sidewall 444 of the piercing portion 440. According to the embodiment shown, the aperture 448 is on the same side of the probe 420 as the first tooth 442a. The aperture 448 allows flowable food product to pass through the taller portion of the sidewall 444 and thereby facilitates a more complete evacuation of flowable food product from the bag 200.

Referring to FIGS. 16-19, the base 422 includes an upper wall 424 through which opening 426 extends. A pair of rails 428, shown as left rail 428a and right trail 428b, shown to extend along and down from upper wall 424. The upper wall 424 and the pair of rails 428 at least partially define a passageway 430 to slidingly receive a slider 450 that moves between a first or closed position, shown for example in FIGS. 16 and 17, and a second or open position, shown for example in FIGS. 18 and 19.

As seen in FIGS. 21-25, the interaction between the slider 450 and the base 422 creates a shearing valve (e.g., scissor valve, etc.). The slider 450 includes an upper surface 452 that defines an opening 454 (e.g. passageway, conduit, etc.). The upper surface 452 of the slider 450 mates against the upper wall 424 of the base 422 such that when the slider 450 is in the closed position the upper surface 452 blocks the opening 426 (see, e.g., FIG. 17), thereby preventing flowable food product from being dispensed from the dispenser 100. When the slider 450 is in the open position, the opening 454 of the slider 450 and the opening 426 of the probe 420 overlap (see, e.g., FIGS. 19 and 22), thereby allowing flowable food product to pass through the valve 400 and be dispensed from the dispenser 100. According to the exemplary embodiment shown, the valve 400 is oriented such that flowable food product passes through the valve 400 by the force gravity, then falls straight down onto receiving products (e.g., chips, sausage, container, etc.) positioned in zone 102. According to an exemplary embodiment, the rate of flow of flowable food product through the valve 400 may be controlled by selecting the amount of overlap between opening 426 and opening 454. Advantageously, the shearing valve has reduced susceptibility to being stuck open by the flowable food product, and the shearing valve creates a generally clean break in the flowable food product, thereby reducing drips of the flowable food product from the dispenser 100. According to one embodiment, during manufacture and shipping, the slider 450 may be held in the closed position by perforated or breakable tabs (see, e.g., tabs 1163 in FIG. 40), thereby creating a seal to the bag 200. For example, the bag 200 may be shipped with the slider 450 in the closed position and the fitment 410 permanently coupled to the bag 200 such that the piercing portion 440 remains sterile. According to such an embodiment, the breakable tabs may be configured to break upon the first actuation of the valve 400. The breakable tabs may further provide evidence of tampering with the valve.

Figure 16:
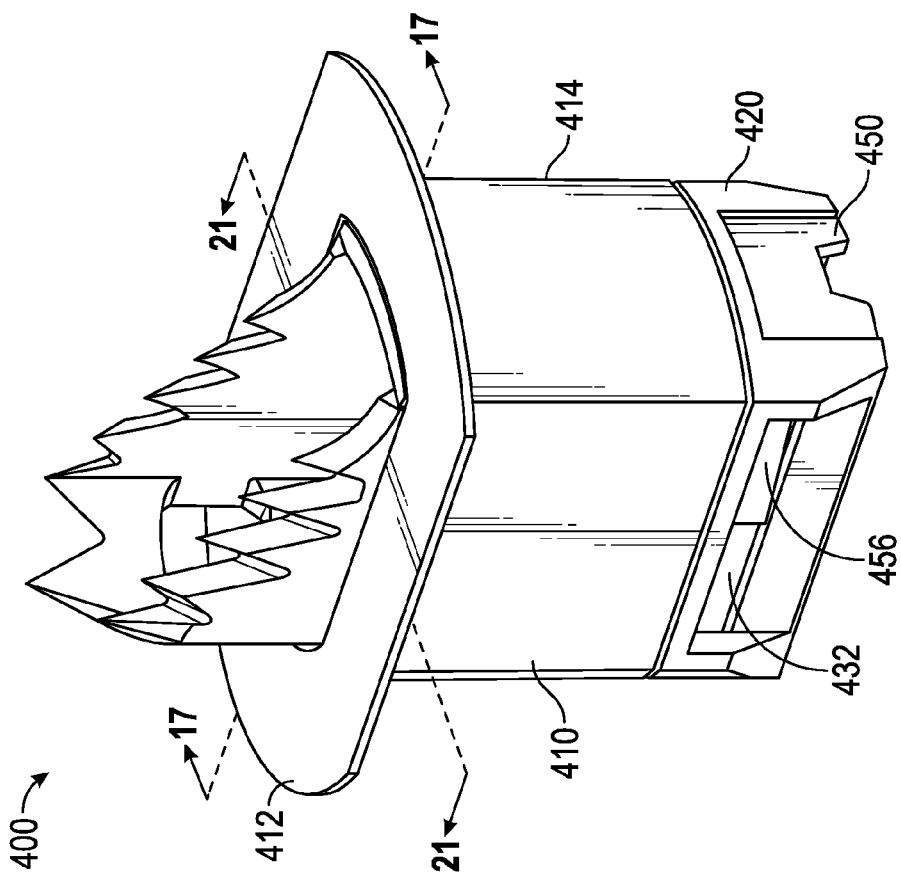
FIG. 16 is a top, front, left perspective view of a valve, shown in a closed position, according to another exemplary embodiment.
Figure 19:
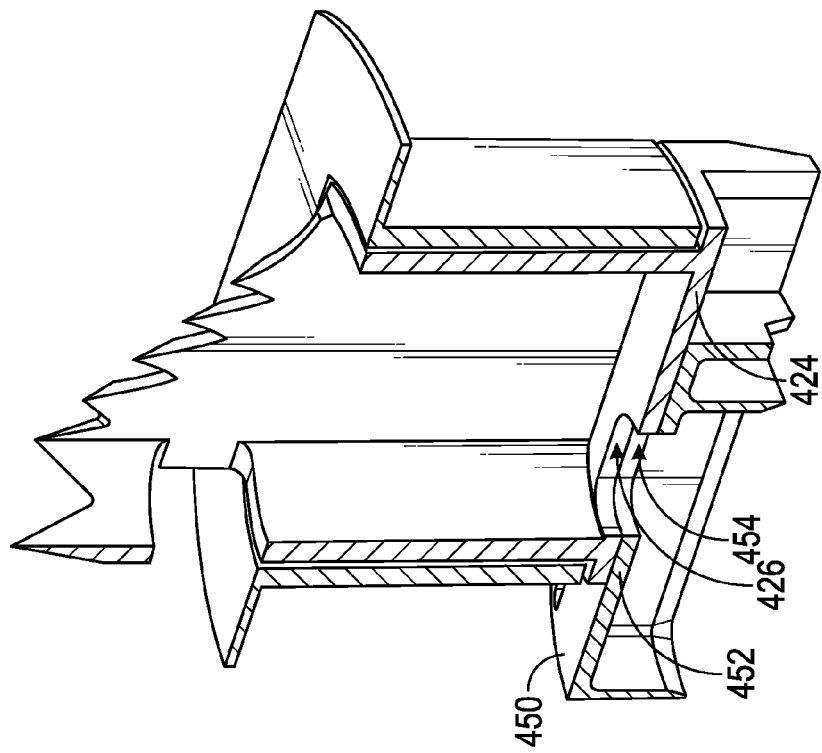
FIG. 19 is a top, front, left perspective view of the valve of FIG. 18, sectioned through line 15-15, shown according to an exemplary embodiment.
Figure 18:
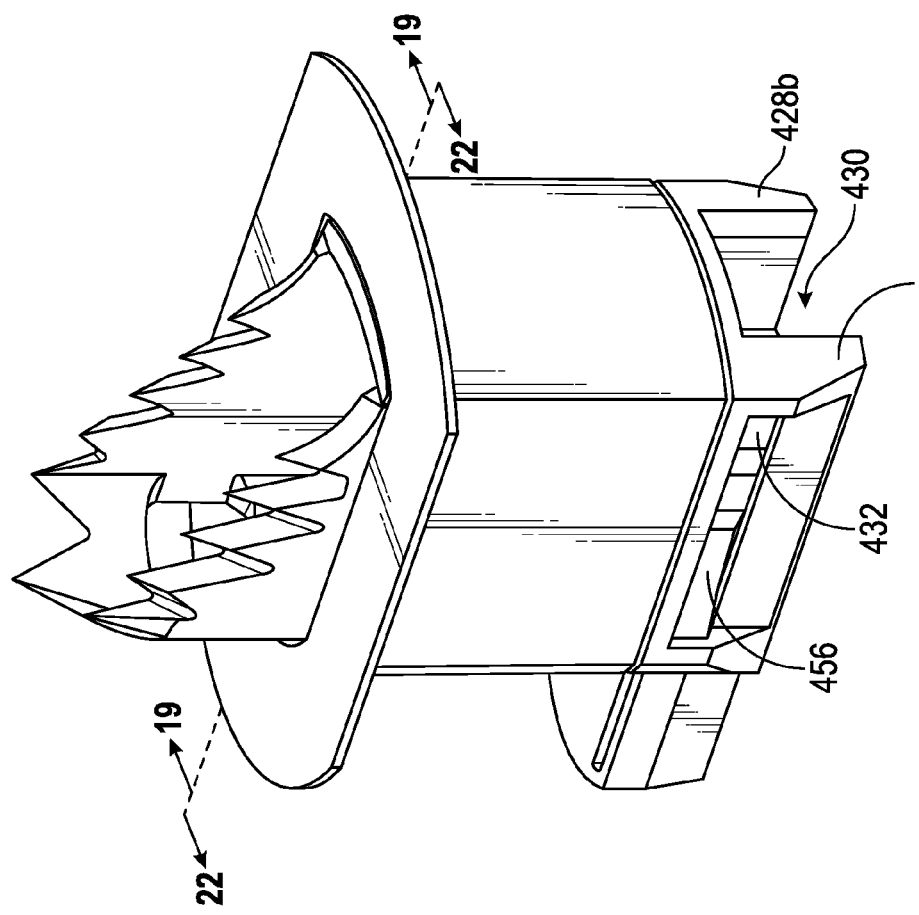
FIG. 18 is a top, front, left perspective view of the valve of FIG. 16, shown in an open position, according to an exemplary embodiment.
Figure 23:
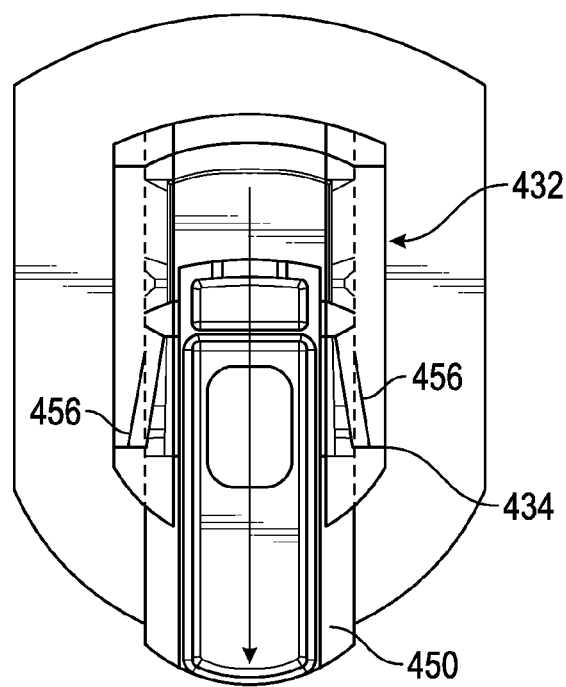
FIG. 23 is a bottom plan sectional view of the valve of FIG. 16 with portions made transparent, shown in an open position, according to an exemplary embodiment.
Figure 24:
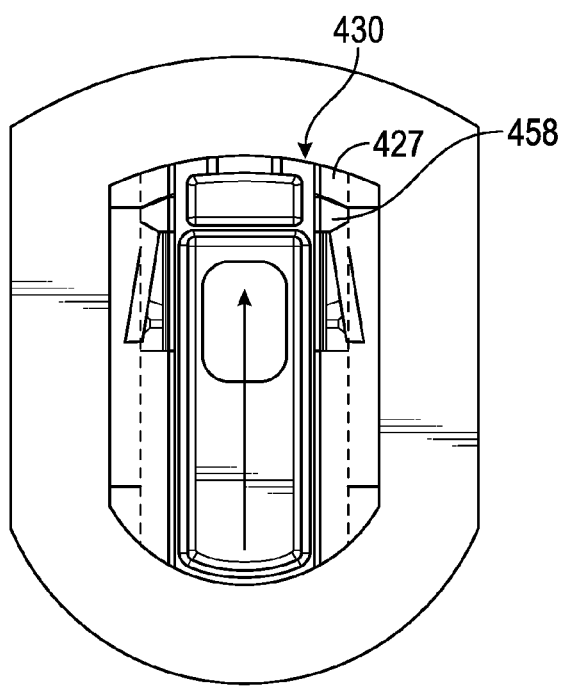
FIG. 24 is a bottom plan sectional view of the valve of FIG. 23 with portions made transparent, shown in a closed position, according to an exemplary embodiment.

Referring to FIGS. 16 and 18, the rails 428 include longitudinal slots 432 formed therein and extending in the direction of motion of the slider 450. The slider 450 includes at least one projection (e.g., tab, member, etc.), shown as finger 456, shown to extend out from the side of the slider 450. According to an exemplary embodiment, the finger 456 is configured to flex resiliently inward such that the fingers 456 may pass into the passageway 430 during assembly and then snap into the slots 432. Importantly, cooperation between the fingers 456 and the slots 432 partially retain the slider 450 in the passageway 430, thereby preventing inadvertent removal of the slider 450 from the base 422. Referring to FIG. 23, the fingers 456 may engage the rear ends 434 of the slots 432. Referring to FIG. 24, the slider 450 includes a shoulder 458 that engages a narrowed portion of the passageway 430 defined by a forward wall 427. Accordingly, once the slider 450 is installed into the probe 420, motion of the slider 450 is limited relative to the probe 420 by hard stops. According to another embodiment, the slider assembly may be reversed such that the fingers 456 stop against a forward end of the slots 432, and that the shoulder 458 engages a rear wall of the base 422.

Figure 25:
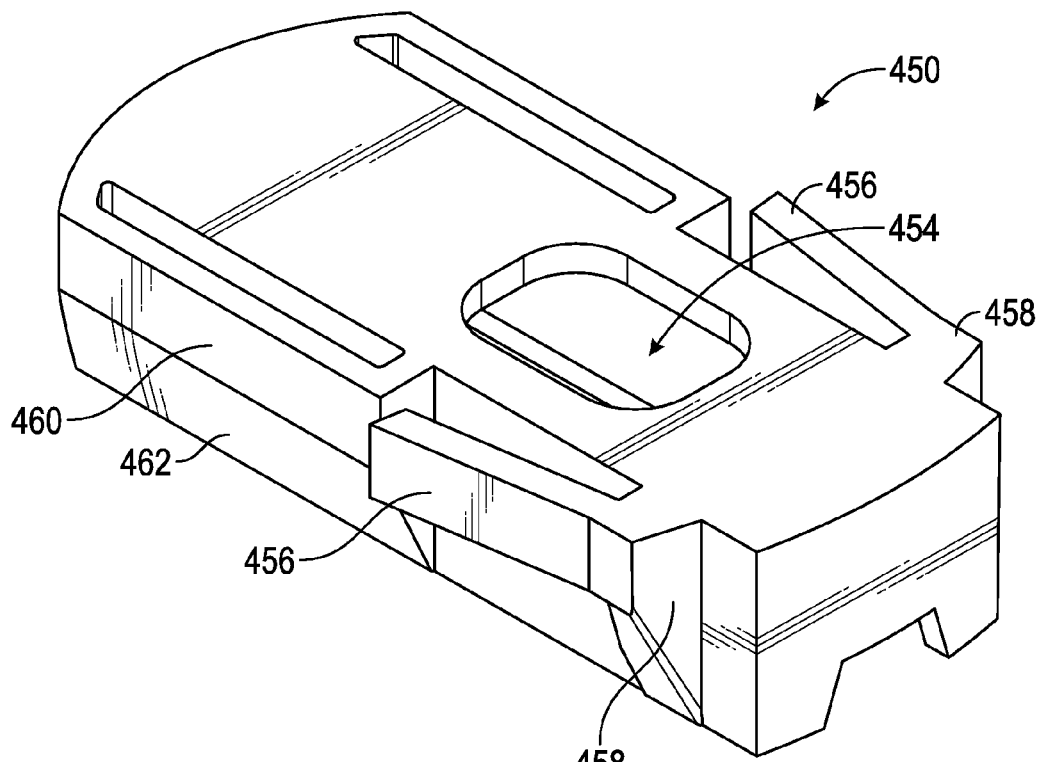
FIG. 25 is a top, front, left perspective view of a component of the valve of FIG. 16, shown according to an exemplary embodiment.

Referring to FIGS. 21 and 25, according to the exemplary embodiment shown, sidewalls 460 of the slider 450 include an outwardly sloped portion 462 that mates with a complementary inwardly sloped portion 464 of each of the rails 428. The interface of the sliding portions allows the slider 450 to slide relative to the base 422 while preventing the slider 450 from falling out of the bottom of the probe 420.

During operation, the button 156 is interconnected with the front of the slider 450 so that as the user actuates/pushes the button 156, the slider 450 is pushed from the closed position toward the open position, which causes the opening 426 and opening 454 to overlap, thereby opening the valve 400. A spring (not shown) may be interconnected to the slider 450, for example, exerting a force against a rear end of the slider 450, to provide a return force that moves the slider 450 from the open position towards the closed position.

According the exemplary embodiment described, more costly components (e.g., spring, button, etc.) do not come in contact with the flowable food product and therefore may be reusable. Preferably, one or more components of the valve 400 (e.g., fitment 410, probe 420, and/or slider 450) are formed of one or more compatible materials to facilitate recycling of the valve 400.

Figure 26:
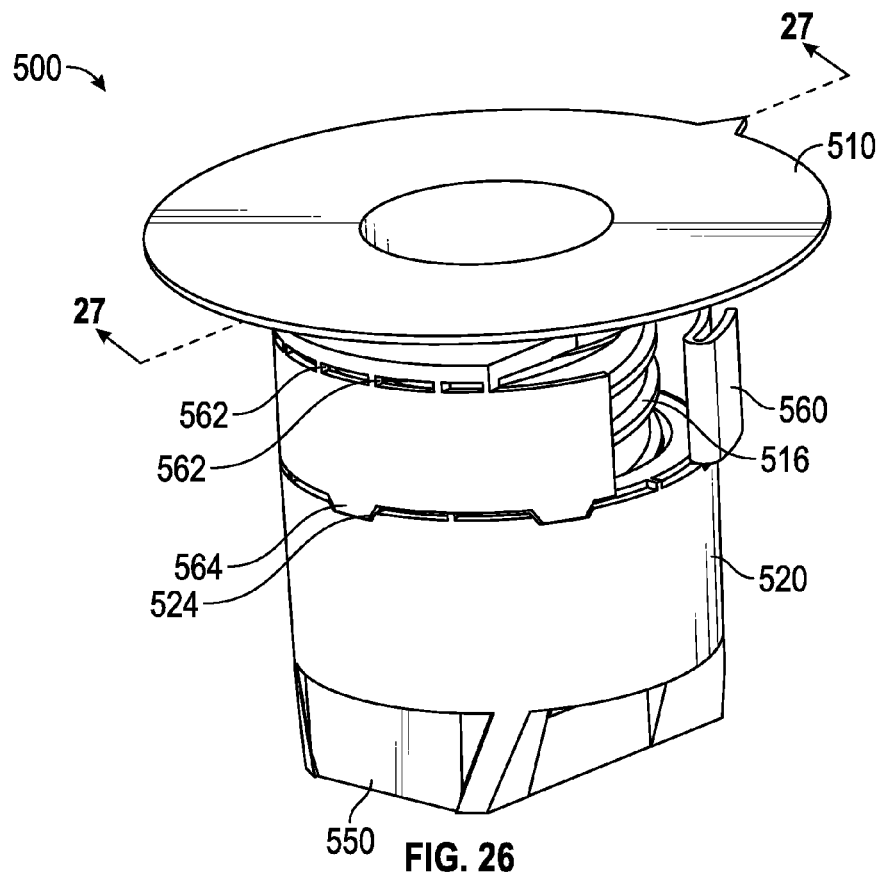
FIG. 26 is a top, front, right perspective view of a valve, shown according to another exemplary embodiment.
Figure 27:
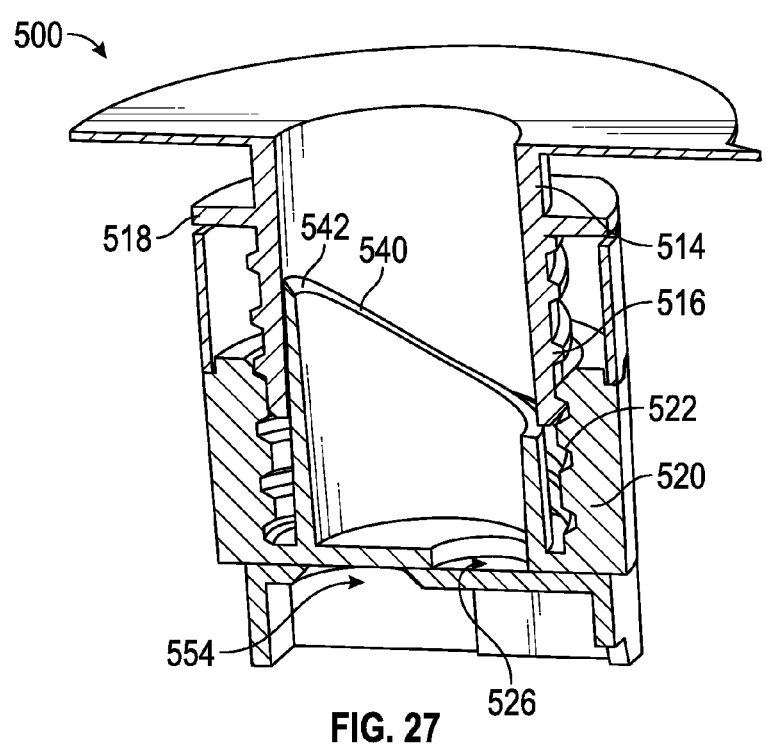
FIG. 27 is a top, rear, right perspective view of the valve of FIG. 26, sectioned through line 27-27, shown according to an exemplary embodiment.

Referring to FIGS. 26-27, a third valve 500 is shown, according to an exemplary embodiment. The valve 500 includes a fitment 510, a probe 520, and a slider 550. The interaction of the slider 550 and the probe 520 is similar to the interaction of the slider 450 and the probe 420 as described above with respect to the valve 400. For example, the slider 550 translates between a first or closed position, in which the opening 526 (e.g. passageway, conduit, etc.) in the probe 520 is offset from the opening 554 (e.g. passageway, conduit, etc.) in the slider 550 (see, e.g., FIG. 27), and a second or open position, in which the opening 526 and the opening 554 overlap, thereby allowing flowable food product to flow through the valve 500.

The probe 520 includes threads 522 configured to engage threads 516 on the outward extending wall 514 of the fitment 510. As the probe 520 is advanced (e.g., rotated, threaded, tightened, etc.) onto the fitment 510 from a first or shipping position (see, e.g., FIGS. 26 and 27) toward a second or operating position (now shown), a piercing portion 540 slices open the bag 200. Advancement of the probe 520 may be stopped at the operating position by a flange 518 extending radially outward from fitment sidewall 514. The piercing portion 540 is shown to have a single cutting edge 542; however, according to other embodiments, the piercing portion 540 may have a plurality of teeth.

According to an exemplary embodiment, the length of advancement (i.e., the distance between the shipping and operating positions) may be configured such that a portion of the piercing portion 540 remains inside the fitment 510 below the bag 200, thereby allowing flowable food product to flow down into (e.g., pour into) the valve 500 and thereby achieving a more complete evacuation of the bag 200. According to an exemplary embodiment, the pitch of the threads 516, 522 and the length of advancement may be configured such that the piercing portion 540 forms a 180 degree to 270 degree cut in the bag 200 to form a U-shaped flap 220. According to a preferred embodiment, the pitch of the threads 516, 522 and the length of advancement may be configured such that the length of the flap 220 is less than the distance from the bag 200 to the opening 526, thereby preventing the flap 220 from interfering with flow of the flowable food product from through the valve 500.

The valve 500 may also include a pull tab 560. The pull tab 560 is coupled to the fitment by perforated or breakable tabs 562, and keys 564 engage pockets 524 on the probe 520. Accordingly, the probe 520 may be threaded onto the fitment 510 until the probe 520 reaches a shipping position (see, e.g., FIGS. 22 and 23) in which the keys 564 inhibit further rotation of the probe 520, preferably in either direction (i.e., clockwise or counterclockwise relative to the fitment 510). When the bag 200 is to be installed in the dispenser 100, the breakable tabs may be broken and the pull tab 560 may be removed from the fitment 510, and the probe 520 may be advanced relative to the fitment 510 to a second or operational position (not shown) in which the bag 200 has been ripped open by the piercing portion 540.

According to other embodiments, the valve 500 may not be shipped integrally with the fitment 510, instead being threaded onto the fitment 510 after a protective cap has been removed from the fitment. According to other embodiments, the fitment may be a conventional fitment having annular ribs rather than threads. In such embodiments, rather than threads 522, the probe may include inwardly extending tangs or a ridge that permit the probe to be pushed onto the fitment and engage the annular ribs. In such an embodiment, the piercing action may be more similar to the push-to-pierce action as described with respect to valve 400.

Figure 28:
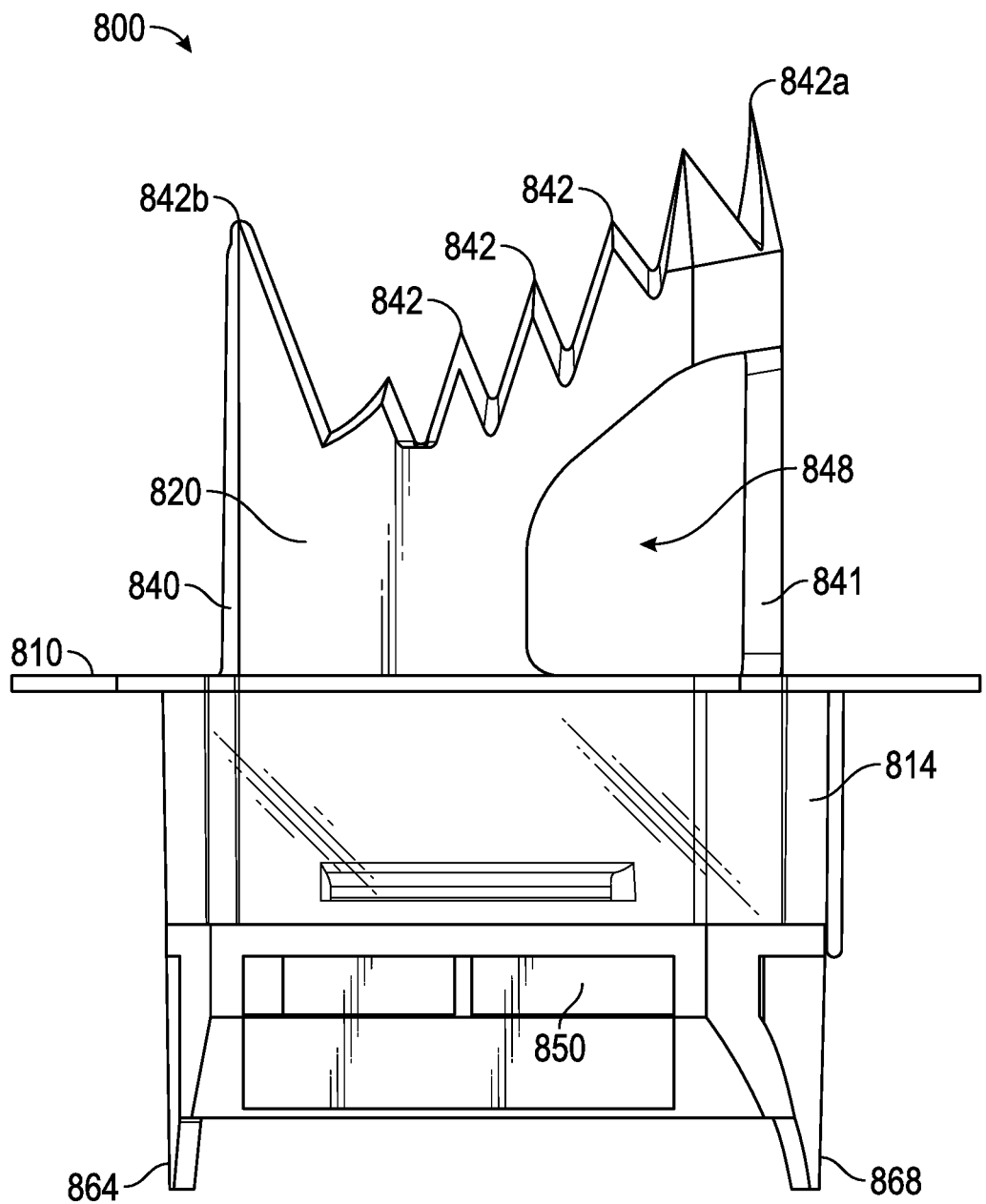
FIG. 28 is a right elevation view of a valve, shown with a transparent fitment, according to another exemplary embodiment.
Figure 29:
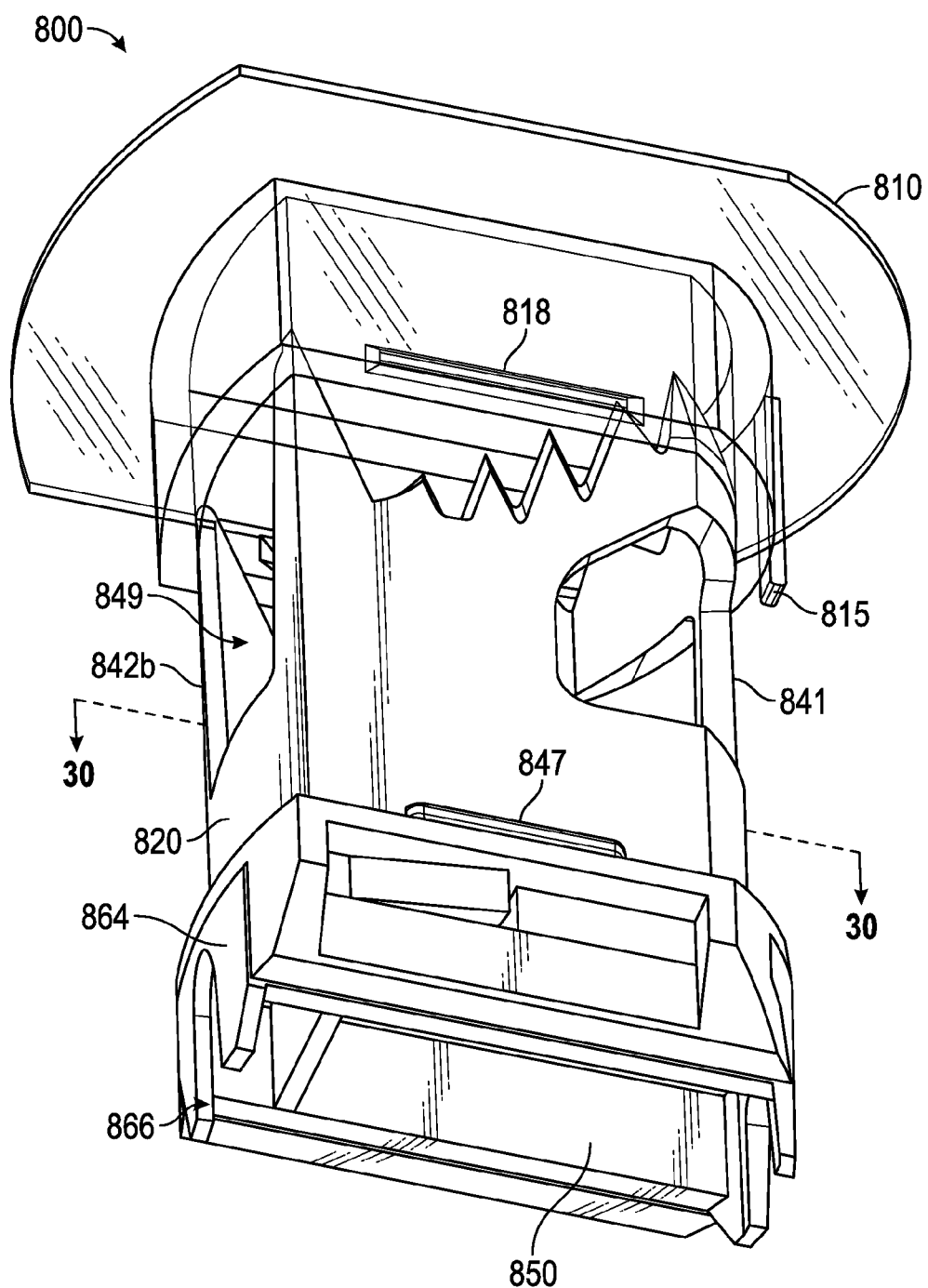
FIG. 29 is a bottom, front, right exploded perspective view of the valve of FIG. 28, shown according to an exemplary embodiment.
Figure 30:
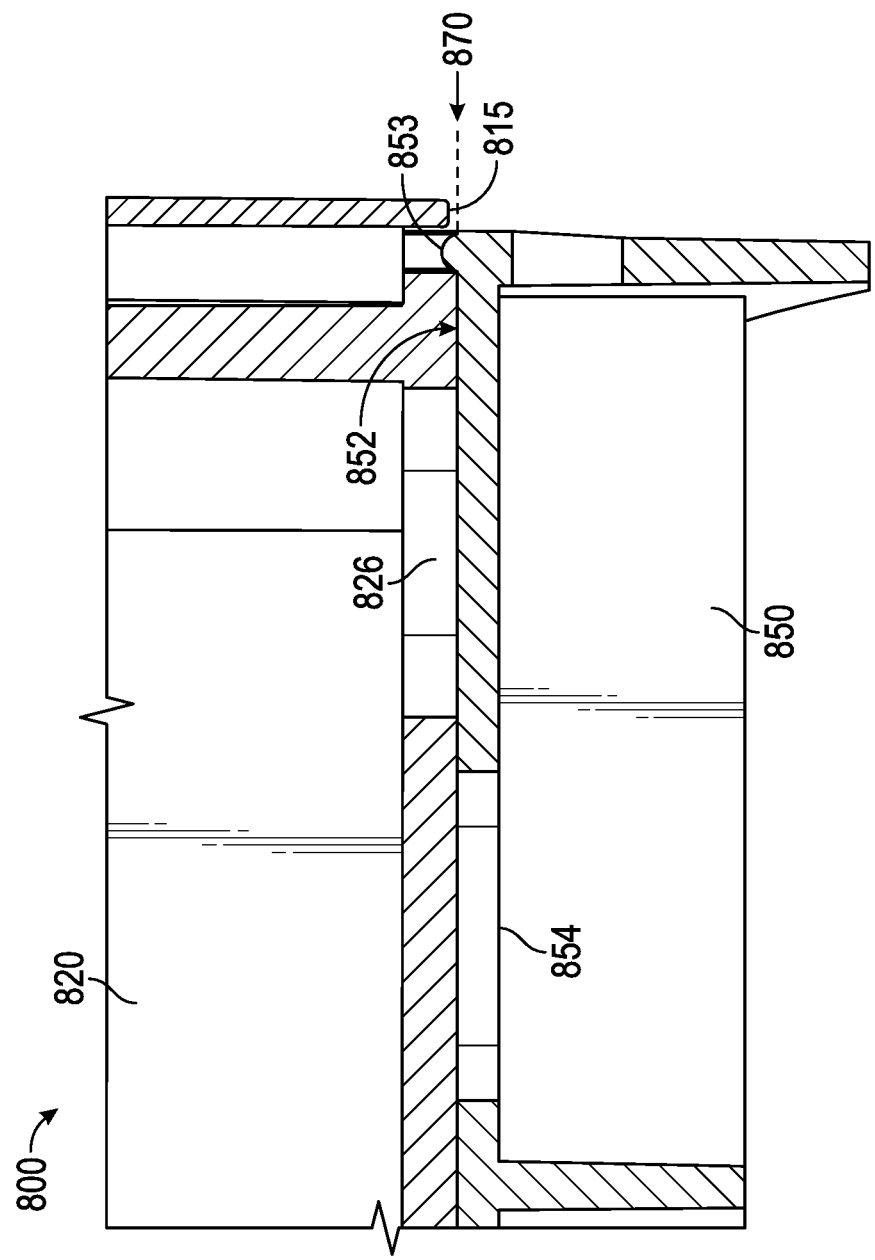
FIG. 30 is an enlarged right elevation sectional view of a portion of the valve of FIG. 28, sectioned through line 30-30, shown according to an exemplary embodiment.
Figure 31:
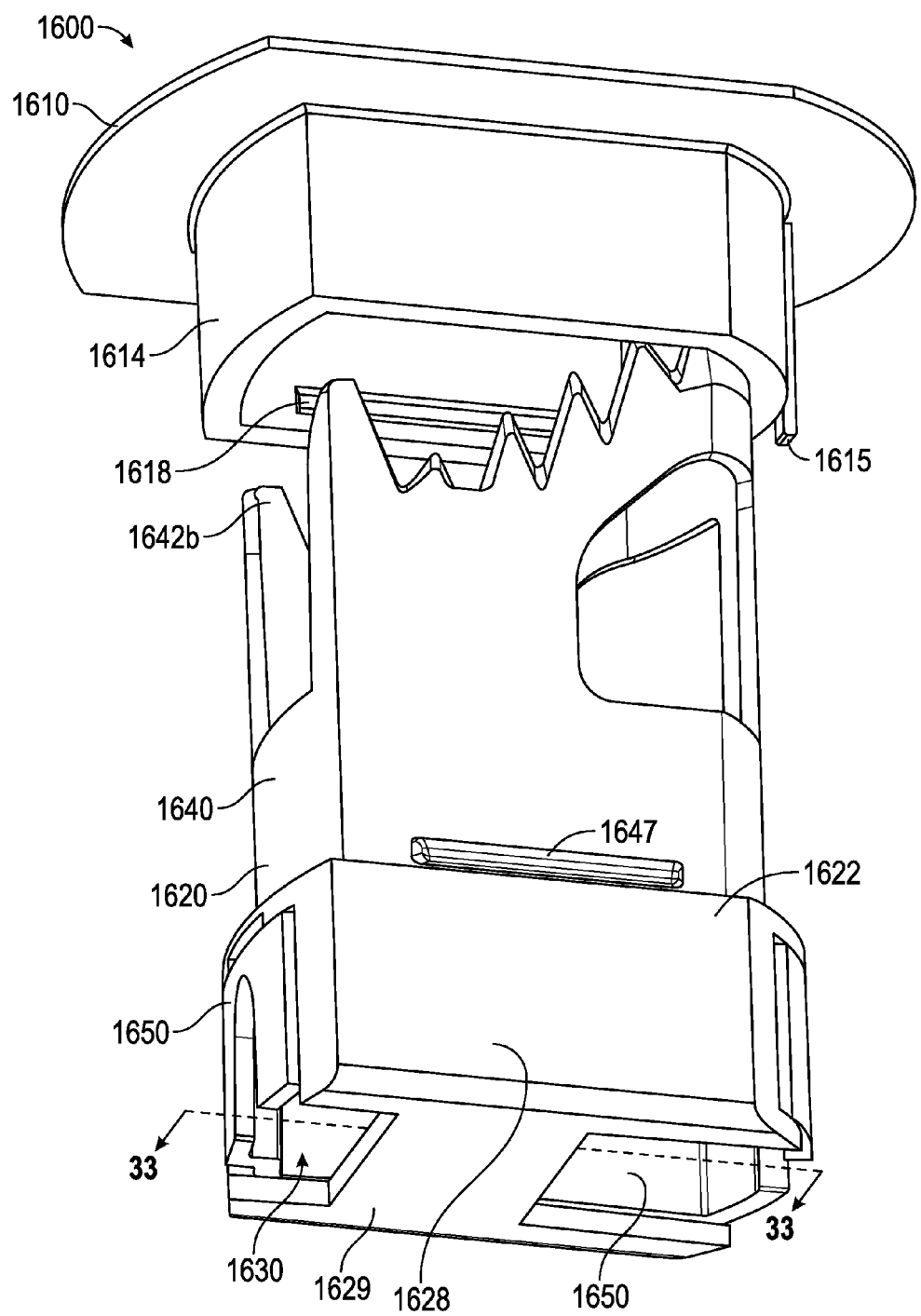
FIG. 31 is a bottom, front, right exploded perspective view of a valve, shown according to another exemplary embodiment.

Referring to FIGS. 28-30, a fourth valve 800 is shown, according to an exemplary embodiment. The valve 800 includes a fitment 810, a probe 820, and a slider 850. The interaction of the slider 850 and the probe 820 is similar to the interaction of the slider 450 and the probe 420 as described above with respect to the valve 400. For example, the slider 850 translates between a first or closed position, in which the opening 826 (e.g. passageway, conduit, etc.) in the probe 820 is offset from the opening 854 (e.g. passageway, conduit, etc.) in the slider 850 (see, e.g., FIG. 30), and a second or open position, in which the opening 826 and the opening 854 overlap, thereby allowing flowable food product to flow through the valve 800. Some of the differences between the valve 400 and the valve 800 are described below; however, it is understood that elements of each valve may be combined into other embodiments.

The length of the sidewall 814 of the fitment 810 is short relative to the length of the piercing portion 840, which enables the piercing portion 840 to extend farther into the bag 200 during the initial puncture, which in turn enables a cleaner cut of the bag 200. Extending further into the bag 200 further enables a larger aperture 848, which increases the flow area of flowable food product and reduces restriction. Reduced flow restriction facilitates gravity forced flow of the flowable food product through the dispenser 100, 700. A beam 841 may extend across the aperture 848 to provide structural rigidity and support for the teeth 842.

According to the embodiment shown, the probe 820 and the slider 850 may be shipped separately from the bag 200 and then assembled prior to installation into the dispenser 100, 700. Accordingly, in contrast to valve 400, the valve 800 has only rib 847 to engage a groove 818 in the fitment 810, which secures the probe 820 in the operating position. According to another embodiment, the probe 820 and slider 850 could be held in a shipping position by a pull tab (e.g., pull tab 560 described with respect to valve 500).

The piercing portion 840 of the probe 820 includes a plurality of teeth 842 configured to open (e.g., pierce, puncture, cut, rip, etc.) the bag 200 when the probe 820 is moved from the shipping position to the operating position. As described with respect to valve 400, the heights and orientations of the teeth 842, 842a facilitate opening of the bag 200. The probe 820 further includes guide (e.g., last, rear, forward, etc.) teeth 842b spaced apart from the first tooth 842a, which (referring to FIG. 29) inhibits misalignment of the probe 820 and the fitment 810, thereby facilitating insertion of the probe 820 into the fitment 810. As shown, the guide teeth 842b are on the opposite side of the piercing portion from the first tooth 842a, which helps align the probe 820 to the fitment, thereby keeping the teeth 842 at the proper orientation relative to the bag 200 to facilitate opening of the bag 200. The guide teeth 842b are shown to be shorter than the first few teeth 842, 842a, thereby allowing point pressure to build on those teeth 842 during insertion of the probe 820 to initiate opening of the bag 200. The guide teeth 842b define a gap 849 that allows flowable food product to flow into the probe 820 to the opening 826.

Referring briefly to FIG. 30, a detent 853 is formed on the upper surface of the slider 850. At the start of the opening stroke, the detent 853 creates a slight interference with a tang 815 on the rear side of the fitment 810. The interference at the start of the stroke inhibits the slider 850 from being inadvertently moved to the open position (i.e., inhibits the valve 800 from being inadvertently opened), for example, when force is exerted onto the probe 820 to snap the rib 847 into the groove 818. As shown, the detent 853 extends above the upper surface 852 and interfaces with the tang 815 above the upper surface 852 (e.g., above a plane 870 where the slider 850 and the probe 820 interface). According to one embodiment, the tang 815 does not extend below the upper surface 852. According to another embodiment, the interference between the detent 853 and the tang 815 is above the plane 870, thus keeping the tang 815 from pushing the slider 850 apart from the probe 820, which could cause a leak of the flowable food product.

Referring to FIGS. 6 and 29, the slider 850 includes a forward wall 864, which defines a gap or slot 866. The rear end of the plunger 751 includes a flange 758 that at least partially defines a groove or slot 759 that creates a matching feature (e.g., tongue in groove, etc.) which mates or engages with the slot 866. The slot 866 is shown to be a vertically oriented arch or bullet shape, which facilitates the forward wall 864 straddling the plunger 751 during installation of the bag 200 into the dispenser 700, which reduces or eliminates the need to manipulate (e.g., position, reposition, etc.) the valve 800 during installation. As shown, the forward wall 864 extends down from the rest of the slider 850 to enable a longer slot 866, which enables a wider slot 866 and allows the slot 866 to engage the slot 759 before the rest of the slider 850 seats, thereby facilitating alignment and installation of the bag 200. When the valve 800 is installed into the dispenser 700, the plunger 751 may push the slider 850 from the closed position toward the open position, and the flange 758 of the plunger 751 may pull the slider 850 from the open position toward the closed position. The longer forward wall 864 provides more area, which better distributes loads and stresses between the plunger 751 and the slider 850, thereby improving durability and quality. Further, the elongated slot 866 and forward wall 864 allow the plunger 751 to move the slider 850 even if the valve 800 is not fully seated into the dispenser 700. According to one embodiment, the slider 850 may include a rear wall 868 that is substantially similar to the forward wall 864. The rear wall 868 may allow a rear located actuator (e.g., a solenoid, etc.) to pull the slider 850 toward the open position and to push the slider 850 toward a closed position.

Referring to FIGS. 31-34, a sixth valve 1600 is shown, according to an exemplary embodiment. The valve 1600 includes a fitment 1610, a probe 1620, and a slider 1650. The interaction of the probe 1620 and the fitment 1610 is similar to the interaction of the probe 850 and the fitment 810 as described above with respect to the valve 800. For example, the length of the sidewall 1614 of the fitment 1610 is short relative to the length of the piercing portion 1640, which enables the piercing portion 1640 to extend farther into the bag 200 during the initial puncture, which in turn enables a cleaner cut of the bag 200. The valve 1600 is shown to have only rib 1647 to engage a groove 1618 in the fitment 1610, which secures the probe 1620 in the operating position. It should be understood that the rib 1647 shown engages a groove 1618 not seen on the inside of the fitment 1610, and that a rib 1647 (not shown) on the opposite side of the probe 1620 engages the groove 1618 shown on the inside of the fitment 1610. It is further contemplated that the rib 1647 and the groove 1618 may be switched such that the groove is located on the probe, and the rib is located on the fitment.

The piercing portion 1640 of the probe 1620 includes a plurality of teeth 1642 configured to open (e.g., pierce, puncture, cut, rip, etc.) the bag 200 when the probe 1620 is moved from the shipping position to the operating position. As described with respect to valve 800, the heights and orientations of the teeth 1642, 1642*a* facilitate opening of the bag 200, and the guide (e.g., last, rear, forward, etc.) teeth 1642*b* spaced apart from the first tooth 1642*a* inhibit misalignment of the probe 1620 and the fitment 1610, thereby facilitating insertion of the probe 1620 into the fitment 1610. As shown, the guide teeth 1642*b* are rounded or blunted relative to the other teeth 1642 or guide teeth 842*b*. Blunting the guide teeth 1642*b* may reduce accidental punctures of the bag 200 or of other objects.

The probe 1620 is shown to include a span 1629 that extends between and interconnects the sidewalls 1628 of the base 1622. The span 1629 prevents the sidewalls of the base 1622 from flexing outward or laterally away from the slider 1650, thereby preventing flowable food product from leaking down the sides of the slider 1650. The span 1629 also helps to retain the slider 1650 in the passageway 1630. For example, the span 1629 prevents the slider 1650 from exiting out of the bottom of the base 1622 of the probe 1620.

Figure 32:
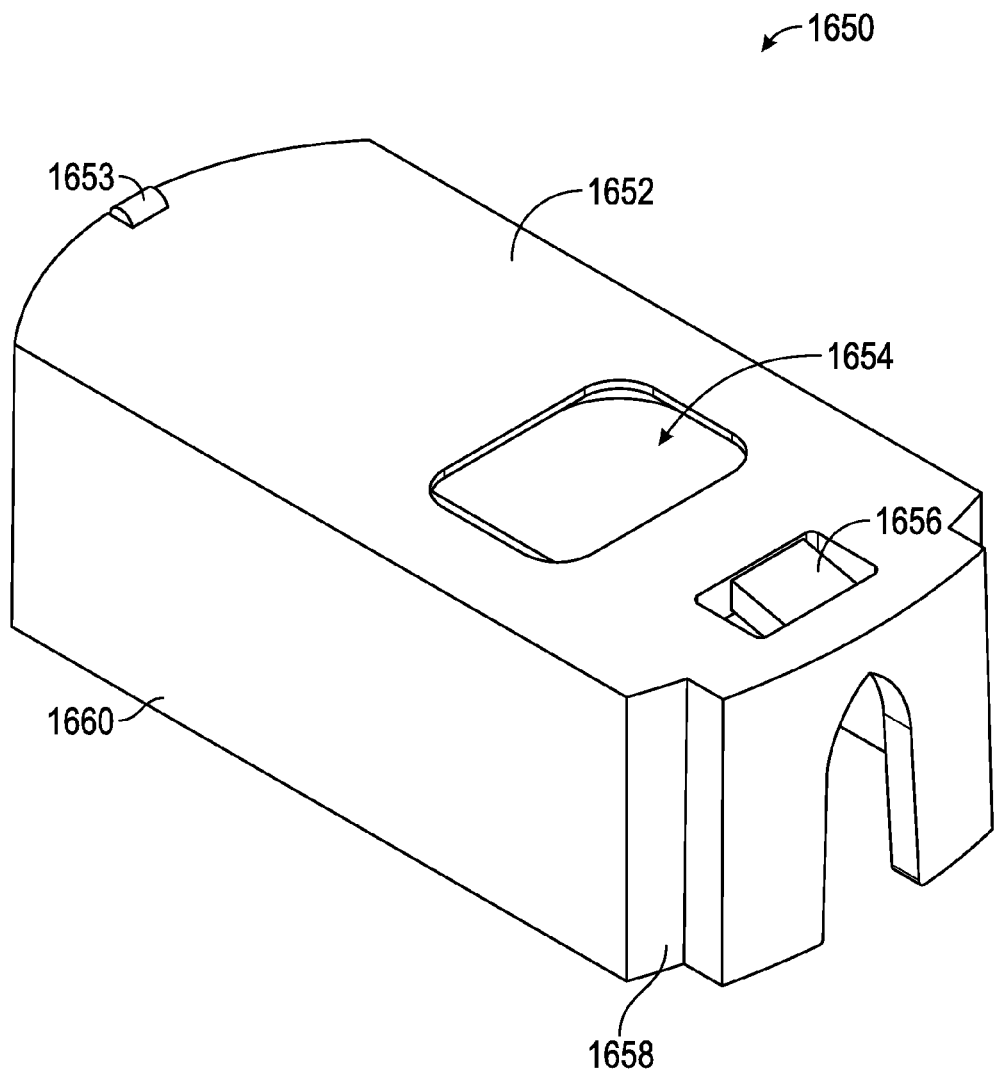
FIG. 32 is a top, front, left perspective view of a component of the valve of FIG. 31, shown according to an exemplary embodiment.
Figure 33:
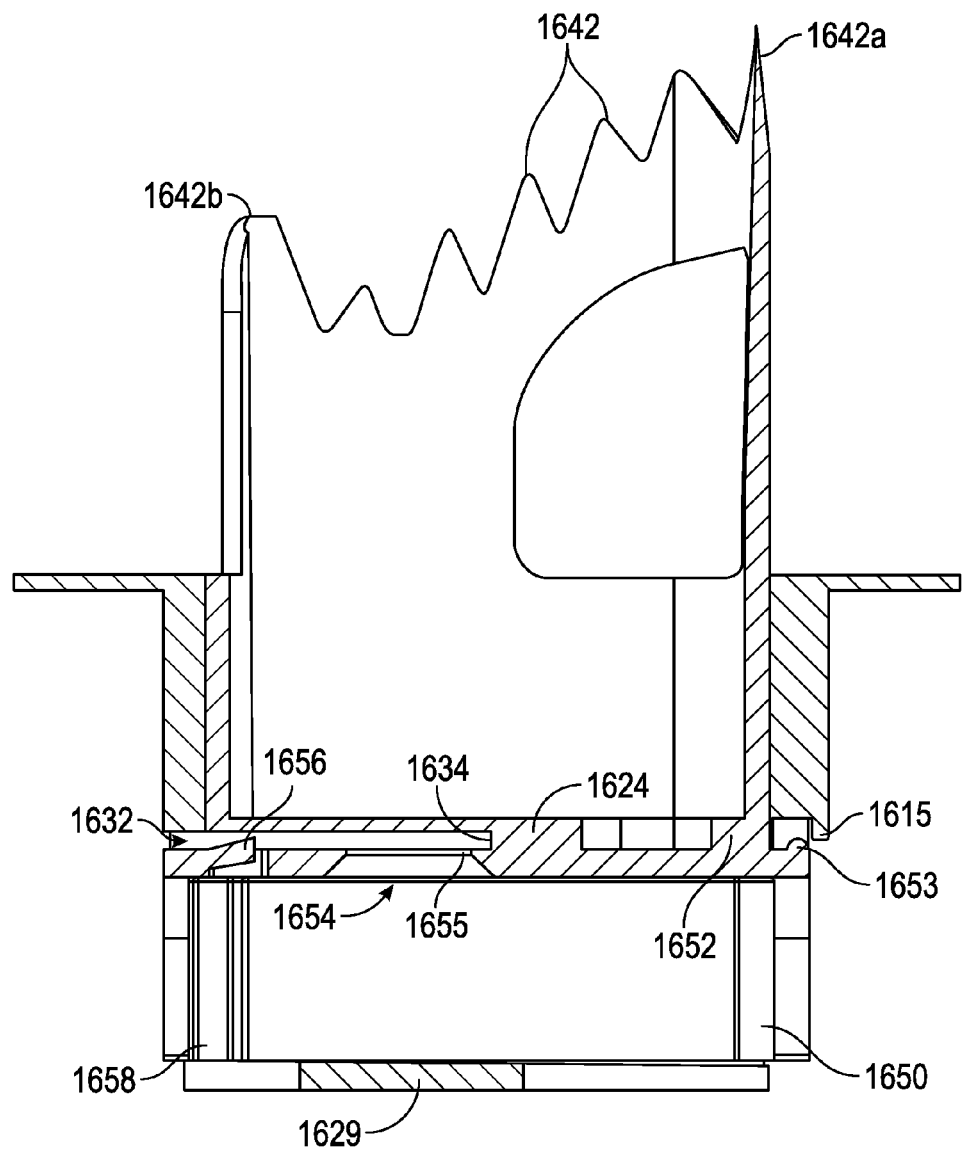
FIG. 33 is a right elevation view of the valve of FIG. 31, sectioned through line 33-33, according to an exemplary embodiment.

Referring to FIG. 32, the slider 1650 is shown, according to an exemplary embodiment. The slider 1650 includes an upper surface 1652 and sidewalls 1660 extending down from the upper surface 1652. An opening 1654 passes through the upper surface 1652 and is configured to allow flowable food product to pass therethrough when the slider 1650 is in an open positions. Referring briefly to FIG. 33, the region of the slider 1650 that defines the opening 1654 may be sloped or inclined thereby creating a narrower or sharper surface 1655 where the opening 1654 passes through the upper surface 1652. The sloped or inclined region helps prevent flowable food product from contacting the bore sidewall of opening 1654, thereby reducing clogging, dripping, or accumulation of dried flowable food product. The narrower or sharper surface 1655 facilitates a cleaner cut of the stream 250 of flowable food product, thereby reducing clogging, dripping, or accumulation of dried flowable food product. The slider 1650 includes at least one projection (e.g., tab, member, etc.), shown as finger 1656, shown to extend out from the upper surface 1652 of the slider 1650. As will be discussed more below, the finger 1656 helps to retain the slider 1650 in the probe 1620. The slider 1650 further includes a detent 1653 formed on the upper surface 1652, similar to that of the detent 853.

Referring to FIG. 33, a cross-section of the valve 1600 is shown, according to an exemplary embodiment. According to the embodiment shown, the tang 1615 extends downward such that a bottom end of the tang 1615 is at an elevation between the top of the detent 1653 and the upper surface 1652 of the slider 1650. Accordingly, at the start of the opening stroke, the detent 1653 creates a slight interference with a tang 1615 on the rear side of the fitment 1610. The interference at the start of the stroke inhibits the slider 1650 from being inadvertently moved to the open position (i.e., inhibits the valve 1600 from being inadvertently opened). However, because the bottom of the tang 1615 is above the upper surface 1652 thus keeping the tang 1615 from pushing the slider 1650 apart from the probe 1620, which could cause a leak of the flowable food product.

Figure 34:
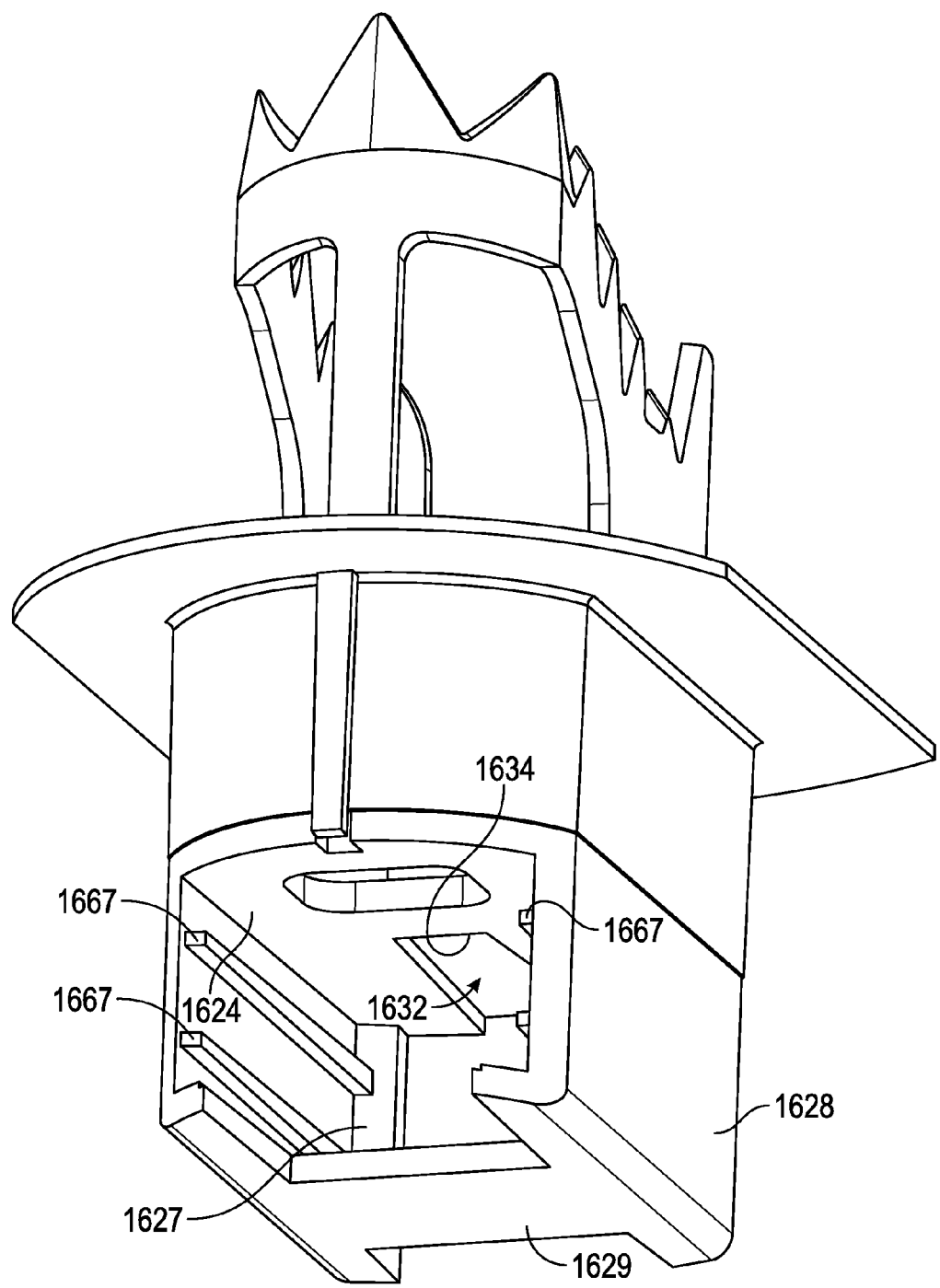
FIG. 34 is a bottom, rear, left perspective view of the valve of FIG. 31, shown according to an exemplary embodiment.

Further referring to FIG. 34, according to an exemplary embodiment, the finger 1656 is configured to flex resiliently inward such that the finger 1656 may pass into the passageway 1630 during assembly and then snap into the slot 1632 formed in the bottom of the upper wall 1624 of the base 1622 of the probe 1620. The finger 1656 and the slot 1632 cooperate to partially retain the slider 1650 in the passageway 1630, thereby preventing inadvertent removal of the slider 1650 from the base 1622 in a first direction. When the slider 1650 is moved to the open position, the finger 1656 may engage the rear ends 1634 of the slots 1632. Locating the finger 1656 and the slot 1632 generally above the slider 1650 may avoid buildup of leaked flowable food product on the finger 1656 or in the slot 1632. Referring to FIGS. 32 and 34, the slider 1650 includes a shoulder 1658 that engages a narrowed portion of the passageway 1630 defined by a forward wall 1627, thereby preventing inadvertent removal of the slider 1650 from the base 1622 in a second direction. Accordingly, once the slider 1650 is installed into the probe 1620, motion of the slider 1650 is limited relative to the probe 1620 by hard stops. According to another embodiment, the slider assembly may be reversed such that the finger 1656 stops against a forward end of the slot 1632, and that the shoulder 1658 engages a rear wall of the base 1622.

One or more guiderails 1667 may be formed on the inner surface(s) of the sidewall(s) 1628 of the base 1622. The guiderails 1667 support the slider 1650 in a lateral direction and help guide the slider 1650 between the open and closed positions without binding. The sidewalls 1628 may be formed at a draft angle to facilitate manufacturing (e.g., casting, molding, etc.). Because the guiderails 1667 have a smaller surface area, the guiderails 1667 may be formed without a draft angle (i.e. zero draft, approximately zero draft, etc.), even though the sidewalls 1628 may have or require a draft angle. Accordingly, the guiderails 1667 may provide a consistent sliding surface for the slider 1650 and reducing wobble (e.g., shimmy, etc.) and/or binding of the slider 1650 relative to the base 1622.

Figure 35:
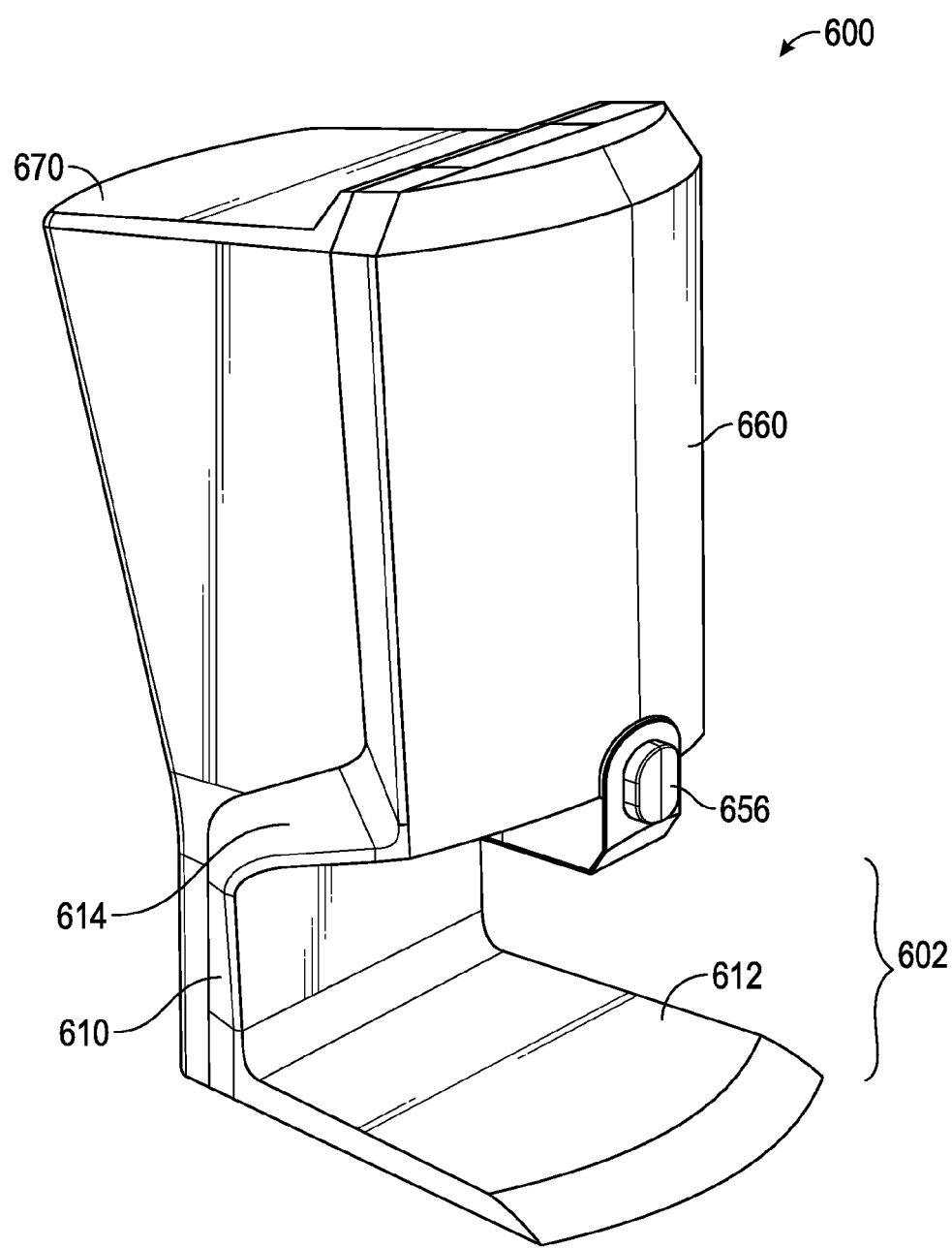
FIG. 35 is a top, front, left perspective view of a dispenser, shown according to another exemplary embodiment.
Figure 36:
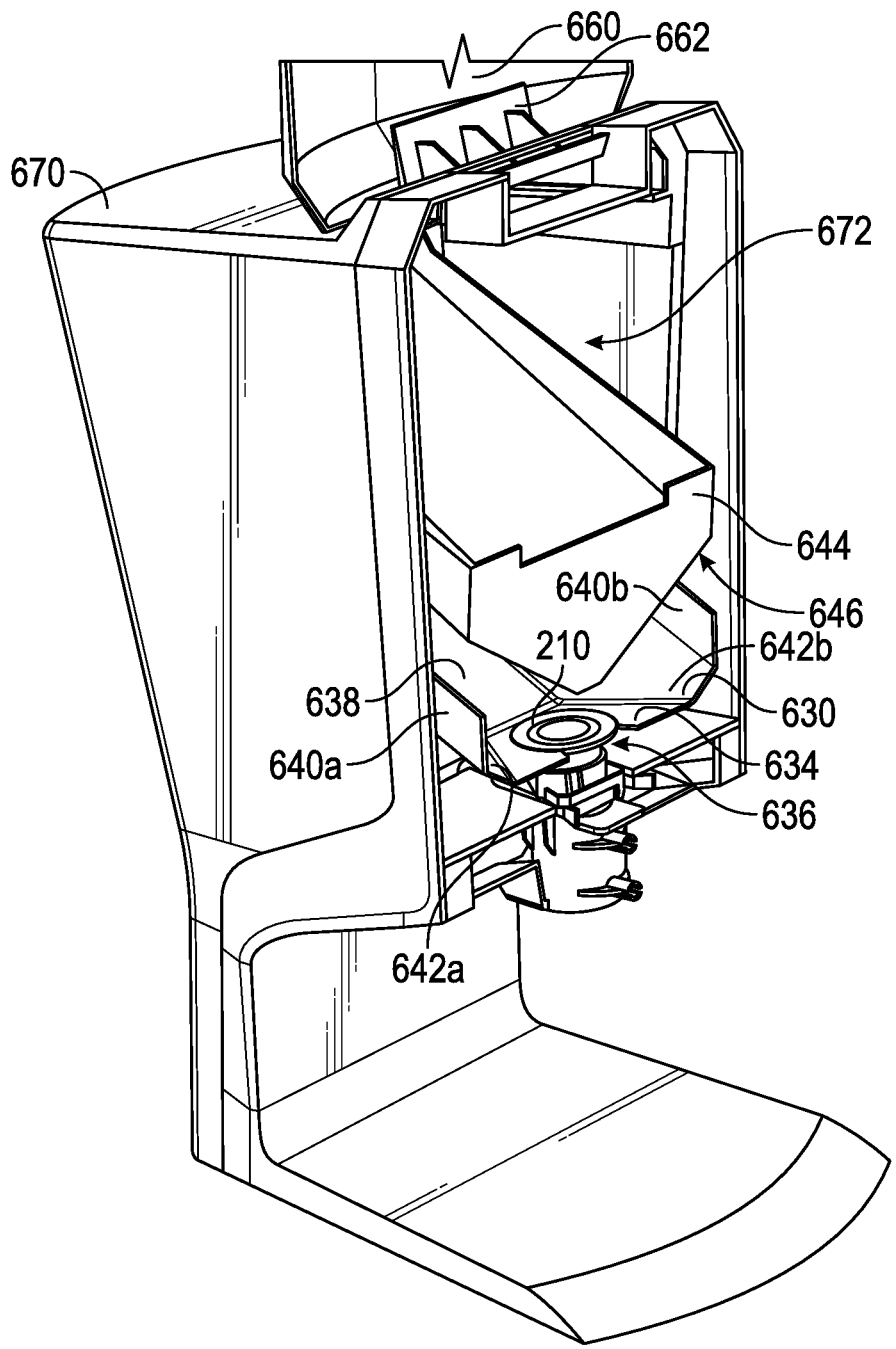
FIG. 36 is a top, front, left perspective view of the dispenser of FIG. 35 with the front housing opened, shown according to an exemplary embodiment.
Figure 37:
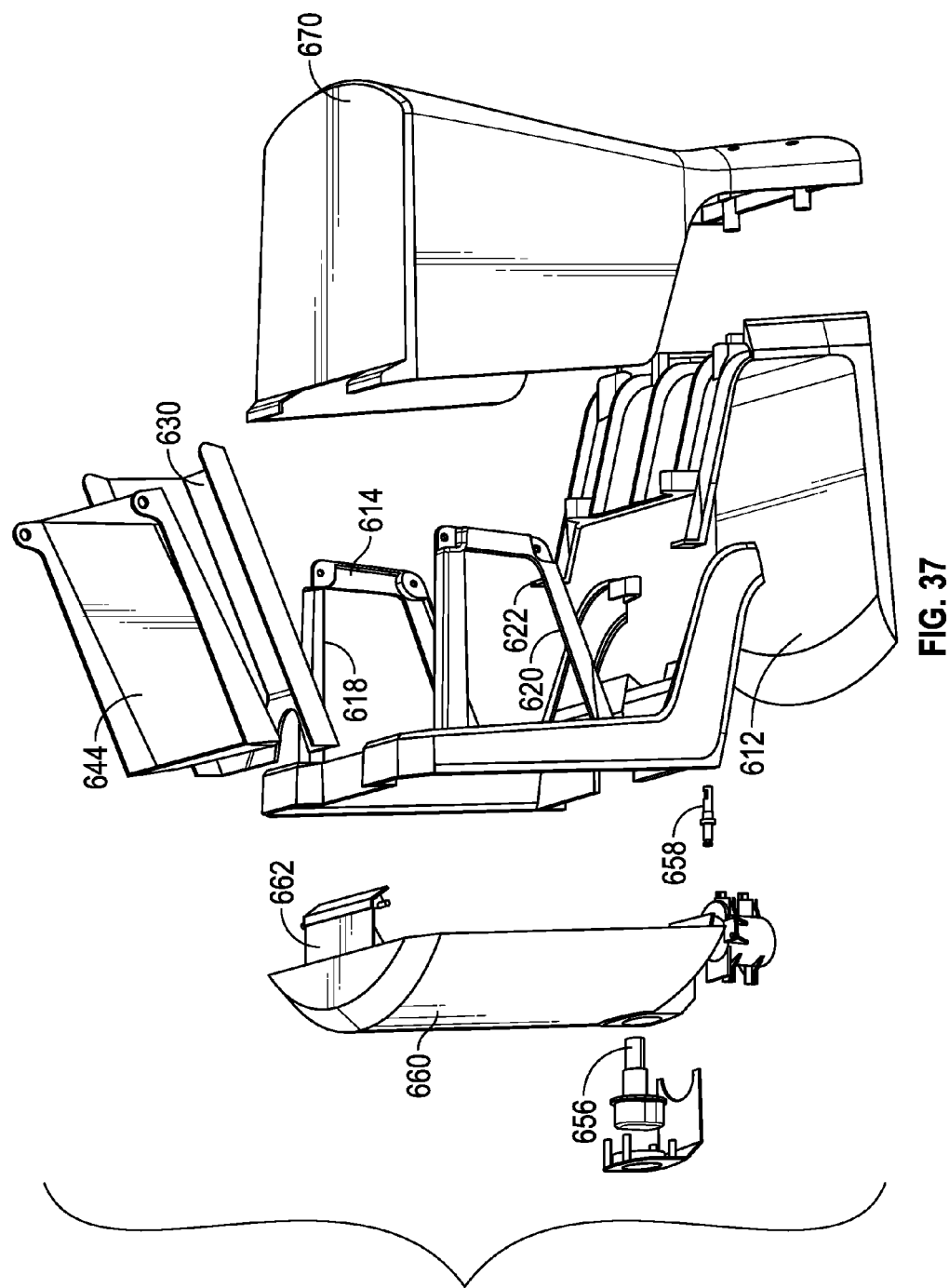
FIG. 37 is a top, right perspective exploded view of the dispenser of FIG. 35, shown according to an exemplary embodiment.
Figure 38:
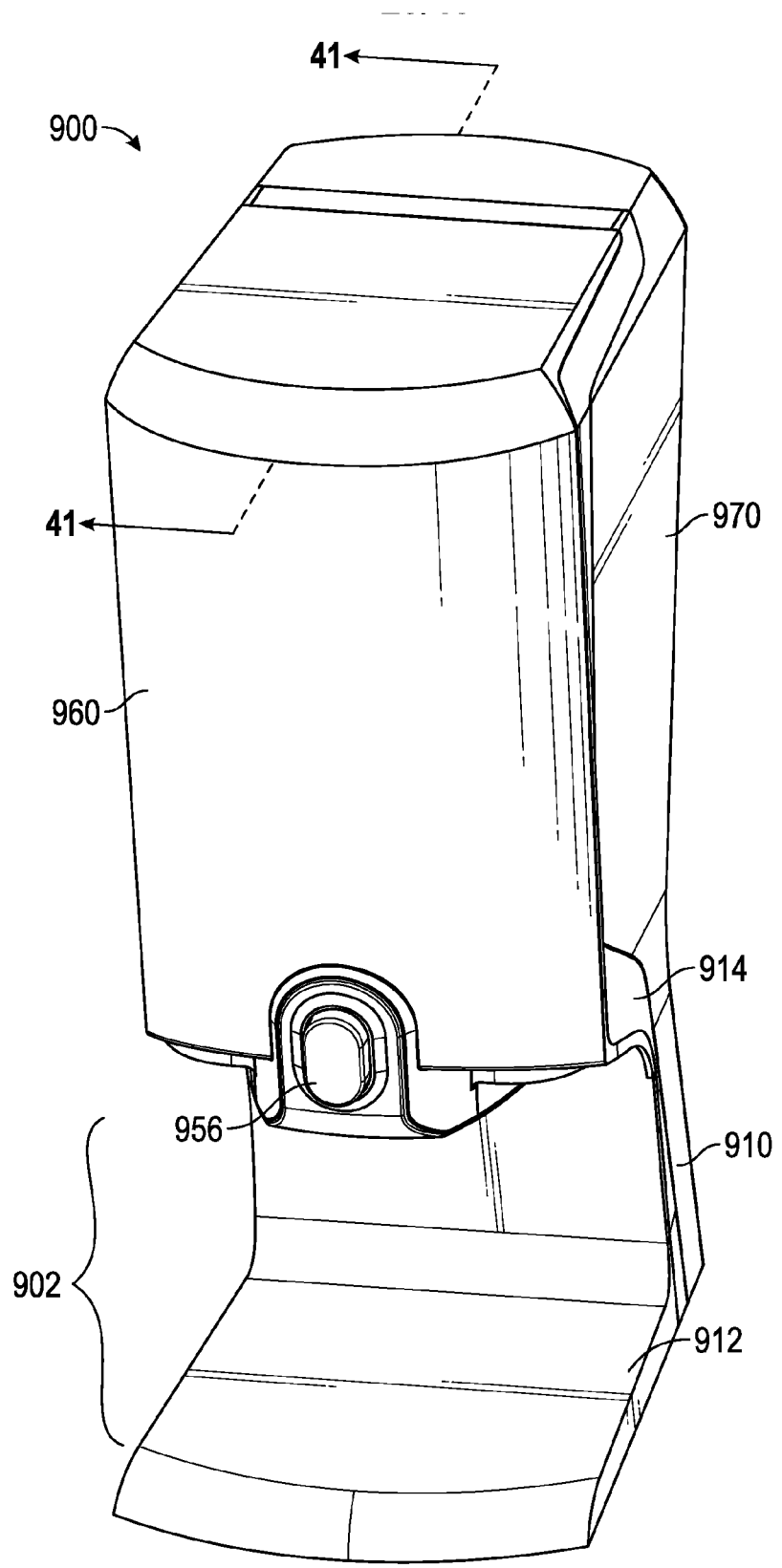
FIG. 38 is a top, front, right perspective view of a dispenser, shown according to another exemplary embodiment.

Referring to FIGS. 35-37, a dispenser 600 and components thereof are shown according to an exemplary embodiment. The dispenser 600 includes a frame 610 supporting a front housing 660 and a rear housing 670. According to an exemplary embodiment, the frame 610 is configured to support the other components of the dispenser 600. The frame 610 may be formed of a single piece of material, for example, a single piece of cast metal (e.g., aluminum, etc.) or injection molded plastic. According to other embodiments, the frame 610 may be assembled from a plurality of sub-components. For example, the frame 610 may include a base 612 configured to rest upon a surface (e.g., top, bar, table, etc.) and an upper portion 614 that is supported by the base 612 and configured to at least partially support the rear housing 670 and the front housing 660. A zone 602, generally defined below the front housing 660 and/or frame 610 and above the base 612 of the frame 610, allows for receiving products (e.g., sausage, chips, bowls, etc.) to be placed in appropriate proximity to the dispenser 600 to receive the flowable food product. According to an exemplary embodiment, the frame 610 is configured to be free-standing, that is, it does not rely upon the front housing 660 or the rear housing 670 provide support to the frame 610.

The frame 610 includes a top rail 618 and a lower rail 620, the lower rail 620 configured to support a pan, shown as bottom pan 630. For example, the bottom pan 630 may couple to or lean against projections, studs, or bosses 622.

The bottom pan 630 may include one or more thermally conductive (e.g., metallic, etc.) walls and one or more heating elements coupled to one or more of the walls. As shown, the bottom pan 630 includes a bottom wall 634 defining an opening 636. As shown, the opening 636 is configured to receive the fitment 210 of the bag 200. A sloped wall 638 extends upwardly and rearwardly from the bottom wall 634. The incline of the sloped wall 638 promotes the flow of the flowable food product in the bag 200 down toward the bottom wall 634, opening 636, and the fitment 210 and the valve, thereby causing a more complete evacuation of the bag 200. The bottom pan 630 further includes sidewalls 640, shown as left sidewall 640a and right sidewall 640b, and transitional walls 642, shown as left transitional wall 642a and right transitional wall 642b.

In use, the bottom pan 630 conducts heat from heating elements coupled to the bottom pan 630, through the walls 634, 638, 640, 642 through the bag 200, and into the flowable food product. Using a conductive heat transfer method provides a more efficient and consistent temperature in the flowable food product as compared to convection heating used in typical flowable food product dispensers. That is, the lag of heating air which heats the food product makes controlling the temperature more difficult than the more direct response in the food product achieved by conductive heating. Further, rather than approximating the temperature of the flowable food product from the temperature of the air in the dispenser, a temperature sensor located on one of the walls of the bottom pan 630 in direct contact with the bag 200 obtains a more accurate temperature measurement of the flowable food product. By placing the temperature sensor near the opening 636 (e.g. on the bottom wall 634), a measurement of the next serving of flowable food product to be dispensed may be taken. According to another embodiment, the bottom pan 630 may include multiple heating elements that may be independently controlled, thereby allowing different portions of the flowable food product to be heated differently, and thereby facilitating a more even distribution of temperature through the flowable food product.

The bottom pan 630 is preferably configured to maximize the contact area between the bottom pan 630 and the bag 200. Vertical sidewalls 640 and the transitional walls 642 increase the surface area of the bottom pan 630 thereby increasing the contact area between the bottom pan 630 and the bag 200. According to another embodiment (not shown), the bottom pan 630 may include waves or folds (e.g. "W", "M" shapes, etc.) to increase the surface area contact between the bottom pan 630 and the bag 200, thereby facilitating more efficient, more consistent, and faster heating of the flowable food product. The bottom pan 630 is preferably configured to minimize the distance between the flowable food product and the bottom pan 630. For example, the bag 200 may be hung or oriented vertically in a relatively tall narrow cavity, thereby increasing the surface area relative to volume. According to another example, the bag 200 may be laid substantially flat, also thereby increasing the surface area relative to volume. According to the embodiment shown, the dispenser 600 includes a second pan, shown as top pan 644. Top pan 644 may include one or more thermally conductive (e.g., metallic, etc.) walls and one or more heating elements coupled to the one or more of the walls. As shown, the top pan 644 has a bottom surface 646 configured to contact an upper surface the bag 200 when the bag 200 is in an installed position. Accordingly, the heated top pan 644 halves the distance from the flowable food product to the heat source. That is, without the top pan 644, the top of the flowable food product may be a distance X from the bottom pan 630. However, with a heated top pan 644 contacting the upper surface of the bag 200, the furthest distance from the flowable food product to one of the heated pans 630, 644 is approximately X/2, i.e., approximately the distance from the center of the flowable food product to the bottom pan 630 or the top pan 644. Top pan 644 may further be configured to support a second bag 200' (not shown) of flowable food product. Accordingly, the second bag 200' of flowable food product may be preheated while the first bag 200 of flowable food product is being used or preheated.

The rear housing 670 is supported by the frame 610 and at least partially defines a cavity 672 in which bottom pan 630 and the bag 200 reside when the bag 200 is in an installed position. The rear housing 670 prevents inadvertent contact by the operator with hot components of the dispenser 600. Rear housing 670 may be formed of any suitably durable material, for example, a low-cost, lightweight plastic.

The front housing 660 is also supported by the frame 610. According to an exemplary embodiment, the front housing 660 may be coupled to the frame 610 via a hinge 662. As shown, the front housing 660 may rotate between a first or closed position (shown, for example, in FIG. 35) that encloses the dispenser 600 and a second position or open position (shown, for example in FIG. 36) that allows for access to the cavity 672 for loading and unloading of bags 200, 200' to and from the dispenser 600. According to an exemplary embodiment, the second position may be one in which the front housing 660 is on top of, and at least partially supported by, the rear housing 670. Such rotation allows for opening and closing of the dispenser 600 when the dispenser 600 is located on a crowded surface which may inhibit opening the front housing 660 to a left or right side. According to other embodiments, the hinge 662 may be coupled to the frame 610 such that the front housing 660 of the dispenser 600 rotates open toward the left side or the right side of the dispenser. The front housing 660 may support an actuator, shown as a button 656, configured to receive an actuating force and/or motion from a user and transfer that force or motion to a valve. A spring 658 may be located between a slider 450, 550 (of one of the valves 400, 500 described above) and the frame 610. The spring 658 is configured to provide a return force to urge the slider 450, 550 toward the closed position. As shown in FIG. 36, the dispenser 600 may include a portion control system 1200, an exemplary embodiment of which is described in more detail below.

Referring to FIGS. 38-41, a dispenser 900 and components thereof are shown according to an exemplary embodiment. The dispenser 900 includes a frame 910 supporting a front housing 960 and a rear housing 970. According to an exemplary embodiment, the frame 910 is configured to support the other components of the dispenser 900. The frame 910 may include a base 912 configured to rest upon a surface (e.g., top, bar, table, etc.) and an upper portion 914 that is supported by the base 912 and configured to at least partially support the rear housing 970 and the front housing 660. The front housing 960 and the rear housing 970 have large two-dimensional surfaces (i.e., surfaces having a substantially continuous cross-section), which facilitates application of a sheet of graphics thereto. A zone 902, generally defined below the front housing 960 and/or frame 910 and above the base 912 of the frame 910, allows for receiving products (e.g., sausage, chips, bowls, etc.) to be placed in appropriate proximity to the dispenser 900 to receive the flowable food product. The dispenser 900 includes a button 956, the actuation of which causes the dispenser 900 to dispense flowable food product. The dispenser 900 is generally similar to the dispenser 600 shown and described above. Some of the differences between the dispenser 600 and the dispenser 900 are described below; however, it is understood that elements of each dispenser may be combined into other embodiments.

Figure 39:
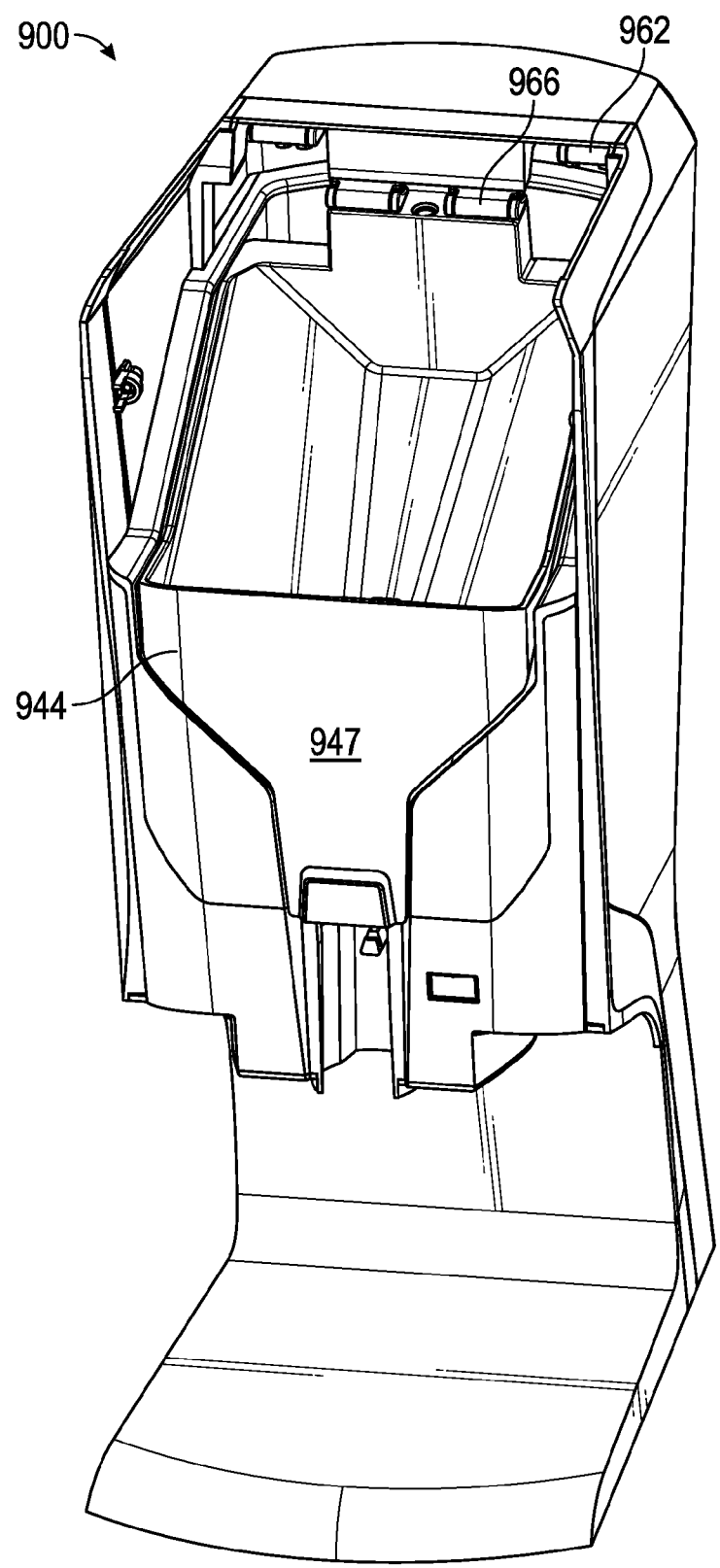
FIG. 39 is a top, front, right perspective view of the dispenser of FIG. 38, shown without the front housing or button, according to an exemplary embodiment.
Figure 40:
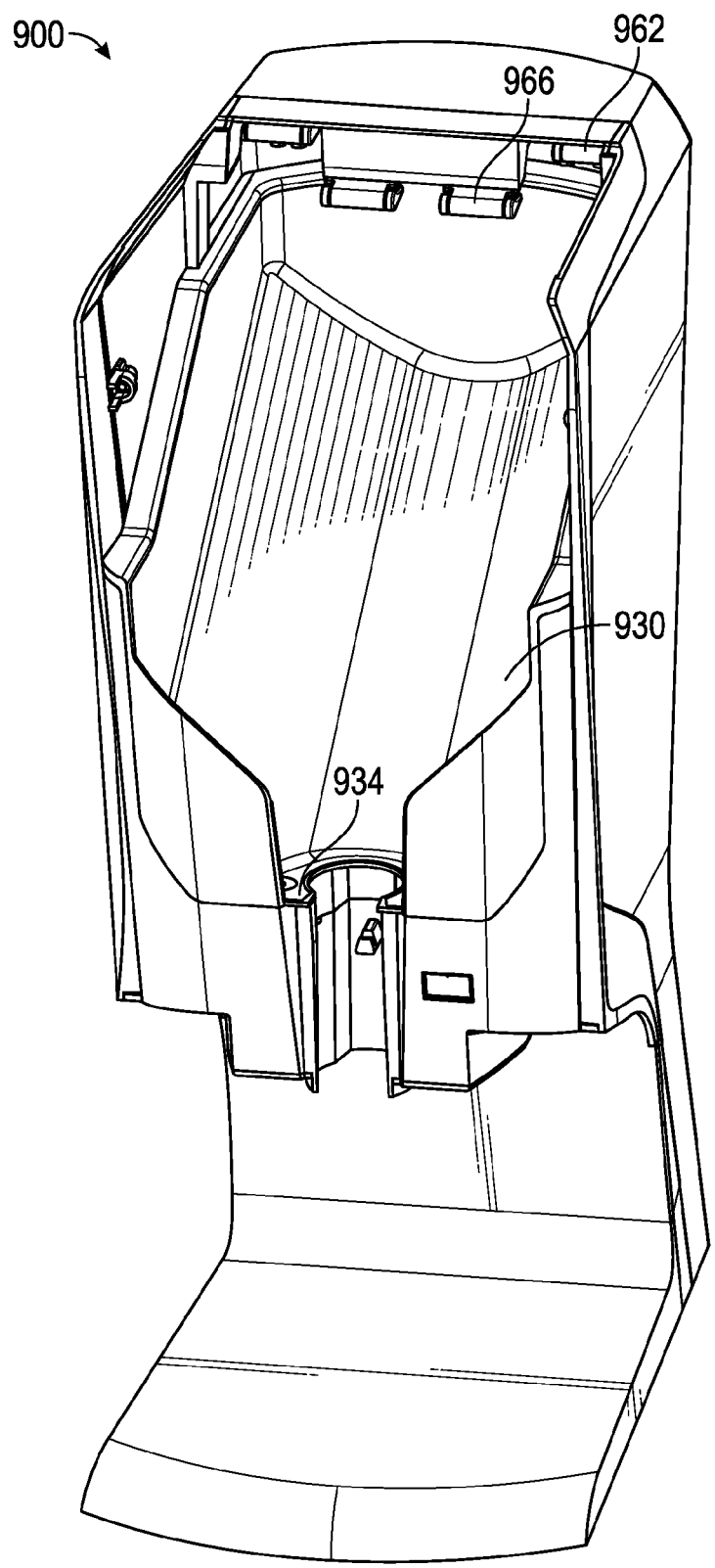
FIG. 40 is a top, front, right perspective view of the dispenser of FIG. 38, shown without the front housing, button, top pan, according to an exemplary embodiment.

Referring to FIGS. 39 and 40, perspective views of the dispenser 900 are shown without the front housing 960 or button 956, and without the front housing 960 or top pan 644, respectively. The front housing 960 rotates about a hinge 962 from a closed position (shown in FIG. 38) to an open position. The hinge 962 is located farther rearward than the hinge 662 of the dispenser 600, which provides a clearer, unobstructed path for a user to load the bag 200. The front housing 960 is coupled to an eccentric arm 964, which allows the hinge 962 to be located under the rear housing 970. The button 956 and the plunger 951 are coupled to the front housing 960 and rotate with the front housing 960. The dispenser 900 includes a top pan 944 that is interconnected to the frame 910 via a hinge 966. The hinge 966 is located forward of the hinge 962, which enables the top pan 944 to be rotated from an operating position (shown in FIG. 39) to an open position that is self-supportingly, stably open, thereby providing an unobstructed path for a user to load the bag 200 into the bottom pan 930.

Figure 41:
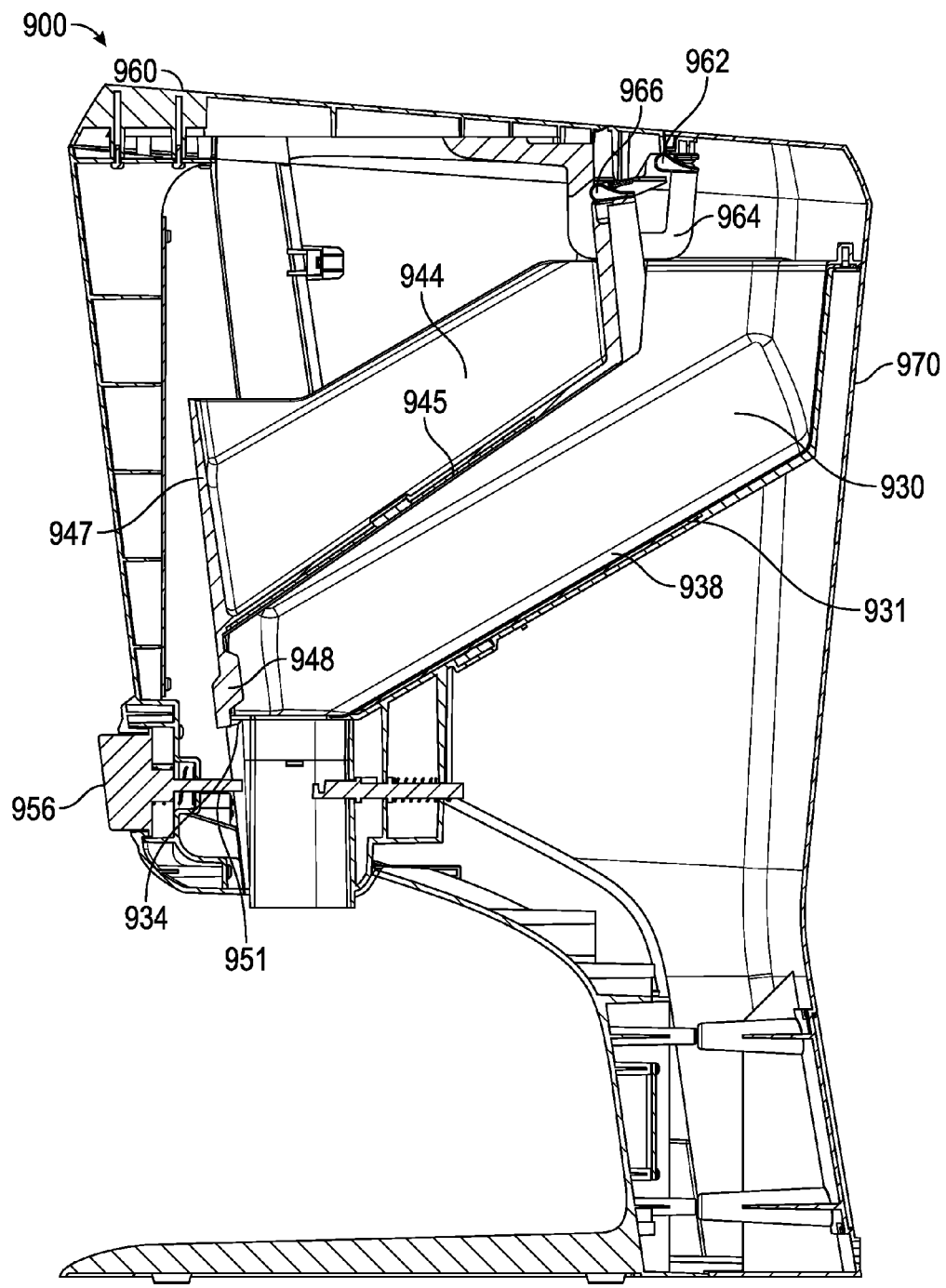
FIG. 41 is a right elevation of the dispenser of FIG. 38, sectioned through line 41-41, according to an exemplary embodiment.

Referring to FIG. 41, the top pan 944 is shown to include a heating element 945 in the bottom wall thereof. The bottom pan 930 is shown to include a heating element 931 in the sloped wall 938. According to one embodiment, the heating elements 931, 945 may be coupled to a surface of the pans 940, 944. As shown in top pan 944, the heating element 945 may be formed or sealed within the pan 944. As shown in bottom pan 930, the heating element 931 may be layered between two shells of the pan 930. As discussed above with respect to the dispenser 600, having heating elements 931, 945 below and above the bag 200 in the bottom pan 930 increases heat transfer rates into the flowable food product and provides a more consistent temperature through the flowable food product in the bag 200, which enables a bag 200 to be raised from room temperature to operating temperature more quickly.

The bottom pan 930 has a bottom wall 934 and a sloped wall 938 extending upward and rearward from the bottom wall 934. The bottom wall 934 defines an opening 936 for receiving the fitment 210 in a downward facing direction. Orienting fitment 210 downwards facilitates evacuation of the flowable food product from the bag 200. The sloped wall 938 has a steep angle to facilitate gravity forced evacuation. The internal surfaces of the bottom pan 930 are smooth and flush to facilitate cleaning of the pan 930.

Referring to FIGS. 39 and 41, the top pan 944 includes a front wall 947 that includes a latch 948. The latch 948 engages (e.g., clips, snaps, etc.) the bottom wall 934 of the bottom pan 930. Engaging the top pan 944 to the bottom pan 930 keeps the top pan 944 in contact with the bag 200 in the bottom pan even if there is not a bag in the top pan 944, which facilitates heat transfer from the top pan 944 into the bag 200 in the bottom pan 930. Further, latching the top pan 944 prevents the bag 200 from sliding down to the bottom of the bottom pan 930, which may create folds in the bag that may reduce the evacuation efficiency of the flowable food product. Further, latching the top pan 944 to the bottom pan 930 helps to seal off the interior of the unit from the flowable food product. Any food product that my leak from the bag 200 may be captured in the bottom pan 930 or directed through the opening 936 in the bottom wall 934, thereby preventing the flowable food product from contacting or dirtying other parts of the dispenser 900.

Figure 42:
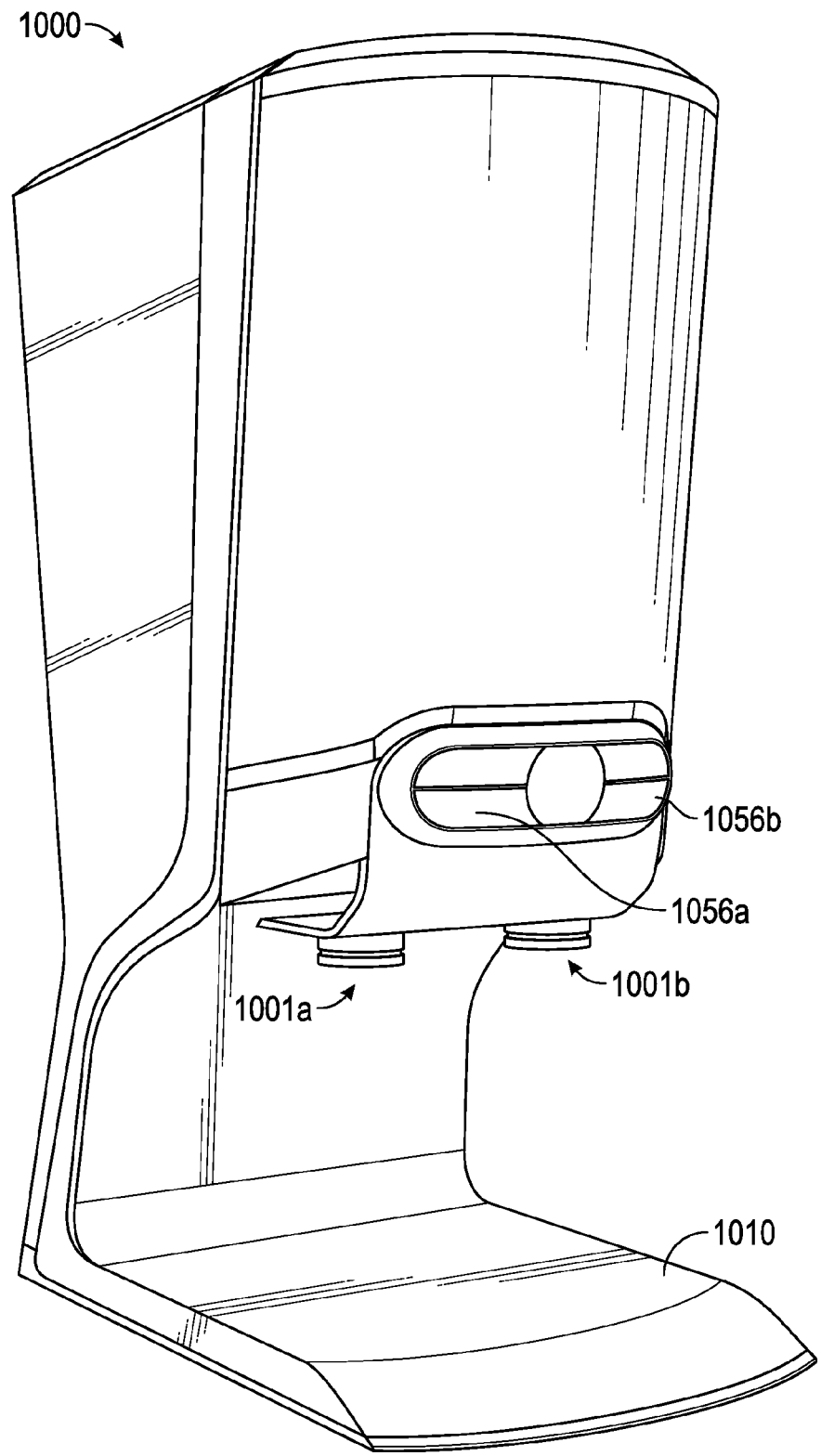
FIG. 42 is a front left perspective view a dispenser, shown according to another exemplary embodiment.
Figure 43:
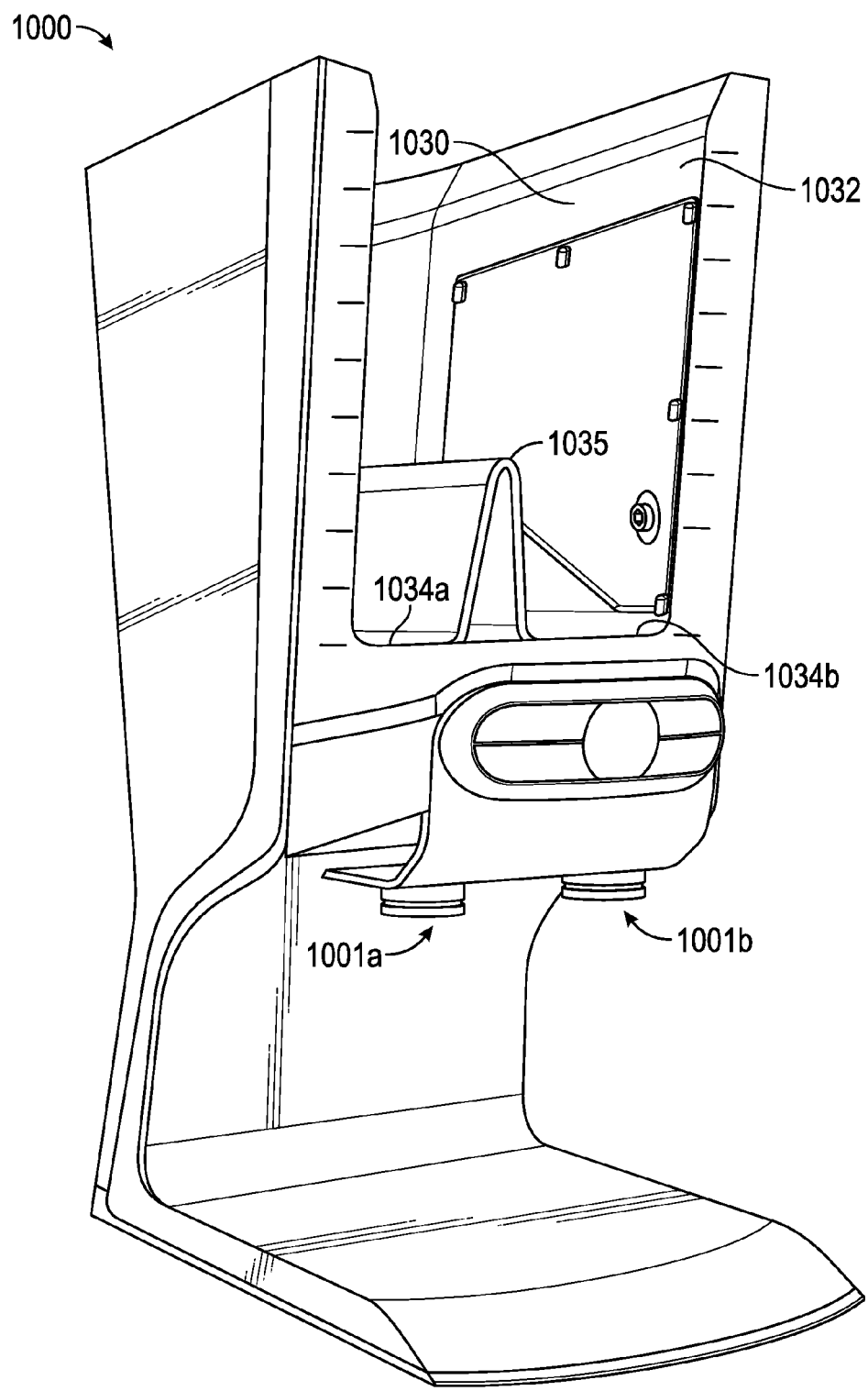
FIG. 43 is a front left perspective view of a portion of the dispenser of FIG. 42 with the front housing removed, shown according to an exemplary embodiment.

Referring to FIGS. 42 and 43, a dispenser 1000 is shown according to an exemplary embodiment. The dispenser 1000 is a side-by-side, dual outlet dispenser. The dispenser 1000 includes a frame 1010. The frame 1010 is shown to be approximately the size of frames 610, 910 and approximately twice the width of frames 110, 710. Internally, the dispenser 1000 includes side-by-side pan assemblies 130, 730. As shown, the dispenser 1000 includes a first button 1056a, the actuation of which causes flowable food product to be dispensed from a first outlet 1001*a*. The dispenser further includes a second button 1056*b*, the actuation of which causes flowable food product to be dispensed from a first outlet 1001*b*. According to one embodiment, the dispenser 1000 may be used such that both outlets 1001 are operable, dispensing the same or different (e.g., type, flavor, etc.) flowable food products. According to another embodiment, one of the first and second sides may be operable while the other of the first and second sides maintains the flowable food product at a holding temperature. For example, the food product in the second side may be raised to the operating temperature when it is determined that the bag 200 on the first side is nearing empty (e.g., below a predetermined level, below a level equal to the usage rate times the time required to raise the second bag to the operating temperature, etc.). When the first bag is evacuated, then dispenser 1000 may then be set such that the second side is operable. The bag in the first side may be replaced and raised to the holding temperature while the dispenser operates off of the second side. The holding temperature may be, for example, approximately 100° F. which is warm enough for cheese to flow, but cool enough so that the cheese does not brown.

Referring to FIG. 43, the dispenser 1000 includes a pan assembly 1030. The pan assembly 1030 includes a body 1032 that is shown to include a bottom wall 1034, shown as a first bottom wall portion 1034*a* and a second bottom wall portion 1034*b*. The first bottom wall portion 1034*a* corresponds to the first outlet 1001*a*, and the second bottom wall portion 1034*b* corresponds to the second outlet 1001*b*. The first and second bottom wall portions 1034*a*, 1034*b* are separated by a wall 1035 (e.g., divider, dividing wall, center wall, dam, saddle, etc.). The wall 1035 provides lateral support for each of the bags 200 in the dispenser 1000 to help hold the bags 200 in a substantially upright positions. The wall 1035 may include one or more heating elements (e.g., heating elements 144, 744) to help heat the flowable food product. Providing heating elements in the wall 1035 and in the outer walls of the body 1032 improves the heating of the flowable food product by heating the bag 200 from both sides, as discussed above. According to various embodiments, the pan assembly 1030 may include an opening (e.g., opening 136, 736), rear sloped wall (e.g., sloped wall 138, 738), and/or a front sloped wall (e.g., front sloped wall 739) in relation to one, each, or both of the first and second bottom wall portions 1034*a*, 1034*b*.

Figure 44:
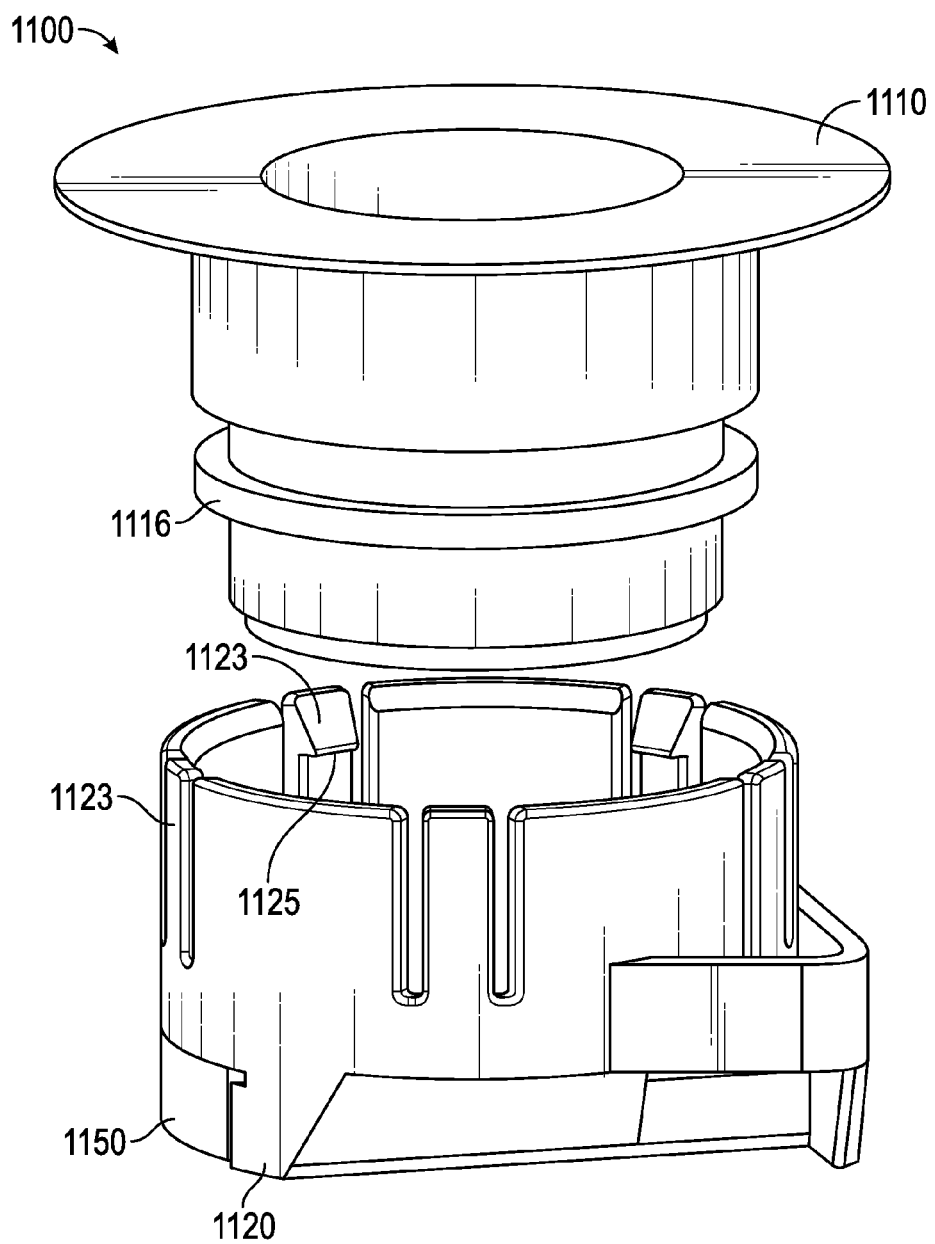
FIG. 44 is a top, rear, left exploded perspective view of a valve, shown according to another exemplary embodiment.
Figure 45:
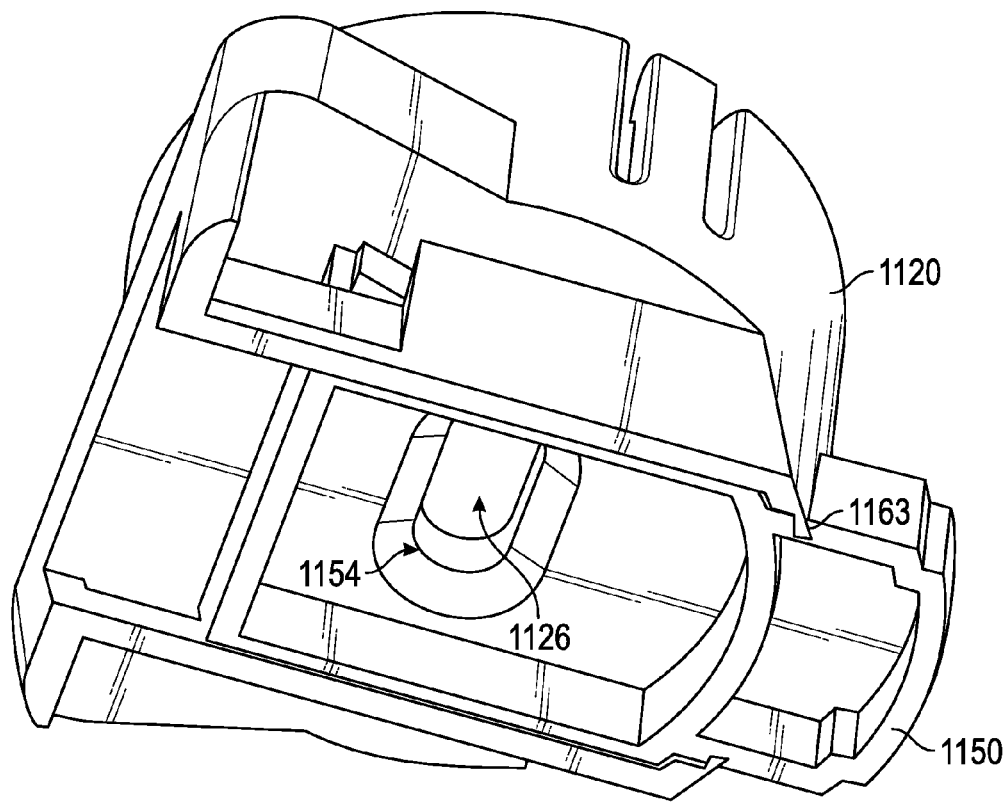
FIG. 45 is a bottom perspective view of a portion of the valve of FIG. 44, shown according to an exemplary embodiment.

Referring to FIGS. 44-45, a fifth valve 1100 is shown, according to an exemplary embodiment. The valve 1100 includes a fitment 1110, a body 1120, and a slider 1150. The fitment 1110 may be a conventional fitment in which a shipping cap is removed and the bag 200 is punctured prior to coupling the body 1120 to the fitment 1110. When the body 1120 is coupled to the fitment 1110, fingers 1123 having a barb 1125 engage (e.g., snap, clip, grab, secure) a flange 1116 on the fitment 1110. The fingers 1123 may be configured to break if a person attempts to remove the body 1120 from the fitment 1110, thereby preventing reassembly and reducing the possibility of tampering with the bag 200 or flowable food product therein. The engagement of the fingers 1123 and the fitment 1110 allows the body 1120 to rotate relative to the bag 200, thus allowing the bag 200 to be rotated after the body 1120 is installed into the dispenser 900, thereby facilitating installation of the bag 200 into the dispenser.

The interaction of the slider 1150 and the body 1120 is similar to the interaction of the slider 450 and the probe 420 as described above with respect to the valve 400. For example, the slider 1150 translates between a first or closed position, in which the opening 1126 in the body 1120 is offset from the opening 1154 in the slider 1150, and a second or open position, in which the opening 1126 and the opening 1154 overlap (see, e.g., FIG. 45), thereby allowing flowable food product to flow through the valve 1100.

Referring to FIG. 45, the body 1120 may include perforated or breakaway tabs 1163. The tabs 1163 may hold the slider 1150 in a closed position during manufacture and shipping, thereby preventing accidental opening of the valve 1100. By holding the slider 1150 in the closed position, the tabs 1163 enable the valve 1100 to be used as a seal to the bag 200, thereby allowing the bag 200 to be sterilely pre-punctured during manufacturing. According to such an embodiment, the breakable tabs may be configured to break upon the first actuation of the valve 400. The breakable tabs may further provide evidence of tampering with the valve. Note that in FIG. 45, the tabs 1163 are shown to intersect the slider 1150 because the tabs 1163 would have broken away when the slider 1150 was moved to the open position shown in FIG. 45.

Figure 46:
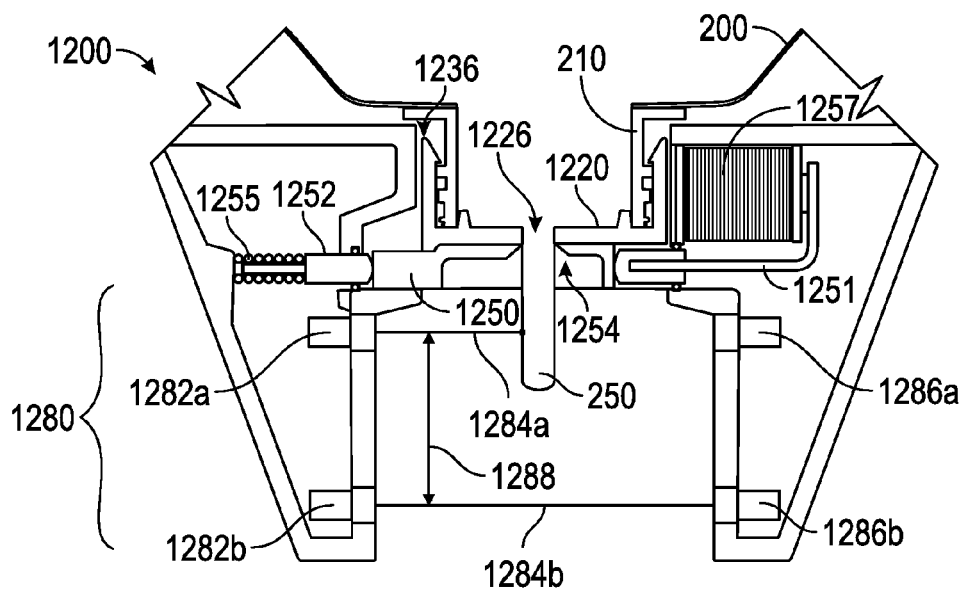
FIG. 46 is a schematic diagram of a portion control system, shown according to an exemplary embodiment.

Referring to FIG. 46, a schematic diagram of a portion control system 1200 is shown, according to an exemplary embodiment. The dispensers 100, 700, 900, 1000 are described above as being manually actuated. However, it is contemplated that the dispensers may be electrically actuated. As shown, a fitment 210 is coupled to a bag 200 and is received in an opening 1236 of a dispenser. A valve probe or body 1220 is coupled to the fitment 210, and a slider 1250 is coupled to the valve body 1220 as described with respect to the valves above. For example, the slider 1250 moves between a first or closed position, in which the opening 1226 in the body 1220 is offset from the opening 1254 in the slider 1250, and a second or open position, in which the opening 1226 and the opening 1254 overlap (see, e.g., FIG. 46), thereby allowing flowable food product to flow from the bag 200 through the valve. While the portion control system 1200 is described with respect to a slider valve, it is contemplated that the portion control system 1200 may be used with any other valve (e.g., valve 300, etc.).

The portion control system 1200 includes an actuator (e.g., motor, stepper motor, electric actuator, etc.), shown as solenoid 1257. The solenoid 1257 is operably coupled to the first plunger 1251 such that when the solenoid 1257 is energized, the first plunger 1251 moves from the closed position toward the open position, in turn moving the slider 1250 from the closed position toward the open position. A second plunger 1252 is shown to be located on the opposite side of the slider 1250 from the first plunger 1251. As the slider 1250 moves toward the open position, it pushes the second plunger 1252, which compresses a spring 1255. When the opening force is reduced or removed from the first plunger 1251 (e.g., when the solenoid 1257 is de-energized), the spring 1255 pushes the slider 1250 towards the closed position. According to one embodiment, the first plunger 1251 may include a return spring and engage the slider 1250 (see, e.g., plunger 751 shown in FIG. 6), in which case, the portion control system 1200 may not include a second plunger 1252. According to another embodiment, the portion control system 1200 may not include a first plunger 1251, instead having the second plunger 1252 coupled to the slider 1250 so as to pull the slider 1250 toward the open position, in which case the solenoid 1257 would be operably coupled to the second plunger 1252.

The solenoid 1257 may be operably connected to a button (e.g., button 756, button 956, etc.) on the dispenser. For example, the button may actuate a switch, which in turn causes the solenoid 1257 to energize. According to another embodiment, the solenoid 1257 may be controlled by processing electronics 1406.

To determine the amount of flowable food product dispensed from the dispenser one may multiply the flow rate (i.e., volume per time) by the amount of time that the flowable food product is dispensed. The flow rate may be calculated by the velocity of the stream 250 of flowable food product being dispensed times a cross-sectional area of the stream 250. The applicants have determined that velocity of the stream 250 is not simply a gravitational acceleration calculation, but a function of the pressure of the flowable food product in the bag 200 (which in turn is a function of the density and the height of the flowable food product in the bag) and viscosity of the flowable food product (which in turn is a function of the type of flowable food product (e.g., cheese, chili, etc.) and temperature). Accordingly, the portion control system 1200 and processing electronics 1406 are configured to determine and/or control, among other things, the amount of flowable food product being dispensed from the dispenser.

The portion control system 1200 further includes a trap 1280 configured to determine the velocity of the stream 250 of dispensed flowable food product. The trap 1280 includes a first emitter (e.g., laser, light, etc.), shown as first LED 1282a sending a first beam 1284a toward a first receiver 1286a. The trap 1280 includes a second emitter (e.g., laser, light, etc.), shown as second LED 1282b sending a second beam 1284b toward a second receiver 1286b. As shown, the first beam 1284a and the second beam 1284b pass directly underneath the opening 1226, both substantially perpendicular (e.g., substantially horizontal) to the stream 250 of dispensed flowable food product, and the second beam 1284b a predetermined distance 1288 below the first beam 1284a.

As the flowable food product is dispensed, the stream 250 passes through the first beam 1284a, thereby blocking the first beam 1284a from striking the first receiver 1286a. When the first receiver 1286a does not receive the first beam 1284a, the first receiver 1286a sends a first timing signal to processing electronics 1406. As the stream 250 continues to fall, the stream 250 passes through the second beam 1284b, thereby blocking the second beam 1284b from striking the second receiver 1286b. When the second receiver 1286b does not receive the second beam 1284b, the second receiver 1286b sends a second timing signal to processing electronics 1406. The velocity of the stream 250 may be determined from the predetermined distance 1288 between the first beam 1284a and the second beam 1284b divided by the temporal difference between the first timing signal and the second timing signal.

Figure 47:
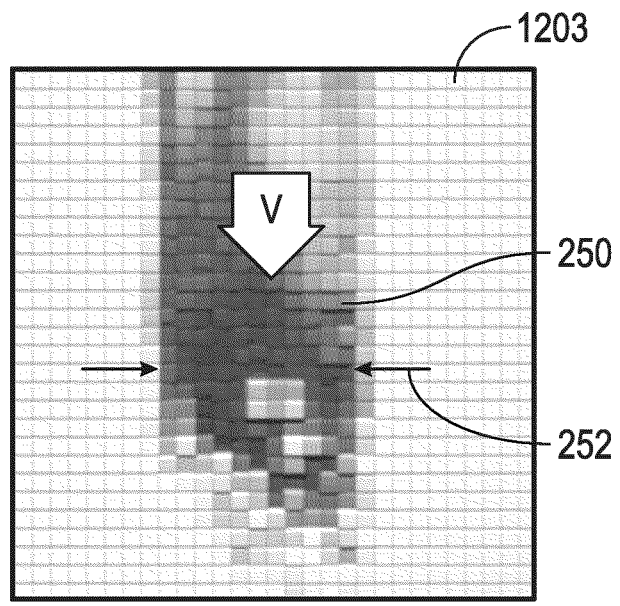
FIG. 47 is a diagram of a camera image of a stream of flowable food product, shown according to an exemplary embodiment.
Figure 48:
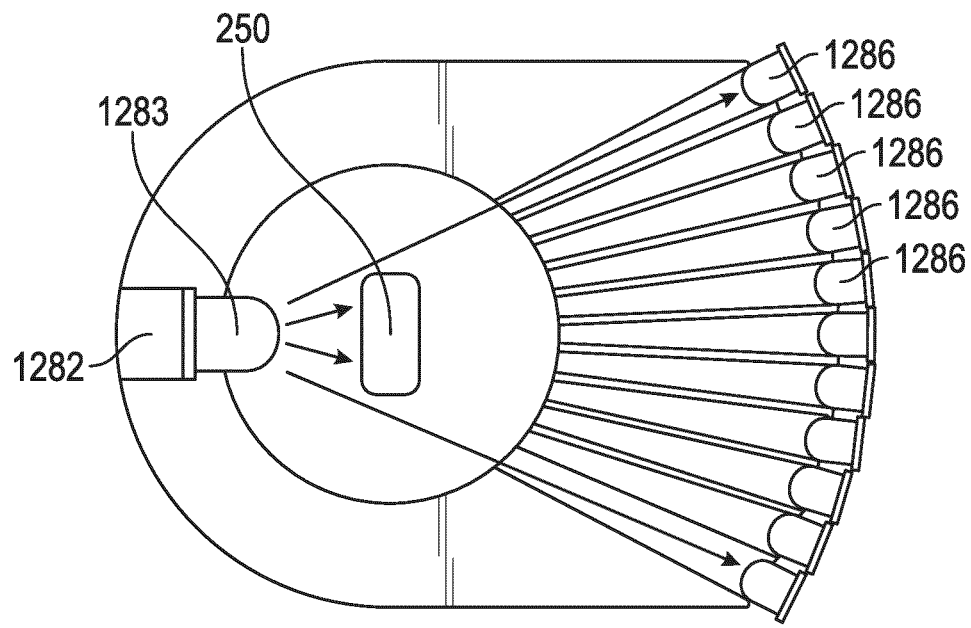
FIG. 48 is a diagram of an emitter and an array of receivers, shown according to an exemplary embodiment.

Referring to FIGS. 46-48, the cross-sectional area of the stream may be determined in various ways according to various embodiments. According to the embodiment shown in FIG. 46, the cross-sectional area of the stream 250 may be estimated to equal the area of the lesser (or projected overlap) of the opening 1226 and the opening 1254. According to another embodiment, the cross-sectional area of the stream 250 may be predetermined through empirical observation to be a value slightly less than the area of the lesser (or projected overlap) of the opening 1226 and the opening 1254. According to the embodiment shown in FIG. 47, a camera may store video or sequential images 1203 of the area below the openings 1226, 1254. Processing electronics 1406 may rasterize the sequential images 1203 and determine diameter 252 of the stream 250. The rasterized image 1203 may also be used by the processing electronics 1406 to determine a diameter the velocity of the stream 250 based on the distance travelled by the stream 250 over the period of time between sequential images 1203. According to the embodiment shown in FIG. 48, the trap 1280 may include an emitter 1282 providing a substantially horizontal array (e.g., fan, spread, plurality of beams, sector, etc.) of light to a plurality of receivers 1286. The array of light may be formed, for example by a prism or lens 1283. A dimension (e.g., width, diameter, etc.) of the stream 250 may be determined from the number of the plurality of receivers 1286 that do not receive the light emitted from the emitter 1282. According to another embodiment, the plurality of receivers 1286 may be oriented in a vertical array, which may be used to determine the velocity of the stream 250 based on the rate at which the receivers 1286 are blocked. According to another embodiment, a two-dimensional array (i.e., an array having both vertical and horizontal components) of receivers 1286 may be used to determine both a dimension and velocity of the stream 250.

Figure 49:
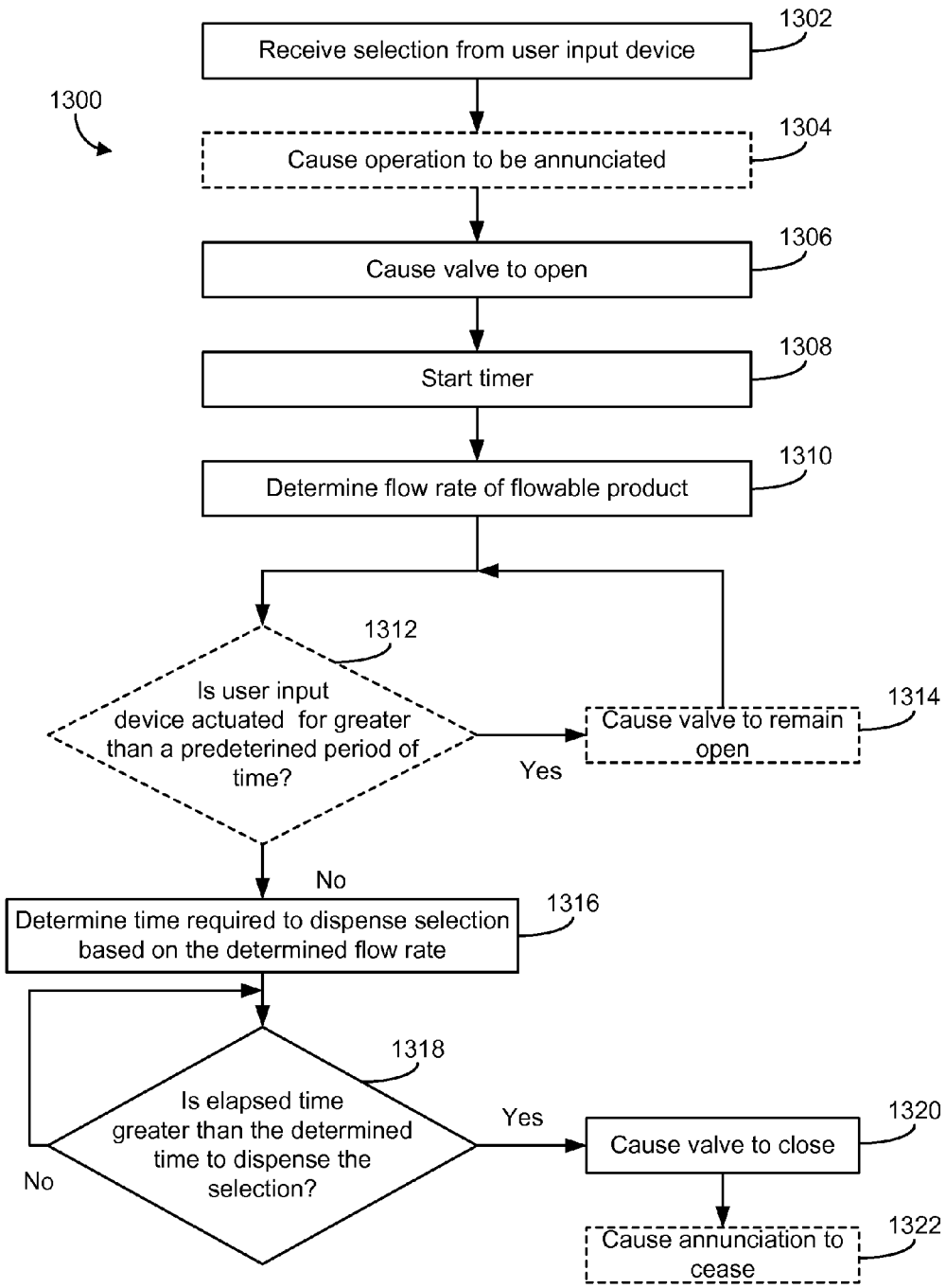
FIG. 49 is a flowchart of a process for dispensing flowable food product from a dispenser, shown according to an exemplary embodiment.

Referring to FIG. 49, a flowchart of a process 1300 for dispensing flowable food product from a dispenser is shown according to an exemplary embodiment. The process 1300 includes the steps of receiving a selection from a user input device (e.g., button; button 156, 656, 756, 956, 1056a, 1056b; switch; touchscreen, etc.) (step 1302), causing the valve to open (step 1306), starting a timer (step 1308), and determining a flow rate of the dispensed flowable food product (step 1310). The process 1300 may include the step of causing an operation to be annunciated (step 1304). According to one embodiment, the process 1300 may determine if the user input device has been actuated for greater than a predetermined period of time (e.g., long hold, continuous hold, etc.) (step 1312). If yes, the valve remains open (step 1314). The process 1300 includes the steps of determining a time required to dispense the selection based on the determined flow rate (step 1316) and determining whether the elapsed time is greater than the determined time for dispensing the selection (step 1318). If yes, the valve closes (step 1320). In an embodiment in which the operation is annunciated, the annunciation is ceased (step 1322).

To facilitate understanding, an exemplary embodiment of the process 1300 will be described with respect to the portion control system 1200 and processing electronics 1406. The dispenser 100, 600, 700, 900, 1000 may include one or more buttons 156, 656, 756, 956, 1056a, 1056b. For example, the dispenser may include a plurality of buttons indicating different portion sizes (e.g., small, medium, large, sausage, nachos, volume, etc.). The processing electronics 1406 receive the user selection and, in response, may cause operation of the dispenser to be annunciated to a user. For example, a LED on the button may illuminate to indicate the selection was received. The processing electronics 1406 cause the valve to open (e.g., by energizing the solenoid 1257) and begin a timer. The processing electronics 1406 may be configured to differentiate between the length of time that the button is depressed. For example, a short press may cause a portion-controlled dispensing (e.g., automatic mode), while a continuously held press may cause flowable food product to be dispensed as long as the button is depressed (e.g., manual mode). According to various embodiments, the LED may flash when in automatic mode, may be constant in manual mode, or vice versa. For a portion-controlled dispensing, the processing electronics 1406 determines the flow rate of the flowable food product being dispensed (e.g., using one of the embodiments of the portion control system 1200 described above) and determines the time required to dispense the selection based on the flow rate and the portion size selected. When the elapsed time is greater than the time required to dispense the selection, the processing electronics 1406 cause the valve to close, for example, by de-energizing the solenoid 1257. The LED may be turned off after the valve is closed.

According to various embodiments, the processing electronics 1406 may sum the total amount of flowable food product dispensed from the dispenser over a period of time. For example, tallying the flow rate of the stream 250 times the time that the valve is open may provide a running total of the volume dispensed. This tally may be reset when a new bag 200 is installed into the dispenser. The processing electronics 1406 may then estimate how much food product is remaining in the bag 200. The processing electronics 1406 may determine when a second bag 200' of flowable food product should be raised to an operating temperature and initiate causing the temperature rise or alert (e.g., via light, sound, text message, email, etc.) an operator to begin warming the second bag 200'. The processing electronics 1406 may use the tally to self-calibrate the portion control system 1200 and algorithms of the processing electronics 1406. The processing electronics 1406 may use a tally to calculate an evacuation efficiency when the bag 200 is replaced. A long-term tally may be used by an operator to identify rates and trends (e.g., evening rush, weekend rush, in-game rush, etc.) of dispenser use, which may be used to improve profitability.

Figure 50:
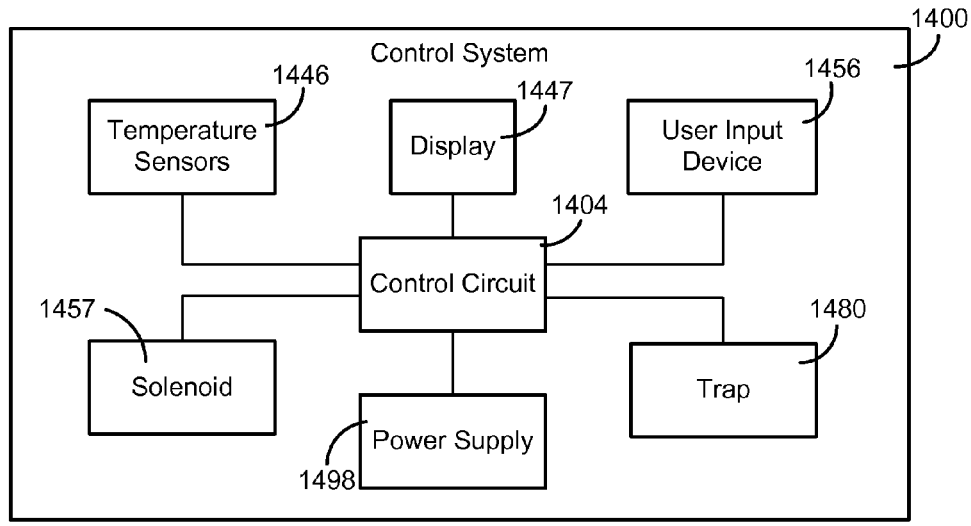
FIG. 50 is a schematic block diagram of a control system for a dispenser, shown according to an exemplary embodiment.

Referring to FIG. 50, a schematic block diagram of a control system 1400 for a dispenser (e.g., dispenser 100, 600, 700, 900, 1000) is shown, according to an exemplary embodiment. The control system 1400 is shown to include a control circuit 1404, temperature sensors 1446, a display 1447, a user input device 1456, a solenoid 1457, a trap 1480, and a power supply 1498.

Figure 51:
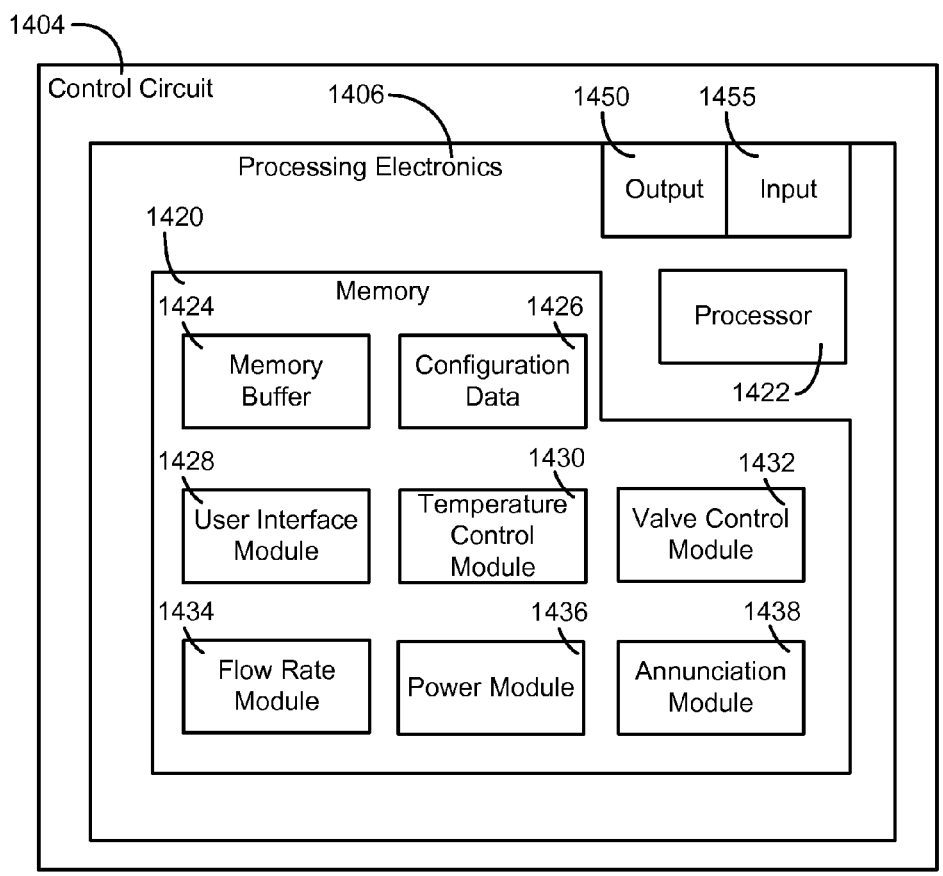
FIG. 51 is a schematic block diagram of a control circuit for a dispenser, shown according to an exemplary embodiment.

Referring to FIG. 51, a detailed block diagram of a control circuit 1404 of FIG. 50 is shown, according to an exemplary embodiment. The control circuit 1404 is shown to include processing electronics 1406, which includes a memory 1420 and processor 1422. Processor 1422 may be or include one or more microprocessors, an application specific integrated circuit (ASIC), a circuit containing one or more processing components, a group of distributed processing components, circuitry for supporting a microprocessor, or other hardware configured for processing. According to an exemplary embodiment, processor 1422 is configured to execute computer code stored in memory 1420 to complete and facilitate the activities described herein. Memory 1420 can be any volatile or non-volatile memory device capable of storing data or computer code relating to the activities described herein. For example, memory 1420 is shown to include modules 1428-1438 which are computer code modules (e.g., executable code, object code, source code, script code, machine code, etc.) configured for execution by processor 1422. When executed by processor 1422, processing electronics 1406 is configured to complete the activities described herein. Processing electronics 1406 includes hardware circuitry for supporting the execution of the computer code of modules 1428-1438. For example, processing electronics 1406 includes hardware interfaces (e.g., output 1450) for communicating control signals (e.g., analog, digital) from processing electronics 1406 to the control circuit 1404. Processing electronics 1406 may also include an input 1455 for receiving, for example, data/signals from the control circuit 1404, temperature data from sensors 1446, or timing signals from trap 1480, or for receiving data or signals from other systems or devices.

Memory 1420 includes a memory buffer 1424 for receiving user input data, sensor data, timing data, etc., from the control circuit 1404. The data may be stored in memory buffer 1424 until buffer 1424 is accessed for data. For example, user interface module 1428, temperature control module 1430, flow rate module 1434, or another process that utilizes data from the control circuit 1404 may access buffer 1424. The data stored in memory 1420 may be stored according to a variety of schemes or formats. For example, the user input data may be stored in any suitable format for storing information.

Memory 1420 further includes configuration data 1426. Configuration data 1426 includes data relating to sensors 1146, display 1447, user input device 1456, solenoid 1457, and trap 1480. For example, configuration data 1426 may include sensor operational data, which may be data that temperature control module 1430 can use to interpret sensor data from control circuit 1404. For example, configuration data 1426 may include voltage to temperature curves. For example, configuration data 1426 may include display operational data which may be data that user interface module 1428 or annunciation module 1438 can interpret to determine how to command control circuit 1404 to operate a display 1447. For example, configuration data 1426 may include information regarding size, resolution, refresh rates, orientation, location, and the like. Configuration data 1426 may include touchscreen operational data which may be data that user interface module 1428 can use to interpret user input data from memory buffer 1424. For example, configuration data 1426 may include solenoid operational data, which may be data that valve control module 1432 can interpret to determine how to command control circuit 1404 to operate a solenoid 1457. For example, configuration data 1426 may include information regarding flow rate information, which may be data that the flow rate module 1434 can use to interpret signals from the trap 1480.

Memory 1420 further includes a user interface module 1428, which includes logic for using user input data in memory buffer 1424 and/or signals from control circuit 1404 to determine desired user responses. User interface module 1428 may be configured to interpret user input data to determine various buttons being pressed, button combinations, button sequences, touchscreen gestures (e.g., drag versus swipe versus tap), the direction of gestures, and the relationship of these gestures to icons. User interface module 1428 may include logic to provide input confirmation (e.g., via annunciation module 1438 and the display 1447) and to prevent unintended input.

Memory 1420 further includes a temperature control module 1430, which includes logic for interpreting data from temperature sensors 1446. For example, the temperature control module 1430 may be configured to interpret signals from temperature sensors 1446 or memory buffer 1424, in conjunction with look up tables or curves from configuration data 1426, to provide temperature data to the processor 1422 and other modules. The temperature control module 1430 may include logic for heating the flowable food product, for maintaining the temperature of the flowable food product within operating parameters, and alerting other modules if the temperature of the flowable food product leaves operating parameters.

Memory 1420 further includes a valve control module 1432, which includes logic for controlling the flow control valves (e.g., valve 300, 400, 500, 800, 1000). For example, valve control module 1432 may include logic for processing user input from user interface module 1428 and flow rate data from flow rate module 1434 to provide commands to the solenoid 1457 over the control circuit 1404.

Memory 1420 further includes a flow rate module 1434, which includes logic for interpreting data from the trap 1480. For example, the flow rate module 1434 may be configured to interpret timing signals from the trap 1480 or memory buffer 1424, in conjunction with look up tables or curves from configuration data 1426, to provide timing, velocity, and stream dimension data to the processor 1422 and other modules. The flow rate module 1434 may include logic for calculating the velocity of the stream 250, the flow rate of the stream 250, and a tally of the volume dispensed.

Memory 1420 further includes a power module 1436, which includes logic for controlling and interpreting signals from the power supply 1498. For example, the power module 1436 may include logic for handling a power loss, interpreting data from the temperature control module 1430, and alerting other modules of a power loss or if the temperature of the flowable food product has likely left the operating parameters during a power loss. For example, the power module 1436 may include logic for providing power to heating elements in the dispenser.

Memory 1420 further includes an annunciation module 1438, which includes logic for controlling the display 1447 and/or any other lights or electroacoustic transducers on the dispenser. For example, the annunciation module 1438 may be configured to interpret signals from temperature control module 1430, temperature sensors 1446, or memory buffer 1424, in conjunction with look up tables or curves from configuration data 1426, to determine how to command control circuit 1404 to cause the display 1447 to display the temperature of the flowable food product. For example, the annunciation module 1438 may be configured to interpret signals from the user interface module 1428 or memory buffer 1424 and to cause a light on a button illuminate in response to being selected.

Figure 52:
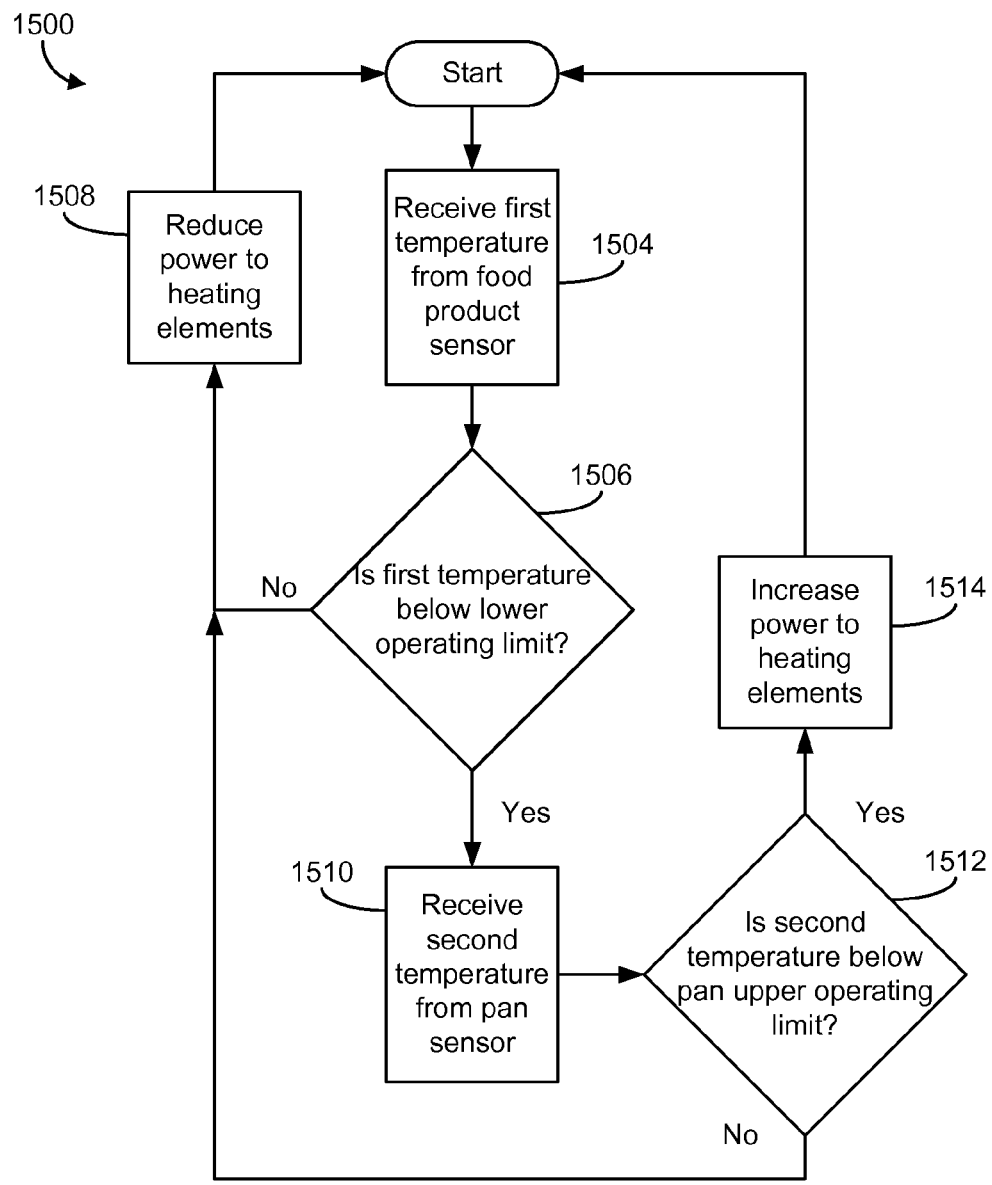
FIG. 52 is a flowchart of a process for controlling the temperature of a flowable food product in a dispenser, shown according to an exemplary embodiment.

Referring to FIG. 52, a flowchart of a process 1500 for controlling the temperature of a flowable food product in a dispenser is shown according to an exemplary embodiment. The process 1500 includes the steps of receiving a first temperature from a food product sensor (step 1504) and determining if the first temperature is below a lower operating limit for the flowable food product (step 1506). If no, then reduce power to the heating elements (step 1508). If yes, then receive a second temperature from a pan sensor (step 1510) and determine if the pan temperature is below a pan upper limit operating temperature (step 1512). If no, then reduce power to the heating elements (step 1508). If yes, then increase power to the heating elements (step 1514).

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A dispenser for dispensing a flowable food product from a flexible reservoir supported by a dispenser, the reservoir having a valve configured to selectively dispense the flowable food product, the dispenser comprising:
    a heating plate configured to contact the flexible reservoir when the flexible reservoir is supported in the dispenser;
    a heating element configured to heat the heating plate such that heat is conducted from the heating plate through the flexible reservoir to the flowable food product;
    a display configured to display a temperature of the flowable food product within the flexible reservoir; and
    a frame configured to support a pan assembly, the pan assembly defining a cavity configured to receive the flexible reservoir, wherein the pan assembly includes a sidewall extending substantially vertically upward to an upper portion extending substantially around an upper perimeter of the sidewall and proximate to the cavity, wherein the upper portion extends outward and away from the cavity at an angle.

2. The dispenser of claim 1, wherein the heating element inductively heats the heating plate.

3. The dispenser of claim 1, further comprising a temperature sensor supported by the heating plate and positioned to contact the flexible reservoir.

4. The dispenser of claim 3, wherein the temperature sensor extends through a hole in the heating plate.

5. The dispenser of claim 1, further comprising a portion control system having a processor configured to receive an input from a user and to actuate the valve to permit a predetermined amount of the flowable food product to flow from the flexible reservoir.

6. The dispenser of claim 5, wherein the portion control system is configured to determine the velocity of a stream of dispensed flowable food product.

7. The dispenser of claim 1, further comprising a housing coupled to the frame.

\* \* \* \* \*